(12) United States Patent
Van Baelen et al.

(10) Patent No.: US 11,726,285 B2
(45) Date of Patent: *Aug. 15, 2023

(54) CABLE DISTRIBUTION SYSTEM

(71) Applicants: CommScope Connectivity Belgium BVBA, Kessel-Lo (BE); ADC Czech Republic s.r.o., Brno (CZ)

(72) Inventors: David Jan Irma Van Baelen, Winksele (BE); Jiri Ambroz, Brno (CZ); Jiri Pasek, Brno (CZ); Jiri Zavrel, Leuven (BE); Roger Alaerts, Aarschot (BE); Eric Schurmans, Geetbets (BE); Denys Mizin, Brno (CZ); Stephane Collart, Olen (BE)

(73) Assignees: CommScope Connectivity Belgium BVBA, Kessel-Lo (BE); ADC Czech Republic s.r.o., Brno (CZ)

( * ) Notice: Subject to any disclaimer, the term of this patent is extended or adjusted under 35 U.S.C. 154(b) by 0 days.

This patent is subject to a terminal disclaimer.

(21) Appl. No.: 16/916,866

(22) Filed: Jun. 30, 2020

(65) Prior Publication Data
US 2020/0400905 A1 Dec. 24, 2020

Related U.S. Application Data

(63) Continuation of application No. 15/320,198, filed as application No. PCT/EP2015/063620 on Jun. 17, 2015, now Pat. No. 10,732,370.
(Continued)

(51) Int. Cl.
*G02B 6/44* (2006.01)
*G02B 6/38* (2006.01)

(52) U.S. Cl.
CPC .......... *G02B 6/445* (2013.01); *G02B 6/3897* (2013.01); *G02B 6/4457* (2013.01); *G02B 6/4471* (2013.01)

(58) Field of Classification Search
CPC ..... G02B 6/4452; G02B 6/4457; G02B 6/445
See application file for complete search history.

(56) References Cited

U.S. PATENT DOCUMENTS

| 4,650,933 A | 3/1987 | Benda et al. |
|---|---|---|
| 4,768,961 A | 9/1988 | Lau |

(Continued)

FOREIGN PATENT DOCUMENTS

| AU | 2008264211 A1 | 1/2009 |
|---|---|---|
| CN | 203101690 U | 7/2013 |

(Continued)

OTHER PUBLICATIONS

ADC Telecommunications, Inc., "DSX-3 Digital Signal Cross-Connect (DSX3) System Application Guide," Document No. ADCP-80-323, 1st Edition, Issue 2, Dec. 1996, p. 1-10; p. 1-11.

(Continued)

*Primary Examiner* — Eric Wong
(74) *Attorney, Agent, or Firm* — Merchant & Gould P.C.

(57) ABSTRACT

A cable distribution system is provided wherein a feeder cable with one or more feeder fibers is received by a distribution device or box. The feeder fibers are terminated to a fiber optic connector. Customers can directly connect to the connectors of the feeder cable through an adapter and a mating connector for a point-to-point connection. Alternatively, a splitter input can be connected to one or more of the connectors of the feeder cable, such as through a pigtail extending from the splitter, wherein the splitter splits the signal as desired into a plurality of outputs. The outputs of the splitters can be in the form of connectors or adapters. Customers can connect to the splitter outputs through a mating connector (and an adapter if needed).

33 Claims, 65 Drawing Sheets

Related U.S. Application Data

(60) Provisional application No. 62/013,223, filed on Jun. 17, 2014, provisional application No. 62/017,620, filed on Jun. 26, 2014, provisional application No. 62/084,416, filed on Nov. 25, 2014.

(56) References Cited

U.S. PATENT DOCUMENTS

| | | |
|---|---|---|
| 4,770,639 A | 9/1988 | Lau |
| 4,797,114 A | 1/1989 | Lau |
| 4,820,200 A | 4/1989 | Lau |
| 4,840,568 A | 6/1989 | Burroughs et al. |
| 5,171,183 A | 12/1992 | Pollard et al. |
| 5,189,410 A | 2/1993 | Kosugi et al. |
| 5,199,878 A | 4/1993 | Dewey et al. |
| 5,214,673 A | 5/1993 | Morgenstern et al. |
| 5,297,000 A | 3/1994 | Freige et al. |
| 5,317,663 A | 5/1994 | Beard et al. |
| 5,339,379 A | 8/1994 | Kutsch et al. |
| 5,363,465 A | 11/1994 | Korkowski et al. |
| 5,393,249 A | 2/1995 | Morgenstern et al. |
| 5,432,875 A | 7/1995 | Korkowski et al. |
| 5,467,062 A | 11/1995 | Burroughs |
| 5,497,444 A | 3/1996 | Wheeler |
| 5,582,525 A | 12/1996 | Louwagie et al. |
| 5,613,030 A | 3/1997 | Hoffer et al. |
| 5,627,925 A | 5/1997 | Alferness et al. |
| 5,685,741 A | 11/1997 | Dewey et al. |
| 5,694,511 A | 12/1997 | Pimpinella et al. |
| 5,701,380 A | 12/1997 | Larson et al. |
| 5,717,810 A | 2/1998 | Wheeler |
| 5,740,298 A | 4/1998 | Macken et al. |
| 5,768,463 A | 6/1998 | Foss et al. |
| 5,946,440 A | 8/1999 | Puetz |
| 6,061,492 A | 5/2000 | Strause et al. |
| 6,116,961 A | 9/2000 | Henneberger et al. |
| 6,208,796 B1 | 3/2001 | Williams Vigliaturo |
| 6,226,111 B1 | 5/2001 | Chang et al. |
| 6,229,699 B1 | 5/2001 | Kerrigan et al. |
| 6,263,136 B1 | 7/2001 | Jennings et al. |
| 6,307,998 B2 | 10/2001 | Williams Vigliaturo |
| 6,328,608 B1 | 12/2001 | Olson et al. |
| 6,363,183 B1 | 3/2002 | Koh |
| 6,370,294 B1 | 4/2002 | Pfeiffer et al. |
| 6,418,262 B1 | 7/2002 | Puetz et al. |
| 6,424,781 B1 | 7/2002 | Puetz et al. |
| 6,427,035 B1 | 7/2002 | Mahoney |
| 6,507,691 B1 | 1/2003 | Hunsinger et al. |
| 6,511,330 B1 | 1/2003 | Norris |
| 6,532,332 B2 | 3/2003 | Solheid et al. |
| 6,535,682 B1 | 3/2003 | Puetz et al. |
| 6,554,652 B1 | 4/2003 | Musolf et al. |
| 6,556,738 B2 | 4/2003 | Pfeiffer et al. |
| 6,556,763 B1 | 4/2003 | Puetz et al. |
| 6,579,014 B2 | 6/2003 | Melton et al. |
| 6,591,051 B2 | 7/2003 | Solheid et al. |
| 6,599,024 B2 | 7/2003 | Zimmel |
| 6,614,953 B2 | 9/2003 | Strasser et al. |
| 6,616,459 B2 | 9/2003 | Norris |
| 6,632,106 B2 | 10/2003 | Musolf et al. |
| RE38,311 E | 11/2003 | Wheeler |
| 6,647,197 B1 | 11/2003 | Marrs et al. |
| 6,668,108 B1 | 12/2003 | Helkey et al. |
| 6,688,780 B2 | 2/2004 | Duran |
| 6,719,382 B2 | 4/2004 | Sucharczuk et al. |
| 6,760,531 B1 | 7/2004 | Solheid et al. |
| 6,761,594 B2 | 7/2004 | Johnson et al. |
| 6,792,191 B1 | 9/2004 | Clapp, Jr. et al. |
| 6,810,193 B1 | 10/2004 | Mueller |
| 6,822,874 B1 | 11/2004 | Marler |
| 6,824,312 B2 | 11/2004 | McClellan et al. |
| 6,830,465 B2 | 12/2004 | Norris et al. |
| 6,832,035 B1 | 12/2004 | Daoud et al. |
| 6,848,952 B2 | 2/2005 | Norris |
| 6,850,685 B2 | 2/2005 | Finucci et al. |
| 6,863,446 B2 | 3/2005 | Ngo |
| 6,885,798 B2 | 4/2005 | Zimmel |
| 6,890,187 B2 | 5/2005 | Norris |
| 6,937,807 B2 | 8/2005 | Franklin et al. |
| 6,983,095 B2 | 1/2006 | Reagan et al. |
| 7,029,322 B2 | 4/2006 | Ernst et al. |
| 7,118,284 B2 | 10/2006 | Nakajima et al. |
| 7,142,764 B2 | 11/2006 | Allen et al. |
| 7,149,398 B2 | 12/2006 | Solheid et al. |
| 7,190,874 B1 | 3/2007 | Barth et al. |
| 7,194,181 B2 | 3/2007 | Holmberg et al. |
| 7,218,827 B2 | 5/2007 | Vongseng et al. |
| 7,218,828 B2 | 5/2007 | Feustel et al. |
| 7,233,731 B2 | 6/2007 | Solheid et al. |
| 7,303,220 B2 | 12/2007 | Zellak |
| 7,310,474 B2 | 12/2007 | Kanasaki |
| 7,333,606 B1 | 2/2008 | Swam et al. |
| 7,333,706 B2 | 2/2008 | Parikh et al. |
| 7,346,254 B2 | 3/2008 | Kramer et al. |
| 7,376,322 B2 | 5/2008 | Zimmel et al. |
| 7,376,323 B2 | 5/2008 | Zimmel |
| 7,400,813 B2 | 7/2008 | Zimmel |
| 7,418,181 B2 | 8/2008 | Zimmel et al. |
| 7,418,184 B1 | 8/2008 | Gonzales et al. |
| 7,453,706 B2 | 11/2008 | Clark et al. |
| 7,470,068 B2 | 12/2008 | Kahle et al. |
| 7,495,931 B2 | 2/2009 | Clark et al. |
| 7,509,016 B2 | 3/2009 | Smith et al. |
| 7,536,075 B2 | 5/2009 | Zimmel |
| 7,593,617 B2 | 9/2009 | Klunder et al. |
| 7,606,459 B2 | 10/2009 | Zimmel et al. |
| 7,636,507 B2 | 12/2009 | Lu et al. |
| 7,697,812 B2 | 4/2010 | Parikh et al. |
| 7,706,656 B2 | 4/2010 | Zimmel |
| 7,751,673 B2 | 7/2010 | Anderson et al. |
| 7,760,984 B2 | 7/2010 | Solheid et al. |
| 7,816,602 B2 | 10/2010 | Landry et al. |
| 7,835,611 B2 | 11/2010 | Zimmel |
| 7,853,112 B2 | 12/2010 | Zimmel et al. |
| 7,885,505 B2 | 2/2011 | Zimmel |
| 7,912,336 B2 | 3/2011 | Zimmel |
| 8,019,191 B2 | 9/2011 | Laurisch |
| 8,023,791 B2 | 9/2011 | Zimmel et al. |
| 8,086,084 B2 | 12/2011 | Bran de Leon et al. |
| 8,107,816 B2 | 1/2012 | Bolster et al. |
| 8,121,457 B2 | 2/2012 | Zimmel et al. |
| 8,180,192 B2 | 5/2012 | Zimmel |
| 8,189,983 B2 | 5/2012 | Brunet et al. |
| 8,297,708 B2 | 10/2012 | Mizobata et al. |
| 8,331,753 B2 | 12/2012 | Zimmel et al. |
| 8,340,491 B2 | 12/2012 | Zimmel |
| 8,346,045 B2 | 1/2013 | Zimmel et al. |
| 8,488,934 B2 | 7/2013 | Zhou et al. |
| 8,494,329 B2 | 7/2013 | Nhep et al. |
| 8,520,997 B2 | 8/2013 | Zimmel |
| 8,542,972 B2 | 9/2013 | Zimmel |
| 8,547,694 B2 | 10/2013 | Tang |
| 8,554,044 B2 | 10/2013 | Bran de Leon et al. |
| 8,577,198 B2 | 11/2013 | Solheid et al. |
| 8,634,689 B2 | 1/2014 | Zimmel |
| 8,660,429 B2 | 2/2014 | Bolster et al. |
| 8,705,928 B2 | 4/2014 | Zimmel et al. |
| 8,774,585 B2 | 7/2014 | Kowalczyk et al. |
| 8,774,858 B2 | 7/2014 | Kowalczyk et al. |
| 8,798,428 B2 | 8/2014 | Zimmel et al. |
| 8,929,708 B2* | 1/2015 | Pimentel .......... G02B 6/4477 385/135 |
| 9,146,371 B2 | 9/2015 | Zimmel |
| 9,197,346 B2 | 11/2015 | Bolster et al. |
| 9,213,159 B2 | 12/2015 | Zimmel et al. |
| 9,239,442 B2 | 1/2016 | Zhang |
| 9,247,660 B2 | 1/2016 | Bell et al. |
| 9,274,285 B2 | 3/2016 | Courchaine et al. |
| 9,335,504 B2 | 5/2016 | Solheid et al. |
| 9,417,401 B2 | 8/2016 | Zhang |
| 9,494,760 B2 | 11/2016 | Simmons et al. |
| 9,563,017 B2 | 2/2017 | Zimmel et al. |
| 9,678,292 B2 | 6/2017 | Landry et al. |
| 9,888,610 B2 | 2/2018 | Liu et al. |

(56) References Cited

U.S. PATENT DOCUMENTS

| | | |
|---|---|---|
| 10,031,305 B2 | 7/2018 | Leeman et al. |
| 10,058,011 B2 | 8/2018 | Graczyk et al. |
| 10,606,009 B2 | 3/2020 | Van Baelen et al. |
| 10,637,220 B2 | 4/2020 | Van Baelen |
| 10,732,370 B2 | 8/2020 | Van Baelen et al. |
| 2002/0037147 A1 | 3/2002 | McLean et al. |
| 2003/0011287 A1 | 1/2003 | Searby et al. |
| 2004/0175090 A1 | 9/2004 | Vastmans et al. |
| 2005/0053341 A1 | 3/2005 | Zimmel |
| 2005/0129379 A1 | 6/2005 | Reagan et al. |
| 2005/0232551 A1 | 10/2005 | Chang et al. |
| 2005/0232565 A1 | 10/2005 | Heggestad et al. |
| 2006/0008231 A1 | 1/2006 | Reagan et al. |
| 2006/0138268 A1 | 6/2006 | Huang |
| 2006/0228086 A1 | 10/2006 | Holmberg et al. |
| 2007/0036503 A1 | 2/2007 | Solheid et al. |
| 2007/0147765 A1 | 6/2007 | Gniadek et al. |
| 2007/0165995 A1 | 7/2007 | Reagan et al. |
| 2007/0189691 A1 | 8/2007 | Barth et al. |
| 2007/0189692 A1 | 8/2007 | Zimmel et al. |
| 2008/0031585 A1 | 2/2008 | Solheid et al. |
| 2008/0079341 A1 | 4/2008 | Anderson et al. |
| 2008/0124038 A1 | 5/2008 | Kowalczyk et al. |
| 2008/0170824 A1 | 7/2008 | Hendrickson et al. |
| 2008/0175550 A1 | 7/2008 | Coburn et al. |
| 2009/0002941 A1 | 1/2009 | Mongia et al. |
| 2009/0022468 A1 | 1/2009 | Zimmel |
| 2009/0060440 A1 | 3/2009 | Wright et al. |
| 2009/0067802 A1 | 3/2009 | Hoehne et al. |
| 2009/0103879 A1 | 4/2009 | Tang et al. |
| 2009/0110359 A1 | 4/2009 | Smith et al. |
| 2009/0263097 A1 | 10/2009 | Solheid et al. |
| 2009/0290842 A1 | 11/2009 | Bran de Leon et al. |
| 2009/0317047 A1 | 12/2009 | Smith et al. |
| 2009/0324187 A1 | 12/2009 | Wakileh et al. |
| 2010/0061043 A1 | 3/2010 | Hsieh et al. |
| 2010/0129030 A1 | 5/2010 | Giraud et al. |
| 2010/0183274 A1 | 7/2010 | Brunet et al. |
| 2010/0226654 A1 | 9/2010 | Smith et al. |
| 2010/0310221 A1 | 12/2010 | Le Dissez |
| 2010/0322580 A1 | 12/2010 | Beamon et al. |
| 2010/0329623 A1 | 12/2010 | Smith et al. |
| 2010/0329624 A1 | 12/2010 | Zhou et al. |
| 2011/0013875 A1 | 1/2011 | Leon et al. |
| 2011/0026894 A1 | 2/2011 | Rudenick et al. |
| 2011/0058785 A1 | 3/2011 | Solheid et al. |
| 2011/0091170 A1 | 4/2011 | Bran de Leon et al. |
| 2011/0164853 A1 | 7/2011 | Corbille et al. |
| 2011/0211799 A1 | 9/2011 | Conner et al. |
| 2011/0262095 A1* | 10/2011 | Fabrykowski ....... G02B 6/4466 385/135 |
| 2011/0274403 A1 | 11/2011 | LeBlanc et al. |
| 2011/0293235 A1 | 12/2011 | Nieves et al. |
| 2012/0027355 A1 | 2/2012 | LeBlanc et al. |
| 2013/0056090 A1 | 3/2013 | Tang |
| 2013/0114930 A1 | 5/2013 | Smith et al. |
| 2013/0114937 A1 | 5/2013 | Zimmel et al. |
| 2013/0170810 A1 | 7/2013 | Badar et al. |
| 2013/0188966 A1 | 7/2013 | Wu et al. |
| 2013/0231041 A1 | 9/2013 | Li et al. |
| 2013/0243386 A1 | 9/2013 | Pimentel et al. |
| 2014/0219622 A1 | 8/2014 | Coan et al. |
| 2014/0334790 A1 | 11/2014 | Zhang |
| 2015/0003008 A1 | 1/2015 | Larsen et al. |
| 2015/0036279 A1 | 2/2015 | Erdman et al. |
| 2015/0062805 A1 | 3/2015 | Katsumata et al. |
| 2015/0110442 A1 | 4/2015 | Zimmel et al. |
| 2015/0137461 A1 | 5/2015 | Coenegracht et al. |
| 2015/0156914 A1 | 6/2015 | Kwak et al. |
| 2015/0205064 A1* | 7/2015 | Claessens ............... B32B 37/18 156/60 |
| 2015/0241654 A1 | 8/2015 | Allen et al. |
| 2015/0286023 A1 | 10/2015 | Van Baelen et al. |
| 2015/0301301 A1 | 10/2015 | Mullaney |
| 2015/0355428 A1 | 12/2015 | Leeman et al. |
| 2016/0095259 A1 | 3/2016 | Campbell et al. |
| 2016/0202441 A1 | 7/2016 | Claessens et al. |
| 2016/0227670 A1 | 8/2016 | Liu et al. |
| 2016/0309680 A1 | 10/2016 | Blohm |
| 2016/0370551 A1 | 12/2016 | Hill et al. |
| 2017/0097486 A1 | 4/2017 | Barrantes et al. |
| 2017/0123175 A1 | 5/2017 | Van Baelen et al. |
| 2017/0153407 A1* | 6/2017 | Van Baelen ......... G02B 6/4455 |
| 2019/0022568 A1 | 1/2019 | Chernansky |
| 2019/0036316 A1 | 1/2019 | Van Baelen |
| 2019/0056559 A1 | 2/2019 | Leeman et al. |
| 2020/0183116 A1 | 6/2020 | Leeman et al. |

FOREIGN PATENT DOCUMENTS

| | | |
|---|---|---|
| CN | 103238095 A | 8/2013 |
| CN | 205484970 U * | 8/2016 |
| DE | 4130706 A1 | 3/1993 |
| DE | 4229510 A1 | 3/1994 |
| DE | 20201170 U1 | 5/2002 |
| DE | 10350954 A1 | 5/2005 |
| DE | 102009008068 A1 | 8/2010 |
| EP | 0828356 A2 | 3/1998 |
| EP | 0730177 A2 | 9/1999 |
| EP | 1092996 A2 | 4/2001 |
| EP | 1107031 A1 | 6/2001 |
| EP | 1179745 A2 | 2/2002 |
| EP | 1473578 A2 | 11/2004 |
| EP | 1626300 A1 | 7/2005 |
| EP | 2434317 A1 | 3/2012 |
| GB | 2300978 A | 11/1996 |
| JP | 2007121398 A | 5/2007 |
| JP | 2010122597 A | 6/2010 |
| WO | 9636896 A1 | 11/1996 |
| WO | 007053 A2 | 2/2000 |
| WO | 0075706 A2 | 12/2000 |
| WO | 02099528 A1 | 12/2002 |
| WO | 02103429 A2 | 12/2002 |
| WO | 03093889 A1 | 11/2003 |
| WO | 2005045487 A2 | 5/2005 |
| WO | 2006127397 A1 | 11/2006 |
| WO | 2010040256 A1 | 4/2010 |
| WO | 2010134157 A1 | 11/2010 |
| WO | 2012074688 A2 | 6/2012 |
| WO | 2012112344 A1 | 8/2012 |
| WO | 2013117598 A1 | 8/2013 |
| WO | 2015193384 A2 | 12/2015 |
| WO | 2016066780 A1 | 5/2016 |

OTHER PUBLICATIONS

ADC Telecommunications, Inc., "DSX-1 Digital Signal Cross Connect PIX-DSX-1—Filth Edition," dated Oct. 1994, 36 Pages.

ADC Telecommunications, Inc., "DSX-3 Digital Signal Cross-Connect, Front and Rear Cross-Connect Products, 2nd Edition," Doc. No. 274, dated Oct. 2004, 65 pp.

ADC Telecommunications, Inc., "OmniReach FTTP Solutions," Doc. No. 1276550, dated May 2004, 13 pp.

ADC Telecommunications, Inc., "PxPlus™ DS1 Digital Signal Cross-Connect," dated Jan. 1997, 12 Pages.

AFL Global: "LGX Optical Coupler Modules," May 17, 2012, XP002744968, retrieved from the Internet: URL.https://web.archive.org/web/20120517022939/http://www.aflglobal.com/Products/Fiber-Inside-Plant/Couplers-Splitters/Optical-Coupler-Modules.aspx.

International Search Report and Written Opinion for Application No. PCT/EP2013/077292 dated May 28, 2014.

International Search Report and Written Opinion for Application No. PCT/EP2015/063620 dated Feb. 5, 2016.

International Search Report and Written Opinion for Application No. PCT/EP2016/079513 dated Mar. 3, 2017.

International Search Report and Written Opinion of the International Searching Authority for International Patent Application No. PCT/EP2017/051908 dated Jul. 18, 2017, 19 pages.

* cited by examiner

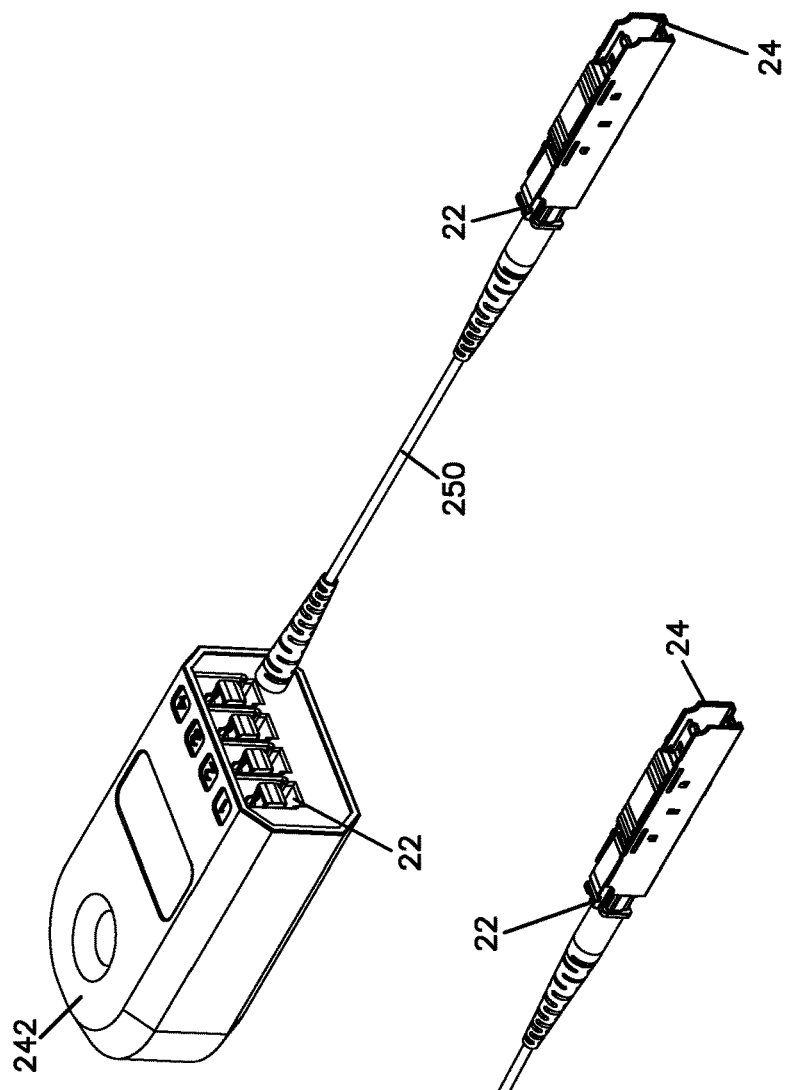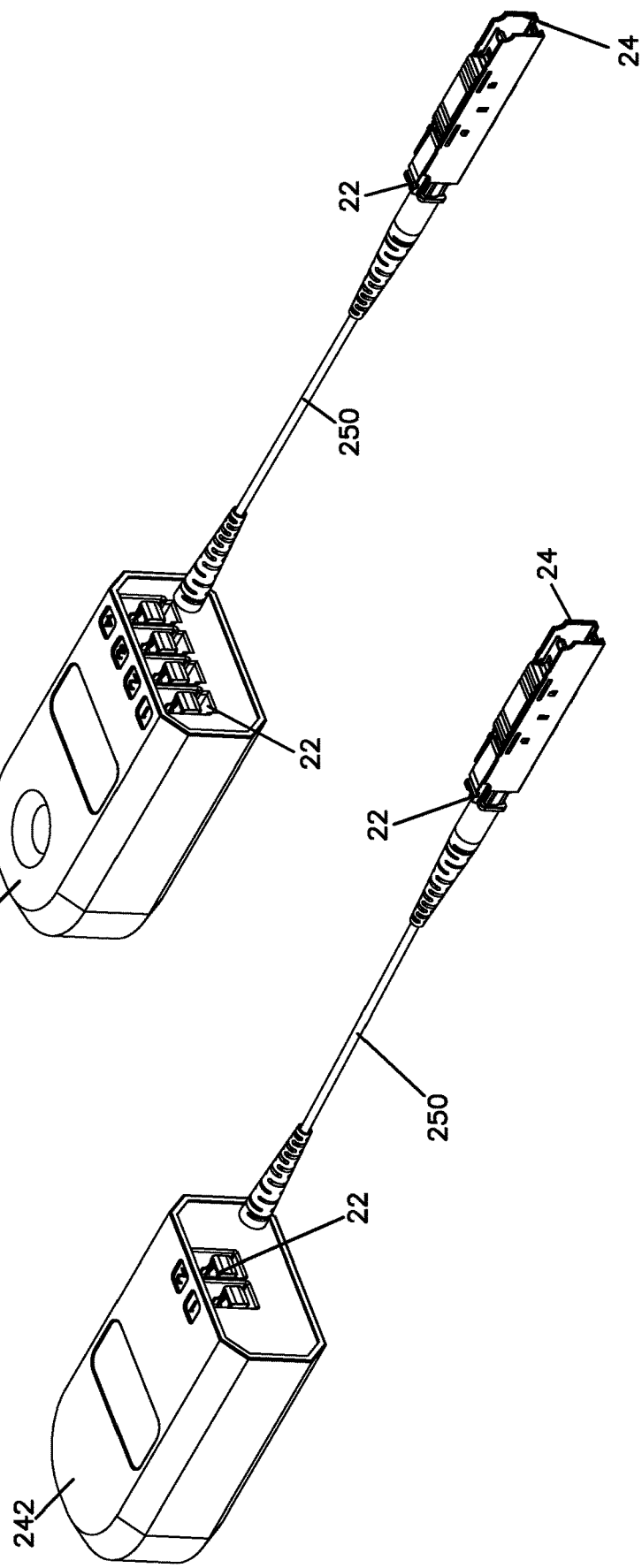

CABLE DISTRIBUTION SYSTEM

CROSS-REFERENCE TO RELATED APPLICATION(S)

This application is a continuation of U.S. patent application Ser. No. 15/320,198, filed on Dec. 19, 2016, now U.S. Pat. No. 10,732,370, which is a National Stage of International Application No. PCT/EP2015/063620, filed Jun. 17, 2015, which claims benefit of U.S. Patent Application Ser. No. 62/013,223 filed on Jun. 17, 2014, U.S. Patent Application Ser. No. 62/017,620 filed on Jun. 26, 2014, and U.S. Patent Application Ser. No. 62/084,416 filed on Nov. 25, 2014, the disclosures of which are incorporated herein by reference in their entireties. To the extent appropriate a claim of priority is made to each of the above disclosed applications.

BACKGROUND

As demand for telecommunications increases, fiber optic networks are being extended in more and more areas. In facilities such as multiple dwelling units (MDU's), apartments, condominiums, businesses, etc., fiber optic distribution terminals and boxes are used to provide subscriber access points to the fiber optic network. Cables are also used to interconnect the subscriber access points provided by the fiber distribution terminals with subscriber interface units (e.g., Optical Network Terminals) provided at subscriber locations (e.g., at each residence of an MDU). With respect to such fiber distribution systems, there is a need for techniques to effectively manage cables and optical splitters while also taking into consideration space constraints.

SUMMARY

A cable distribution system is provided wherein a feeder cable with one or more feeder fibers is received by a distribution terminal, device or box. The feeder fibers are terminated to a fiber optic connector. Customers can directly connect to the connectors of the feeder cable through an adapter and a mating connector for a point-to-point connection. Alternatively, a splitter input can be connected to one or more of the connectors of the feeder cable, such as through a pigtail extending from the splitter, wherein the splitter splits the signal as desired into a plurality of outputs. The outputs of the splitters can be in the form of connectors or adapters. Customers can connect to the splitter outputs through a mating connector (and an adapter if needed).

The cable distribution system allows for mixing of connection types to the customer(s) such as a direct connection (point to point), or a split signal connection. Further, the types of splitters can be mixed and varied as desired, such as 1×2, 1×4, 1×8, 1×16, 1×32, 2×4, etc., or other. Different combinations of splitters can be used in the distribution device, such as one or more 1×4 splitters, one or more 1×8 splitters, and/or one or more 1×16 splitters. Other combinations are possible.

The outputs of the splitters can be in the form of connectors or adapters mounted at or within the splitter housing, or connectors or adapters on the ends of stubs extending from the splitter housings. The stubs (semi-rigid) can improve density and improve connector and/or adapter access through movement of the stubs. Preferably the stubs are not so flexible that the stubs become easily tangled up with each other.

Protective covers may be provided for the overall device, the feeder cable, the connectors and/or the adapters of the feeder cable, any splices, and the splitters.

The connectors and adapters utilized in the cable distribution system can be any desired connection type, such as SC type, or LC type. MPO types may be used. Another example is a connector and adapter system as shown in patent document nos. WO2012/112344 and WO 2013/117598, the entire disclosures of which are hereby incorporated by reference. This connector and mating adapter may also be referred to as a LightPlug connector and adapter, or an LP connector and adapter, in the accompanying pages. The LightPlug connector system utilizes ferruleless connectors, with bare fiber to bare fiber connections. This connector type can be terminated to a bare fiber in the factory or in the field using a LightPlug termination tool. With respect to LightPlug connectors and adapters, some cost savings may be realized by adding the adapter at a later date when connectivity is desired. A hybrid adapter can be used to connect a ferruleless LightPlug connector to a ferruled connector, like an SC type.

A fiber distribution device in accordance with the disclosure may comprise a base, and an external cover (optional). An internal cover (optional) may be positioned over a cable area which may cover a splice (optional) and an input cable, such as a feeder cable, including a plurality of fibers. A plurality of fiber optic input connectors extend from the cable and are each matable with a fiber optic adapter, wherein output connectors are connectable to the input connectors through the adapters to provide single service (point to point) outputs. A splitter (or a plurality of splitters) can be used instead of the output connectors, wherein the splitter includes a plurality of outputs each with an output connector or adapter, and wherein the splitters each include a splitter input for mating with one of the input connectors. In this manner, the terminations of the feeder input cable are done first, and then it can be decided later whether each of the terminations are to be point to point or split signal. Also, or alternatively, the usage of the terminations can be changed over time, if desired.

The fiber distribution device may be arranged wherein the input connector faces in a first direction and wherein the splitter or splitters include outputs in the form of a line or lines of connectors or adapters which face in the same direction. A cable link between the input connector and the splitter is provided.

A splitter device in accordance with the disclosure may comprise:
 a first end having a plurality of outputs;
 the first end also having an input;
 a splitter component between the outputs and the input;
 wherein the outputs are in the form of fiber optic connectors or adapters, and the input is in the form of a cable.

The outputs of the splitter device may be in the form of connectors or adapters mounted at or within the splitter housing, or stubs terminated by connectors or adapters.

The splitter devices may include mounting features for mounting to a base of a distribution device. Some mounting features include one or more openings through the splitter housings.

Aspects of the disclosure also relate to growing the capacity where the customer may want to put in more splitters than the device or box can accommodate. A second dummy-box can be mounted next to the initially installed box; extra splitters can be mounted in this second box, the inputs from the added splitters are patched to one of the terminated connectors from the first box. An extension patchcord might be needed if the patching distance is too great.

Growing capacity may also occur where the customer wants more splitters and Point to Point (double density) at the same location. A second box can be mounted next to the initially installed box; one un-used fiber bundle/tube from the feeder is routed to the new box to the 250 μm overlength compartment; after stripping to 250 μm; the second box can be installed similar to the first box. Depending on the feeder-cable, more boxes can be connected.

Growing capacity in another case can occur where the customer wants a second box at a nearby location. A second box can be mounted somewhere in the neighborhood; feeder-fibers from un-used bundles/tubes are spliced to a feeder-cable which runs to the second box; this spliced feeder-stub enters the second box in the same way the feeder enters the first box. Depending on the feeder-cable, more boxes can be connected in a daisy-chaining manner.

A variety of additional aspects will be set forth in the description that follows. These aspects can relate to individual features and to combinations of features. It is to be understood that both the foregoing general description and the following detailed description are exemplary and explanatory only and are not restrictive of the broad concepts upon which the embodiments disclosed herein are based.

BRIEF DESCRIPTION OF THE FIGURES

FIG. 11 shows a 1×2 splitter for use in the distribution box of FIGS. 5-10;

FIG. 12 shows a 1×4 splitter for use in the distribution box of FIGS. 5-10;

DETAILED DESCRIPTION OF THE DRAWINGS

The following descriptions and accompanying drawings show various examples of implementations of the cable distribution systems.

Figure 1:
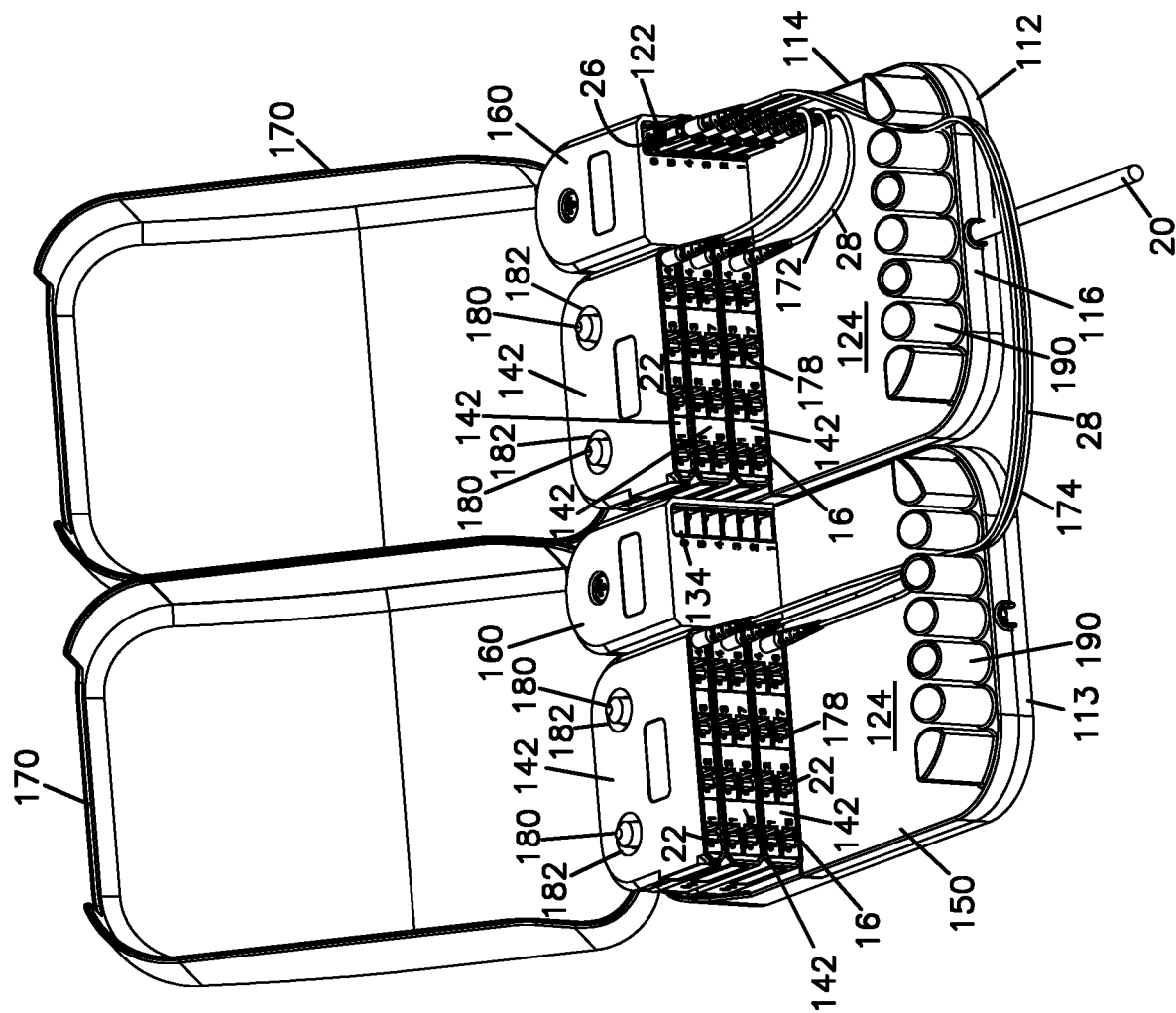
FIG. 1 shows two distribution boxes in perspective view in accordance with aspects of the present invention.
Figure 80:
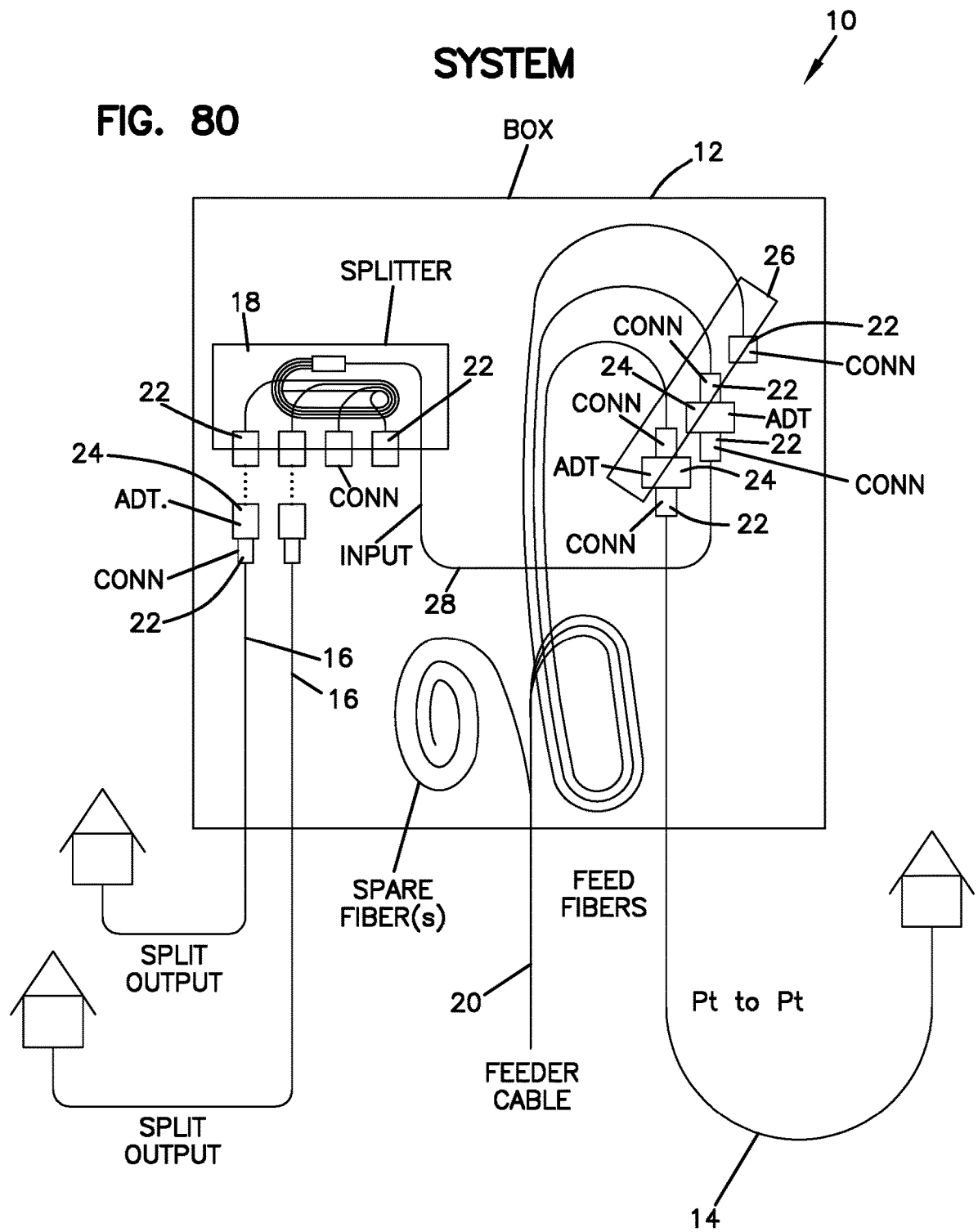
FIG. 80 shows a schematic view illustrating the distribution box of the various embodiments showing feeder fibers connected to splitter outputs and to point-to-point outputs.

Referring now to FIGS. 1-80, a distribution box receives a feeder cable with one or more feeder fibers. A variety of splitters are shown having a splitter housing mounted to distribution box for splitting of the signals of the feeder fibers. The splitter input in the illustrated examples is in the form of a cable. Within the interior of the splitter, the splitter input is split into a plurality of outputs. The distribution box can hold one or more splitters. A termination field holds connectorized ends of the feeder fibers. Connectorized fibers connect to the feeder fiber connectorized ends at the termination field. The preferred distribution box allows for: 1) split outputs of a splitter input cable connected at the termination field, 2) point to point connection with an output cable at the termination field; or 3) both split feeder signal and point to point feeder signals. FIG. 80 shows this schematically.

Referring further to FIG. 80, the schematic representation of a distribution system 10 includes a distribution box 12 shown offering both point-to-point 14 and split output 16 connections for the feeder cable 20 to the service users. While connectors 22 are shown as LightPlug connectors as the connection interface for the box, adapters could be used instead to connect the two connectors. Using connectors as the interface delays the cost of the adapters 24 until connection is needed. The splitter inputs 28 and the point to point connections are made at termination field 26.

System 10 allows for the later addition of splitters 18 to delay early cost if all of the customers initially can be served by point to point connections. At later date, the splitters can be added once the split outputs are desired.

Referring now to FIGS. 1-4, a distribution box 112 is shown having a base 114 and an input (feeder) cable area 116. The base 114 also includes a splitter area 118 and an area 120 for feeder terminations 122. The base 114 includes one or more storage areas 124. One storage area 126 can be used for cable slack for the cables 130 of the feeder terminations. A second storage area 128 can be used for unused feeder cables 132. The feeder terminations 122 are in the form of LightPlug connectors which are held in place ready for mating to a LightPlug adapter. The feeder terminations can be directly connected to a customer with a point-to-point connection. The feeder terminations can also be connected to a splitter input 140 from a splitter 142 mounted within the distribution box 112, or another distribution box 113. As shown in FIG. 1, a cover 150 encloses the cable storage areas 126, 128. If desired, a splice area can also be provided on the base. Referring to FIG. 1, a further cover 160 is positioned over the feeder terminations 122. A cover 170 covers base 114 and the interior components.

Referring still to now to FIGS. 1-4, various splitters are mounted to the distribution box. The splitter inputs are connected to feeder terminations wherein the feeder signals of those terminations are split into splitter outputs. The splitter outputs are shown as fiber optic connectors disposed within the housings of each splitter. The distribution cable or output cable is connectorized with a mating connector and a mating adapter for connecting to the splitter outputs.

As shown in FIG. 1, there are six feeder terminations, three of which are connected to splitters of one distribution box 112, and three of which are connected to another distribution box 113. Any still open feeder terminations can be directly connected to a customer in a point-to-point arrangement, or can be connected to further splitter inputs of additional splitters. A box cover 170 typically is placed over the splitters, the feeder terminations, and the base to protect the interior. Cable management devices 190 help to manage the output cables.

As shown in FIG. 1, a second dummy-box 113 can be mounted next to the initially installed box 112. Extra splitters 142 can be mounted in this second box 113, the inputs from the added splitters are patched to one of the terminated connectors from the first box 112. Feeder terminations 134 of box 113 are not used in the arrangement of FIG. 1.

Figure 2:
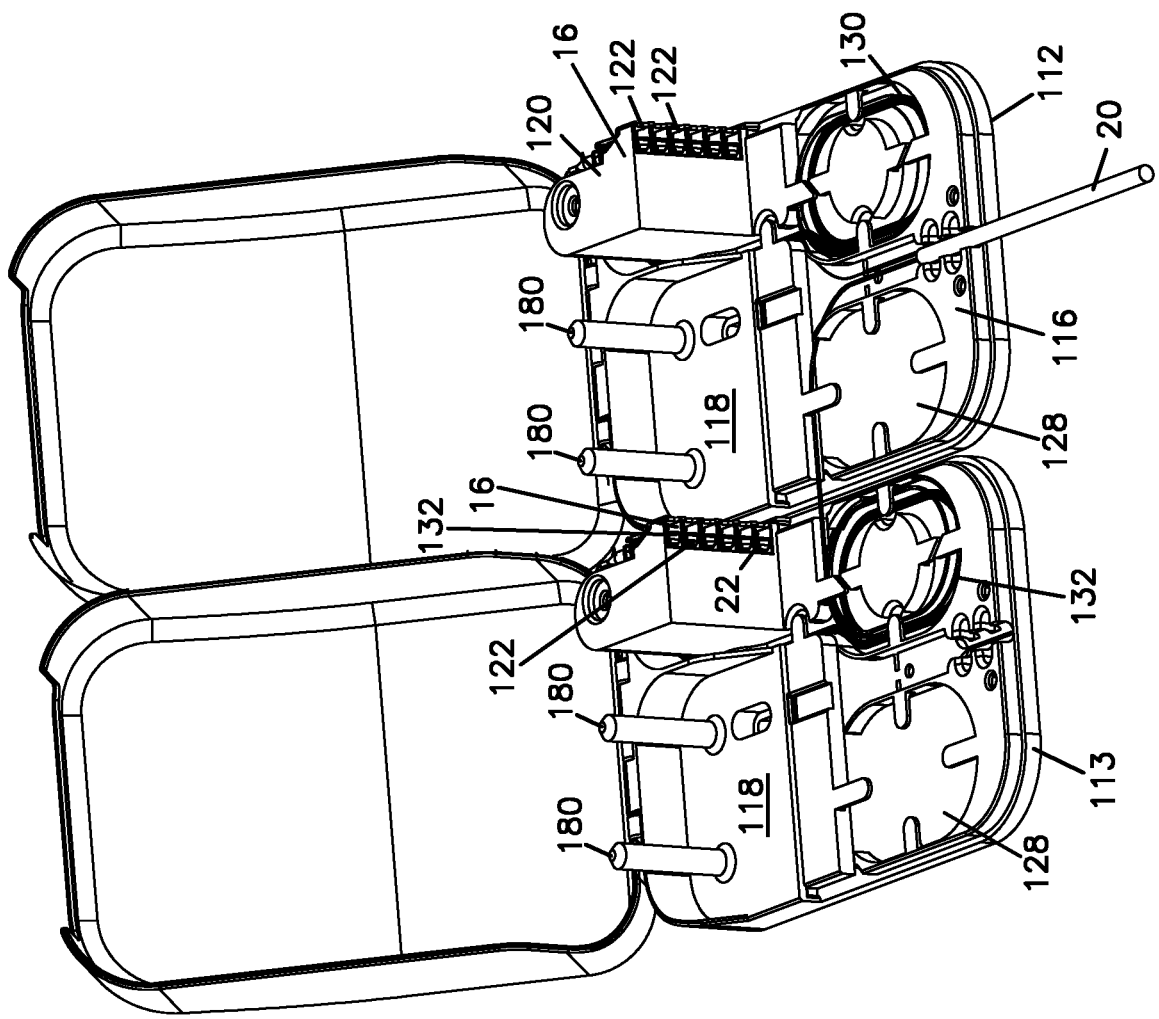
FIG. 2 shows the two distribution boxes of FIG. 1 without the fiber storage covers, the splitters and the feeder termination covers.

As shown in FIG. 2, a second box 113 can be mounted next to the initially installed box 112. One un-used fiber bundle/tube 132 from the feeder 20 is routed to the new box to the 250 µm overlength compartment 130. After stripping to 250 µm. The second box 113 can be installed similar to the first box 112. Depending on the feeder-cable, more boxes can be connected. Feeder terminations 134 of box 113 are used in the arrangement of FIG. 2.

Figure 3:
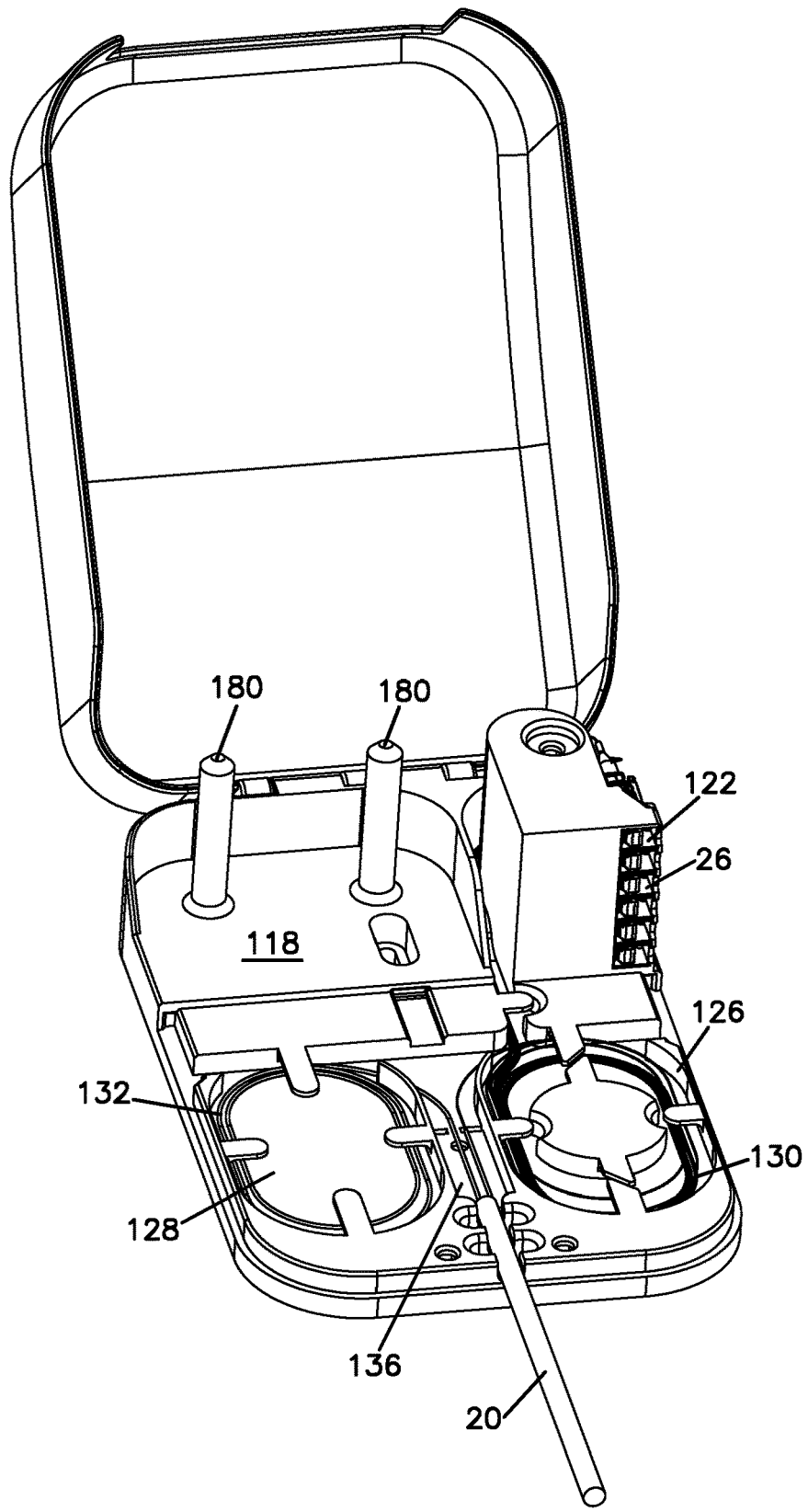
FIG. 3 shows an individual distribution box of the type shown in FIG. 2.

FIG. 3 shows an example of feeder cable installation which results in terminated fibers which can be connected in a point-to-point arrangement with a customer, or to a splitter, and then to the costumer(s) as desired. In the illustrated example, six terminated feeder fibers are provided. Other examples can include more or less terminated fibers for the distribution box. FIG. 3 also shows the distribution box at initial installation lacking any splitters, and only providing direct point-to-point connections with the customers. If desired, at a later date, a splitter can be added to provide additional outputs for customers. Additional splitters can be added at that time, or at a later date, as desired. This helps defer costs. FIG. 3 shows distribution box 112 with an unused fiber bundle/tube 132 in storage3 area 128, ready for future use, such as for repair, or connection to another box 113.

Figure 4:
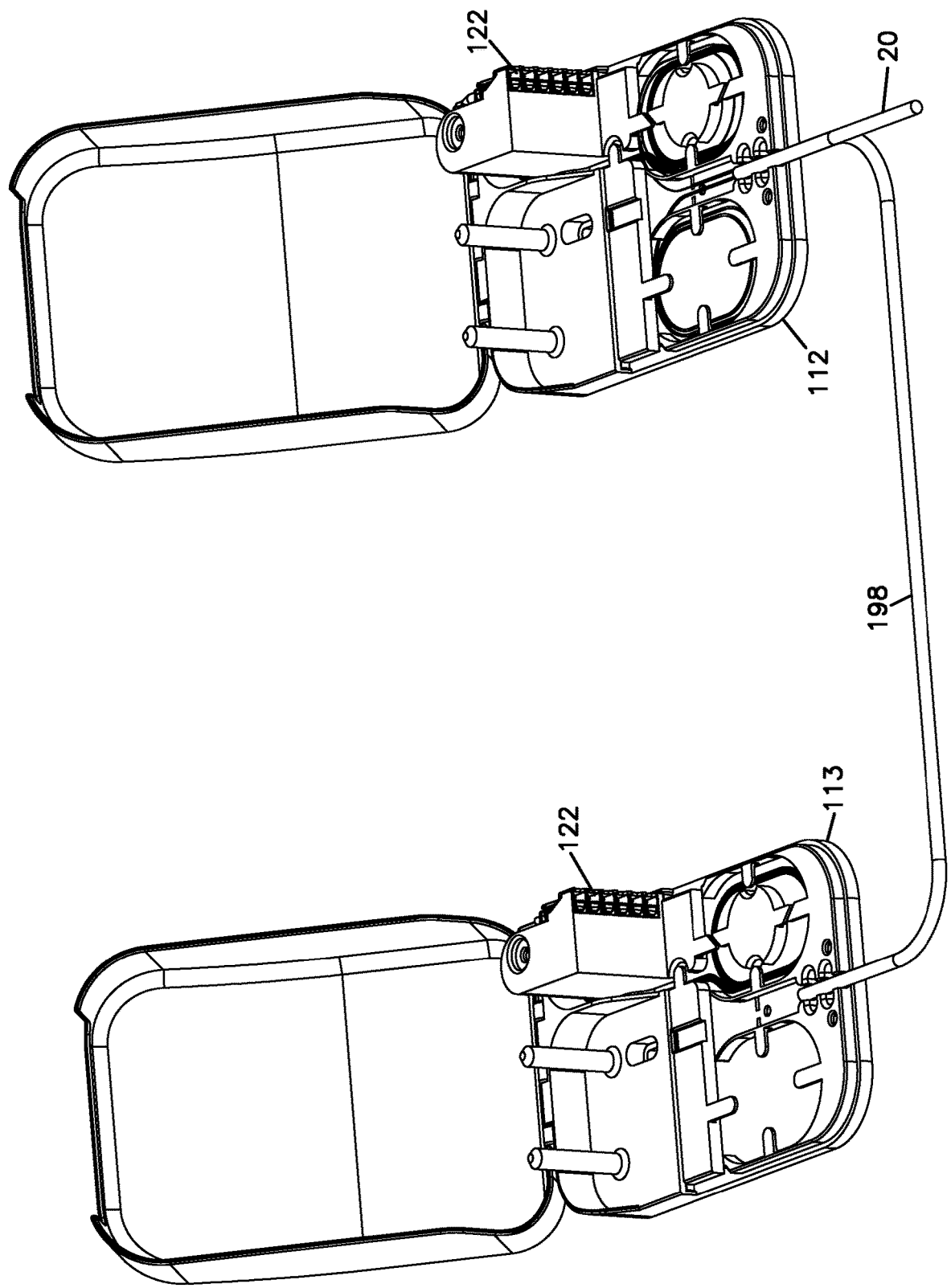
FIG. 4 shows two distribution boxes located at remote locations from one another.
Figure 5:
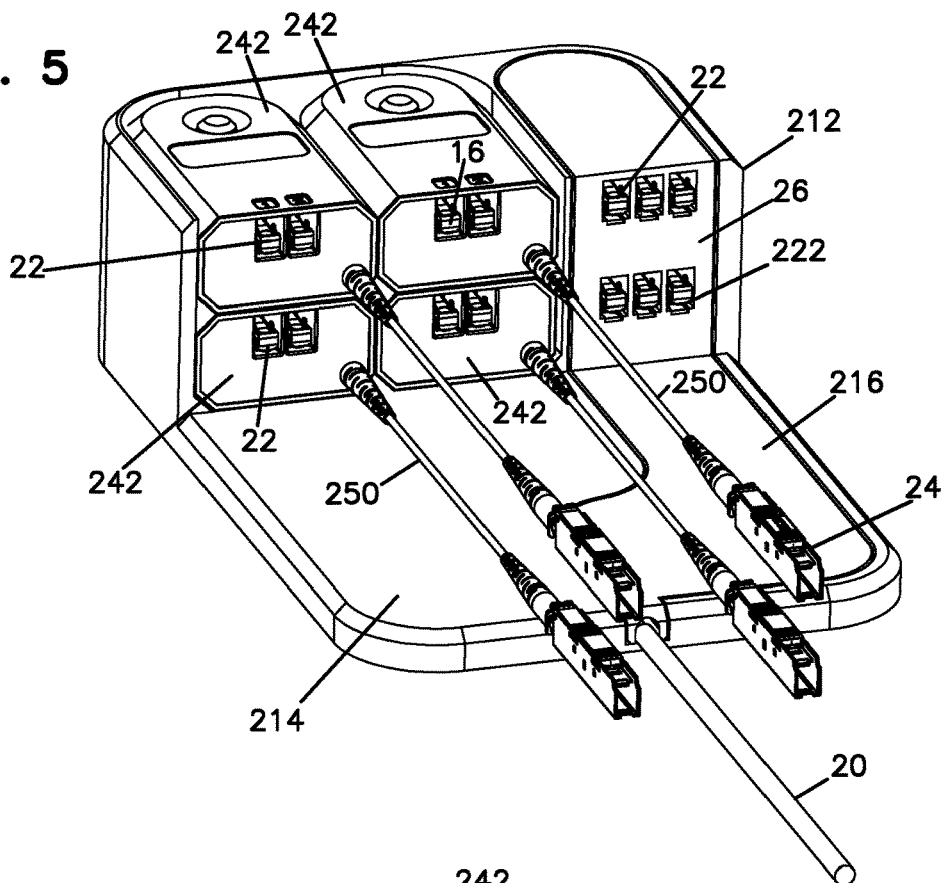
FIG. 5 shows another example distribution box in perspective view, including four 1×2 splitters.
Figure 6:
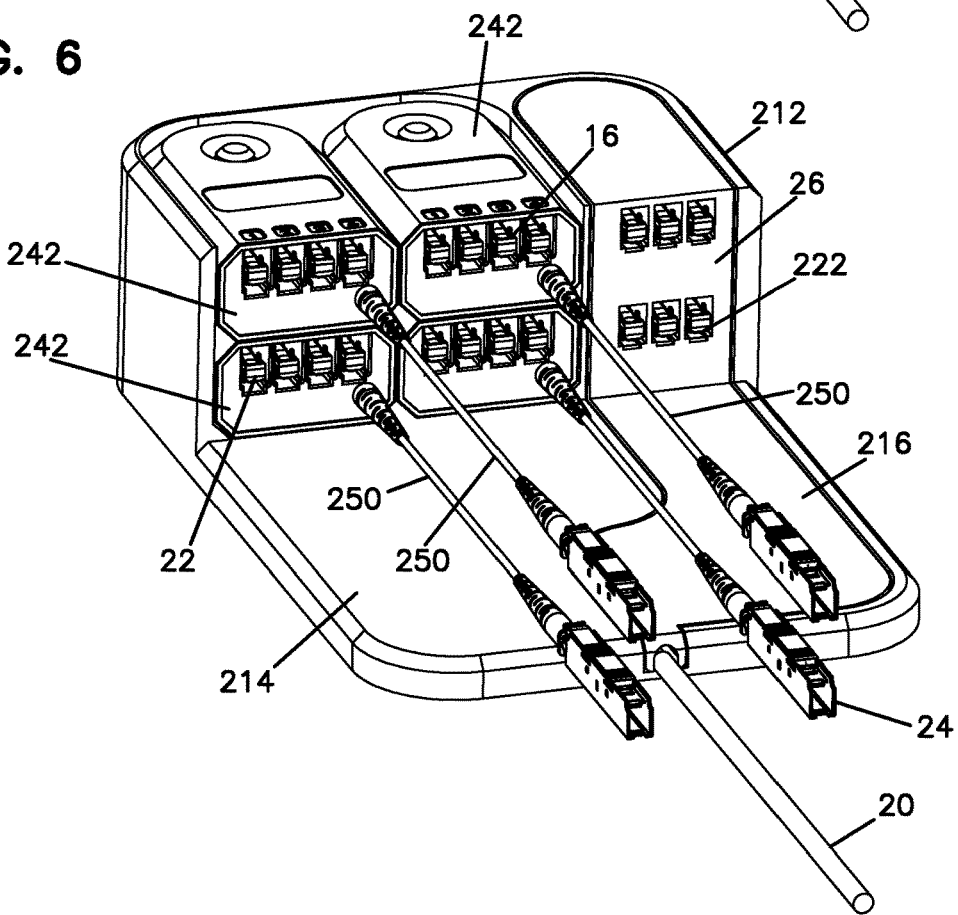
FIG. 6 shows a similar distribution box to the distribution box of FIG. 5, with four 1×4 splitters.
Figure 7:
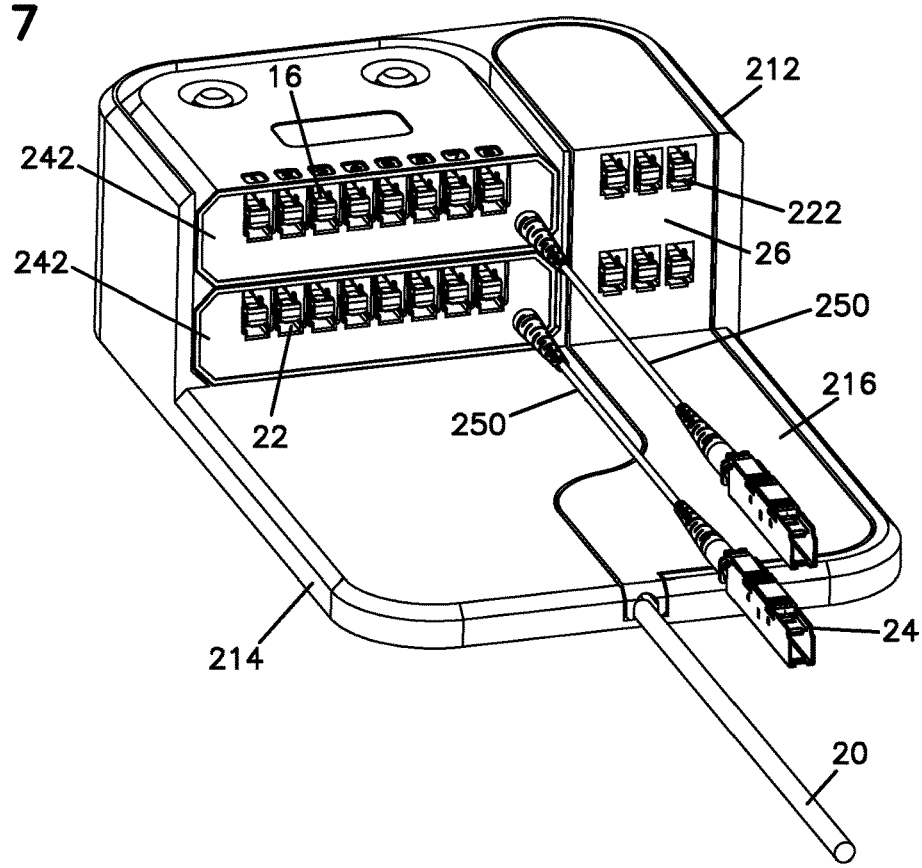
FIG. 7 shows a similar distribution box to the distribution box of FIG. 5, with two 1×8 splitters.
Figure 8:
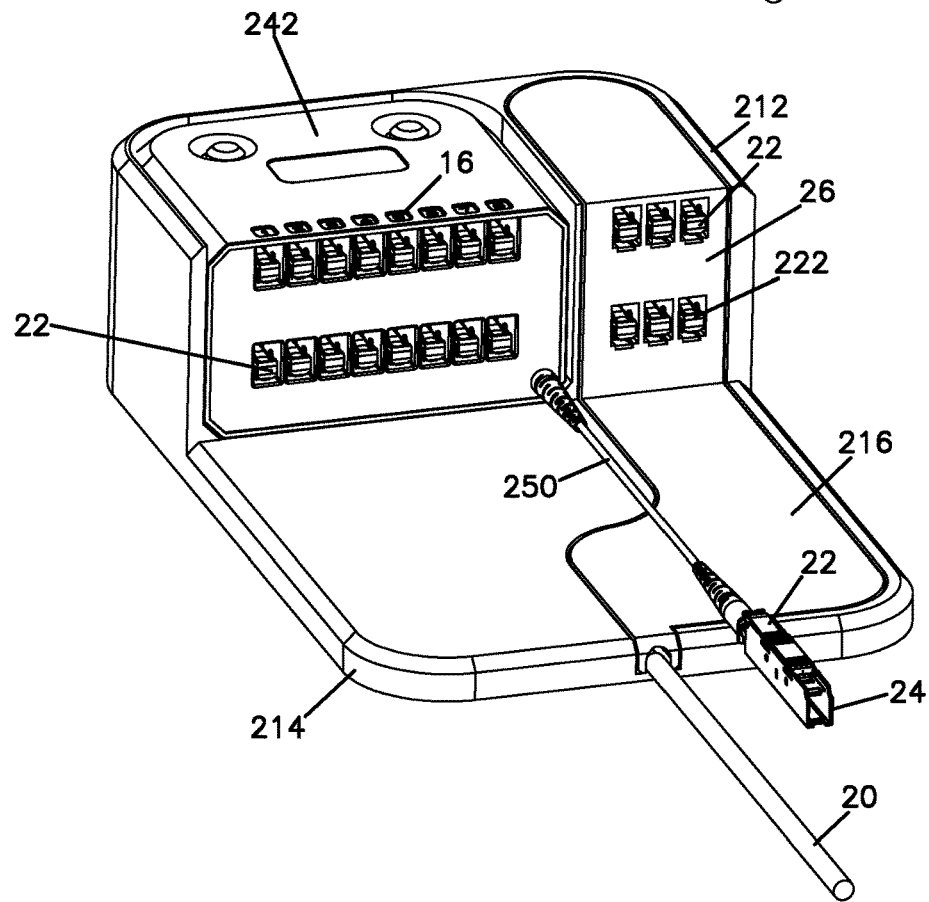
FIG. 8 shows a similar distribution box to the distribution box of FIG. 5, with a single 1×16 splitter.
Figure 9:
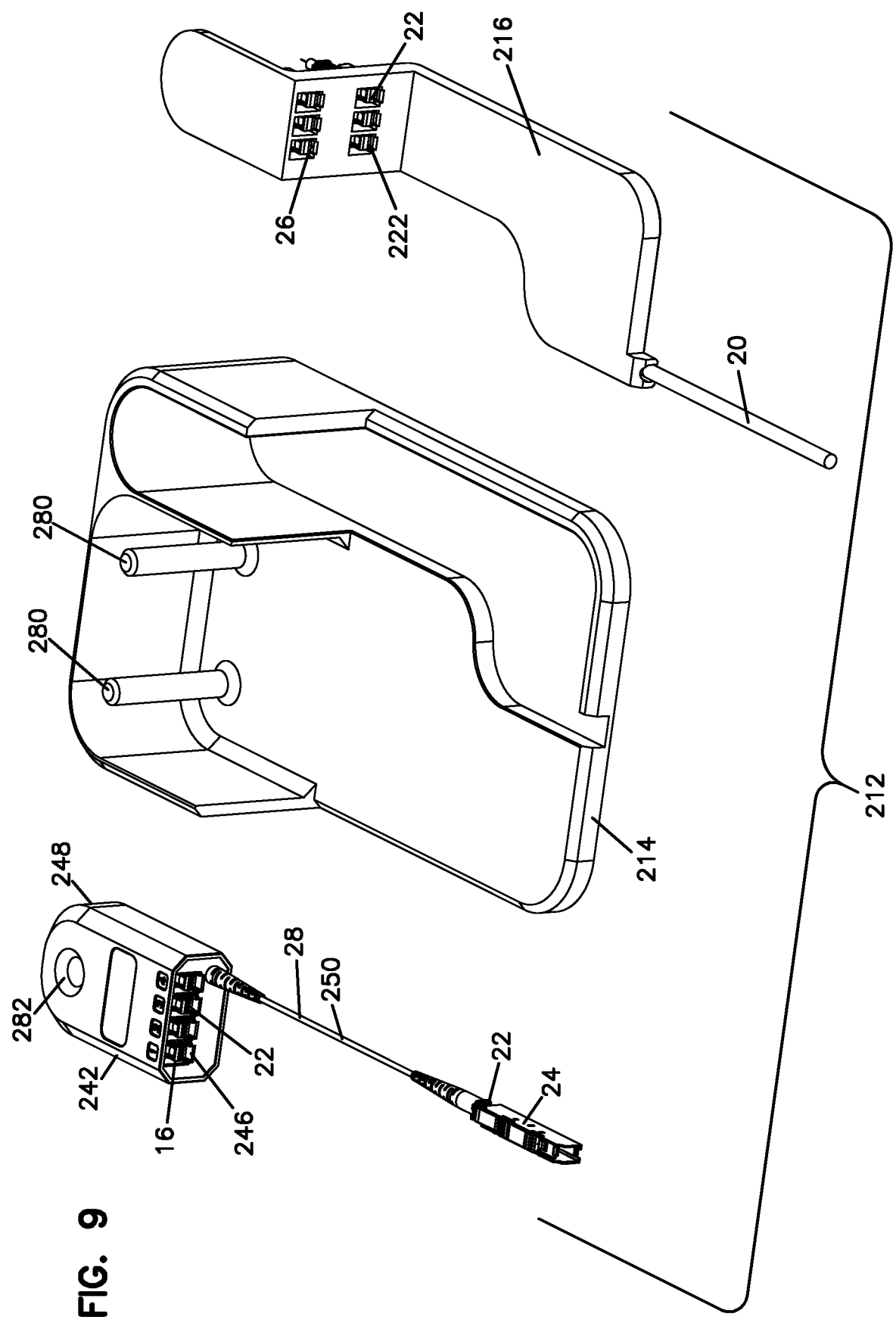
FIG. 9 shows an exploded view of the distribution box of FIG. 5, showing one splitter, and a feeder termination plate separated from a base.
Figure 10:
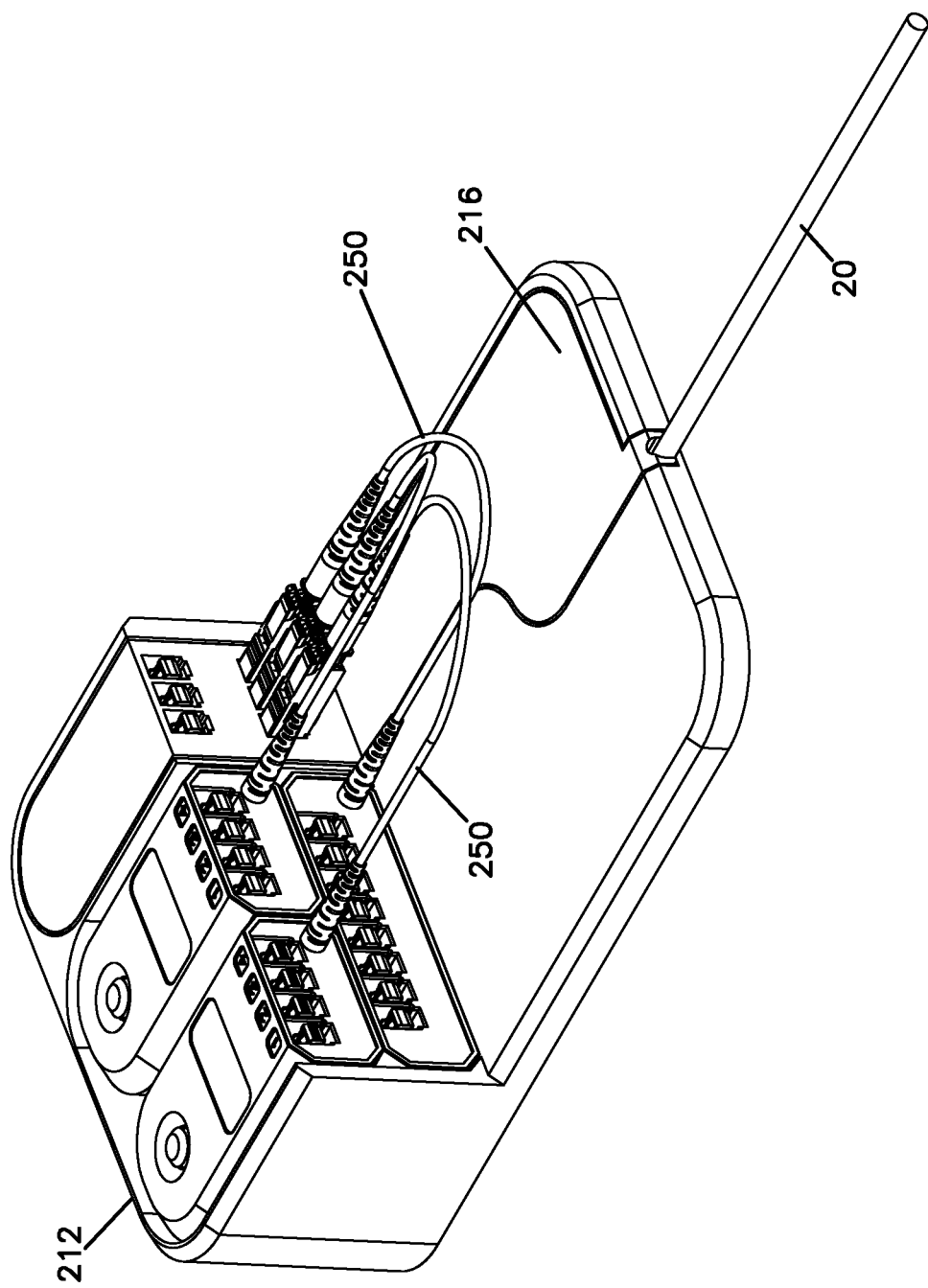
FIG. 10 shows a similar distribution box as in FIG. 5, showing two 1×4 splitters and one 1×8 splitter connected to feeder terminations.
Figure 13:
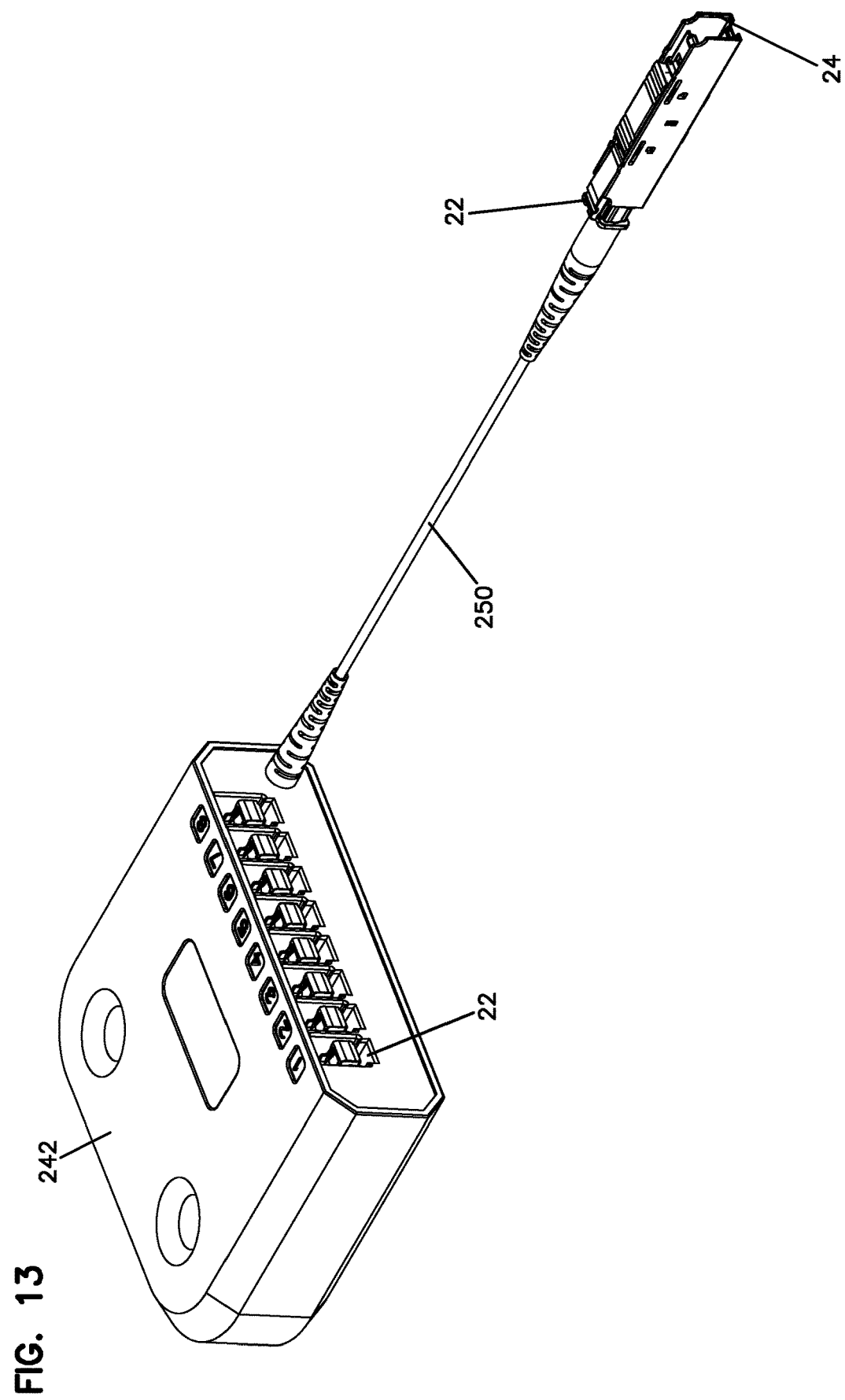
FIG. 13 shows a 1×8 splitter for use in the distribution box of FIGS. 5-10.
Figure 14:
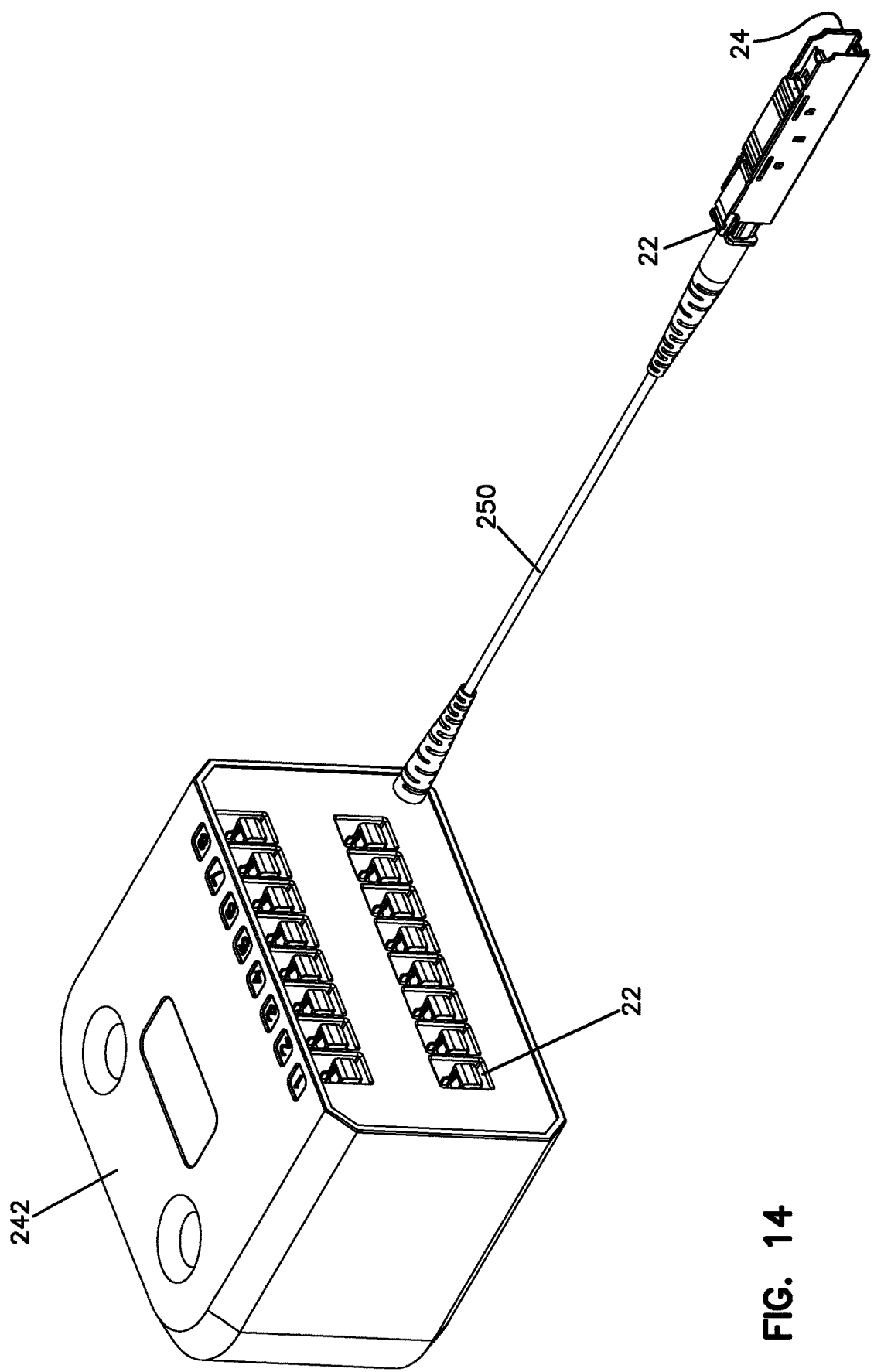
FIG. 14 shows a 1×16 splitter for use in the distribution box of FIGS. 5-10.
Figure 15:
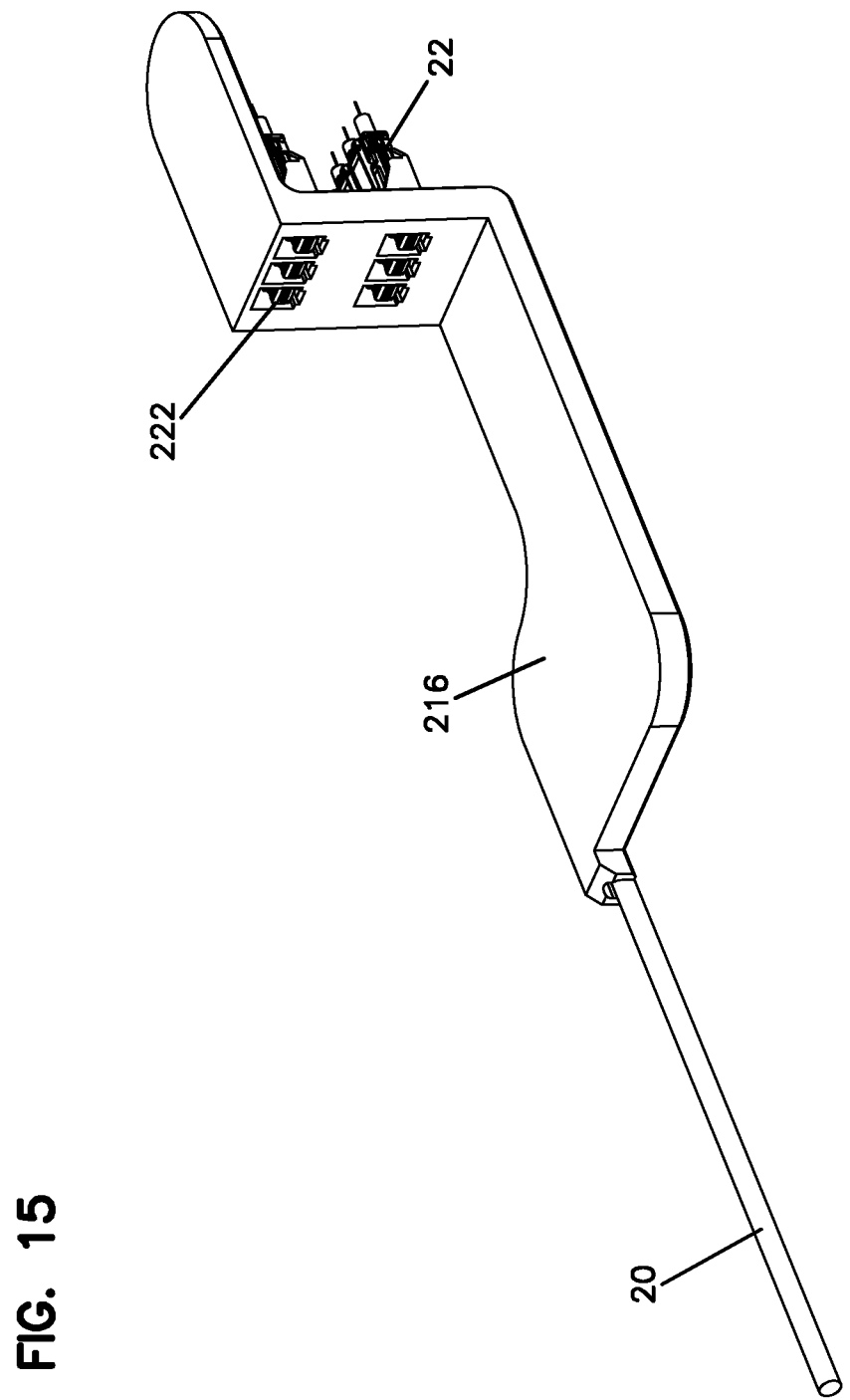
FIG. 15 shows a perspective view of the feeder termination plate of the distribution box of FIG. 5.
Figure 16:
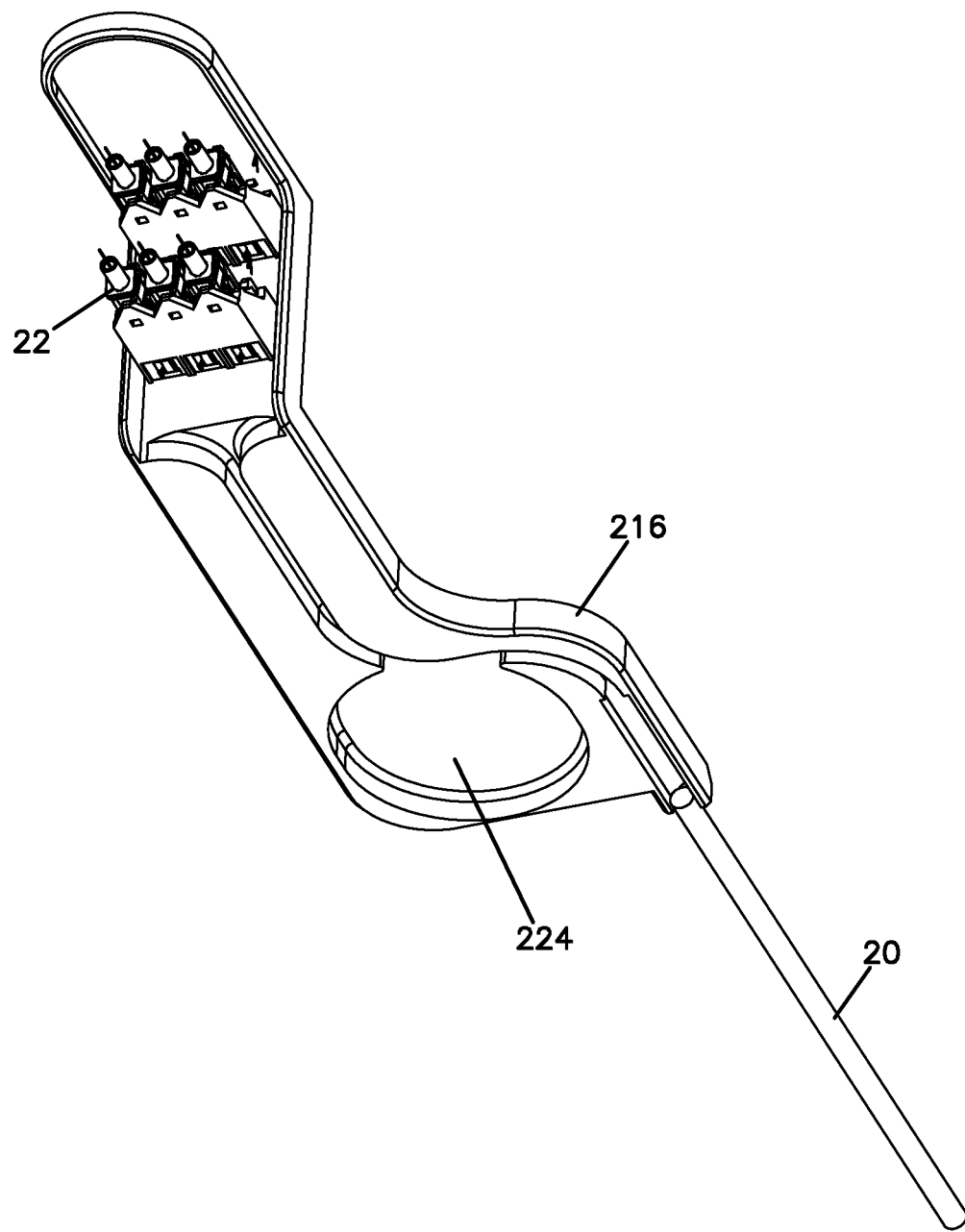
FIG. 16 shows an alternative perspective view of the feeder termination plate.
Figure 18:
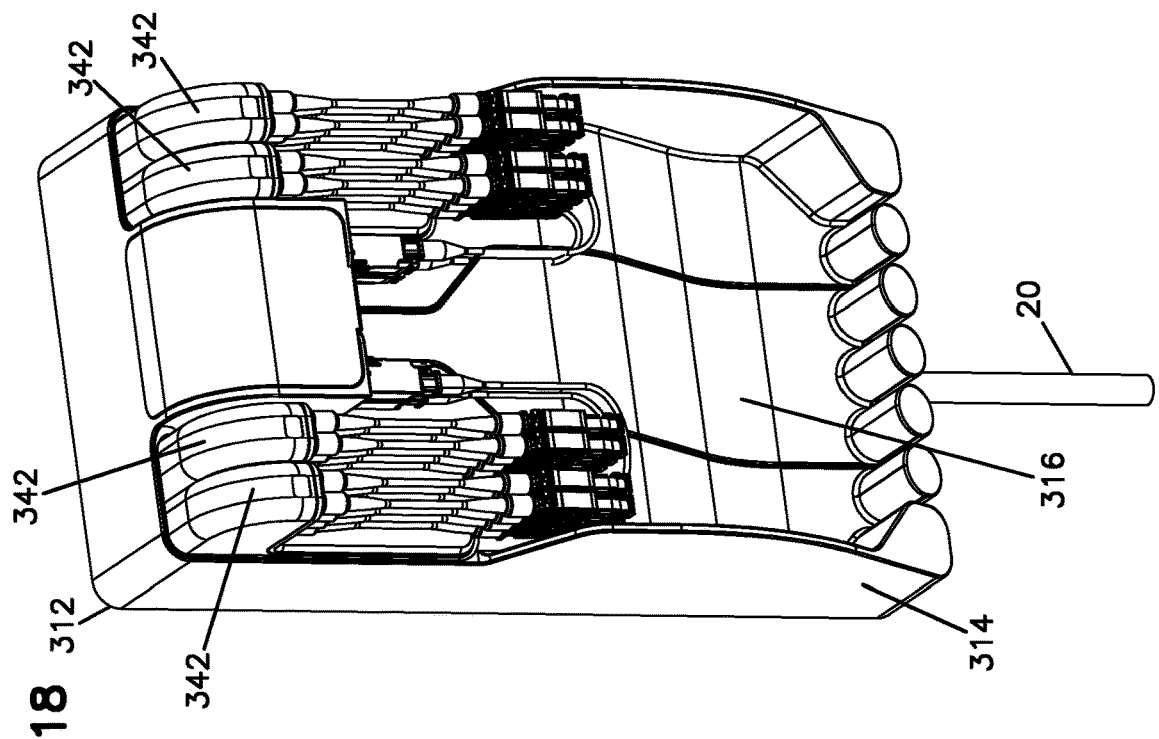
FIG. 18 shows a distribution box similar to the distribution box of FIG. 17, including four 1×8 splitters.
Figure 17:
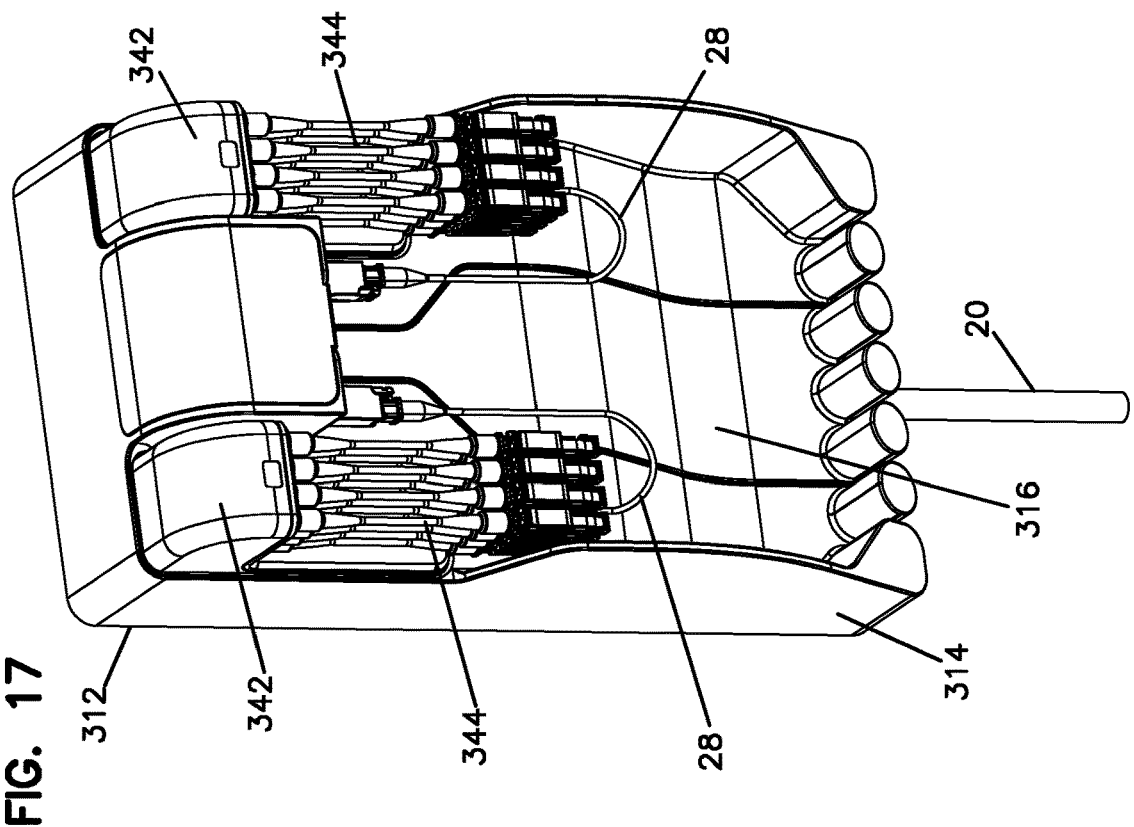
FIG. 17 shows another embodiment of a distribution box in perspective view including two 1×16 splitters and splitter output pigtails.
Figure 19:
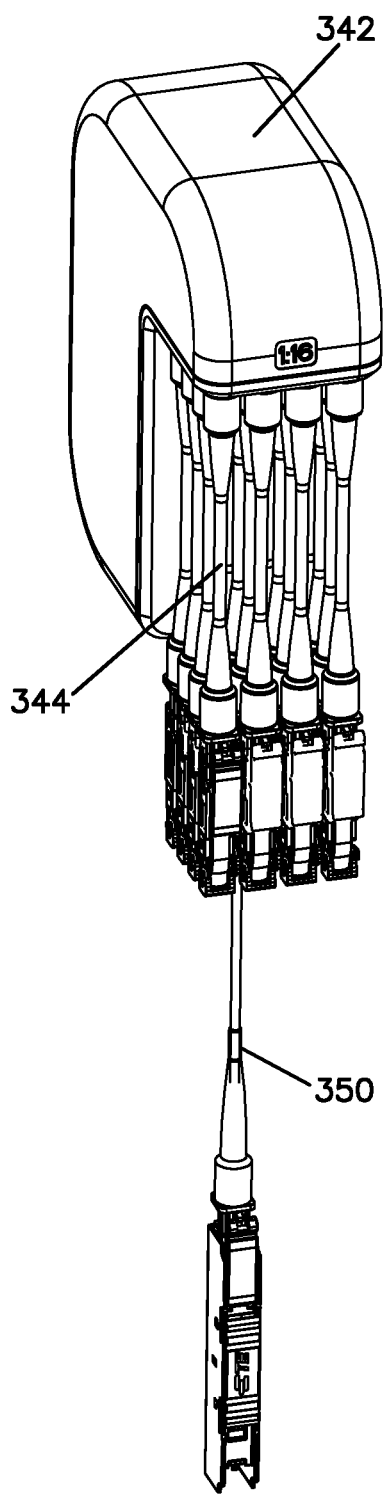
FIG. 19 shows one of the 1×16 splitters of the distribution box of FIG. 17.
Figure 20:
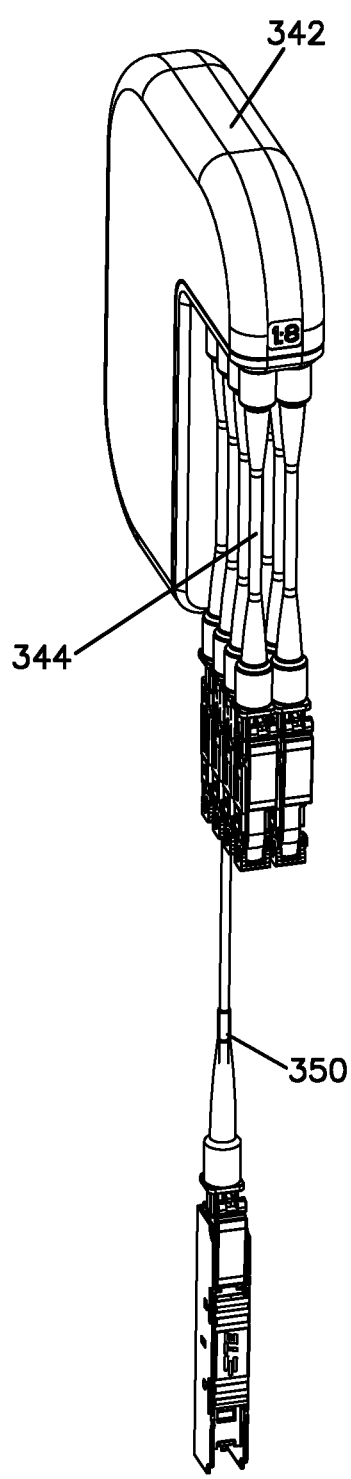
FIG. 20 shows one of the 1×8 splitters of the distribution box of FIG. 18.
Figure 21:
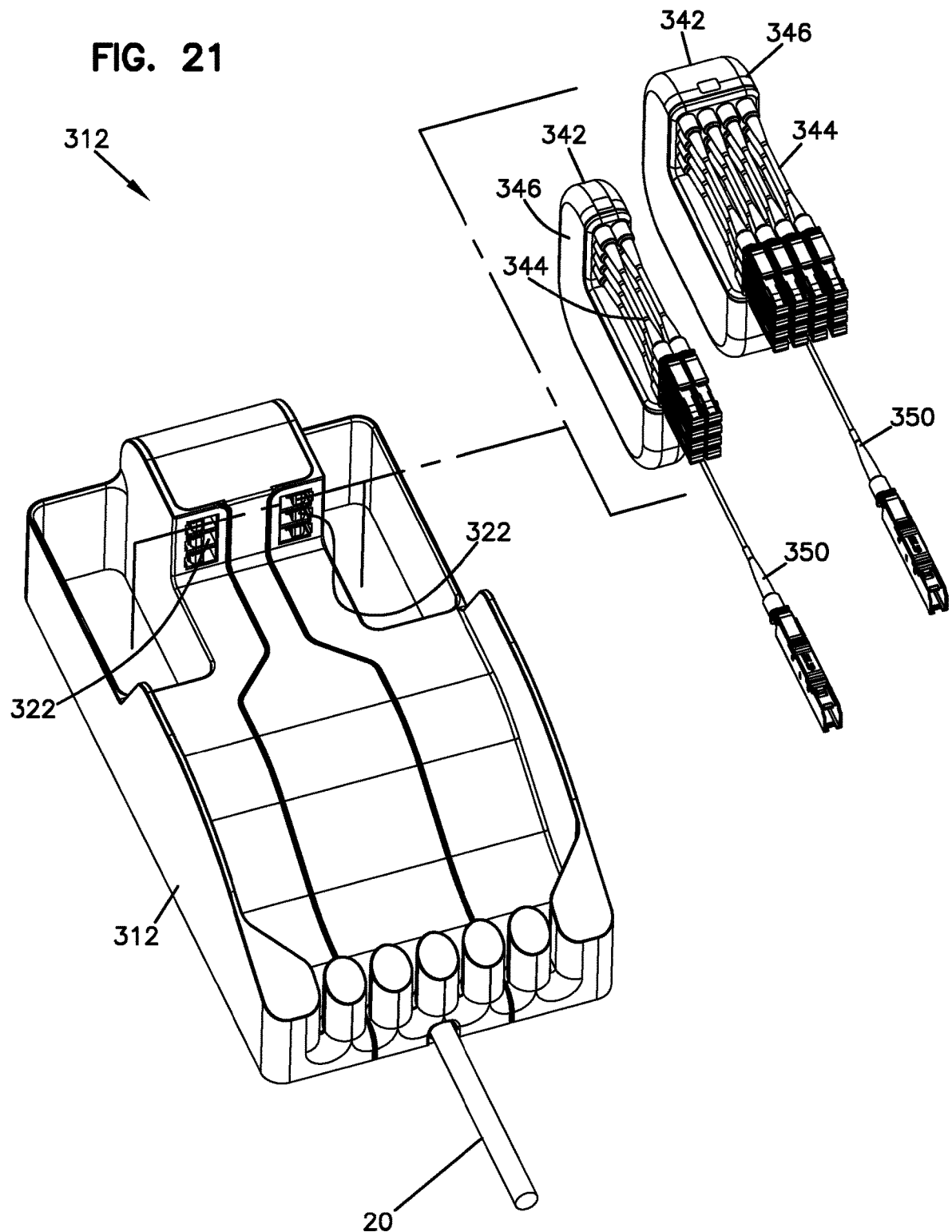
FIG. 21 shows the distribution box with the a 1×8 splitter and a 1×16 splitters removed.
Figure 22:
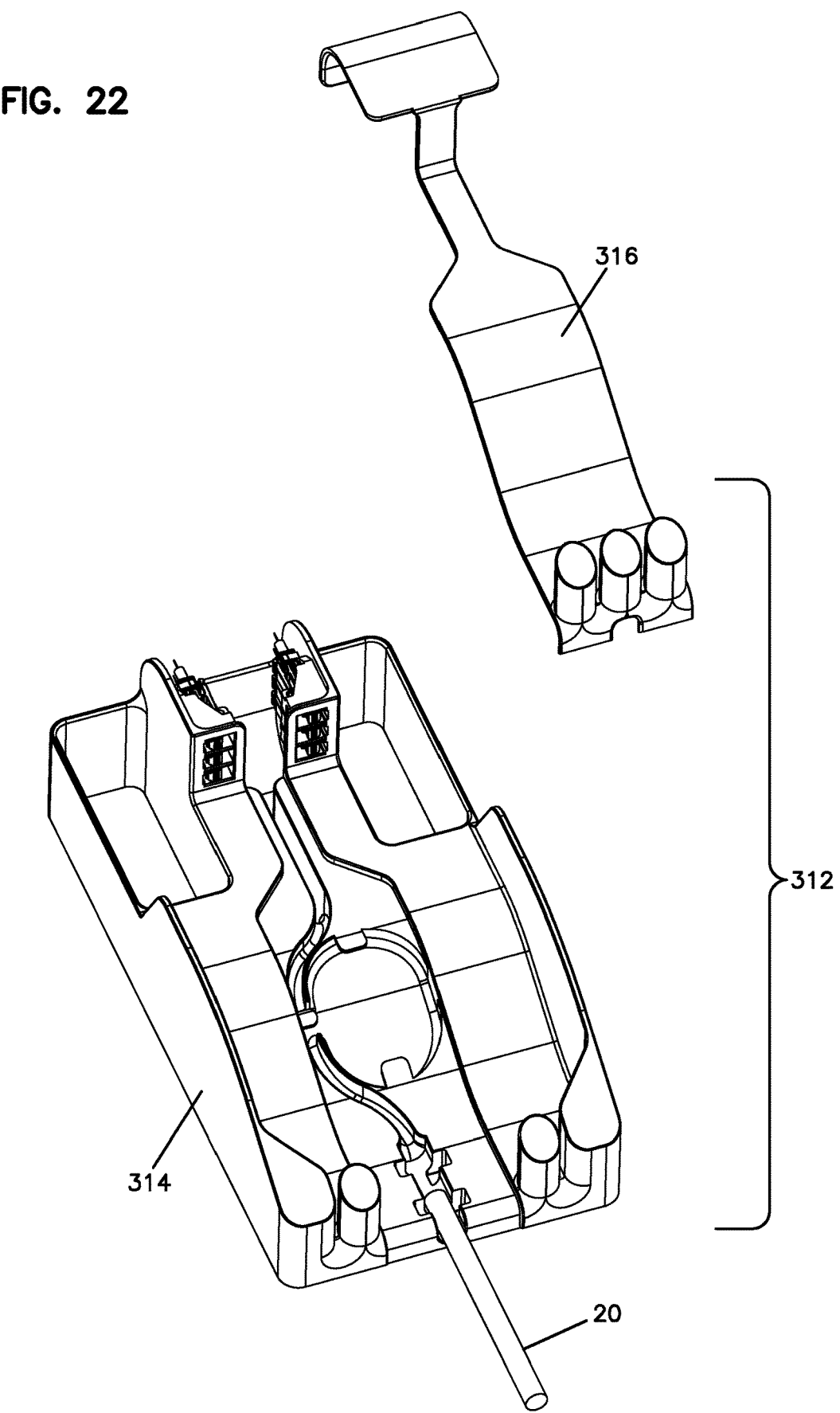
FIG. 22 shows an exploded perspective view with a termination feeder cover removed from a base.
Figure 23:
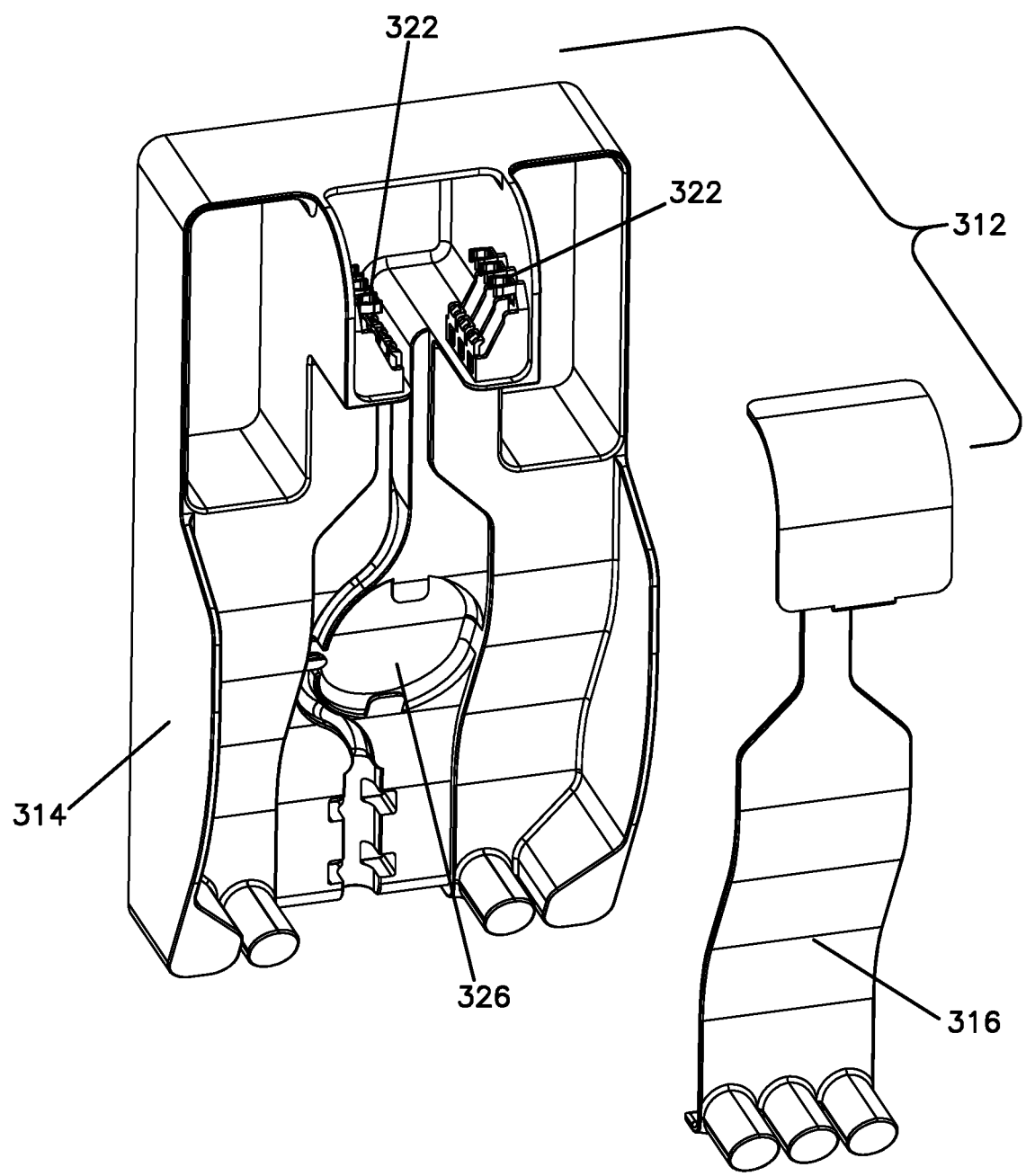
FIG. 23 shows a further perspective view of the exploded view of FIG. 22.
Figure 24:
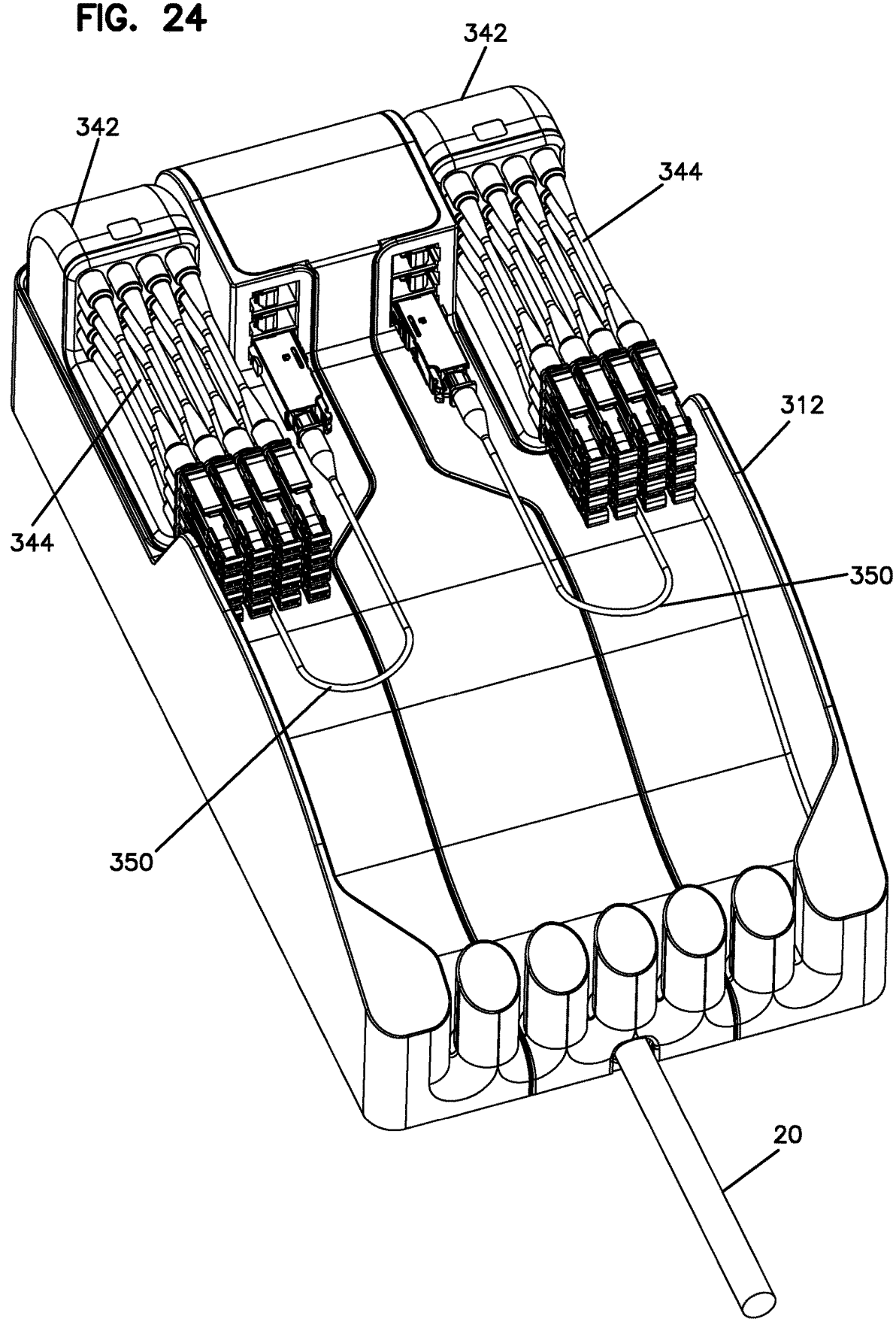
FIG. 24 shows an alternative perspective view to the view of FIG. 17.
Figure 25:
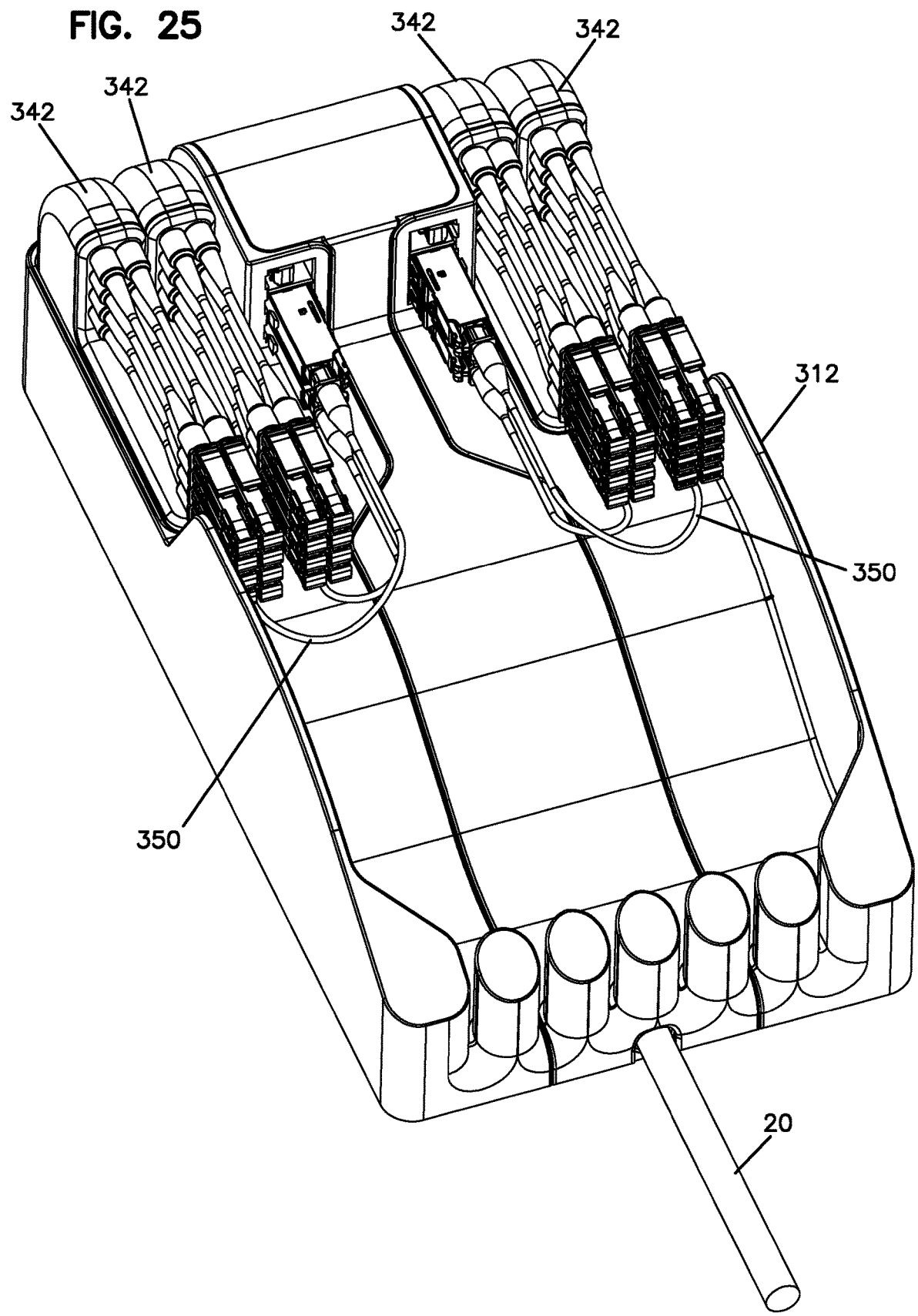
FIG. 25 shows an alternative perspective view to the view of FIG. 18.
Figure 26:
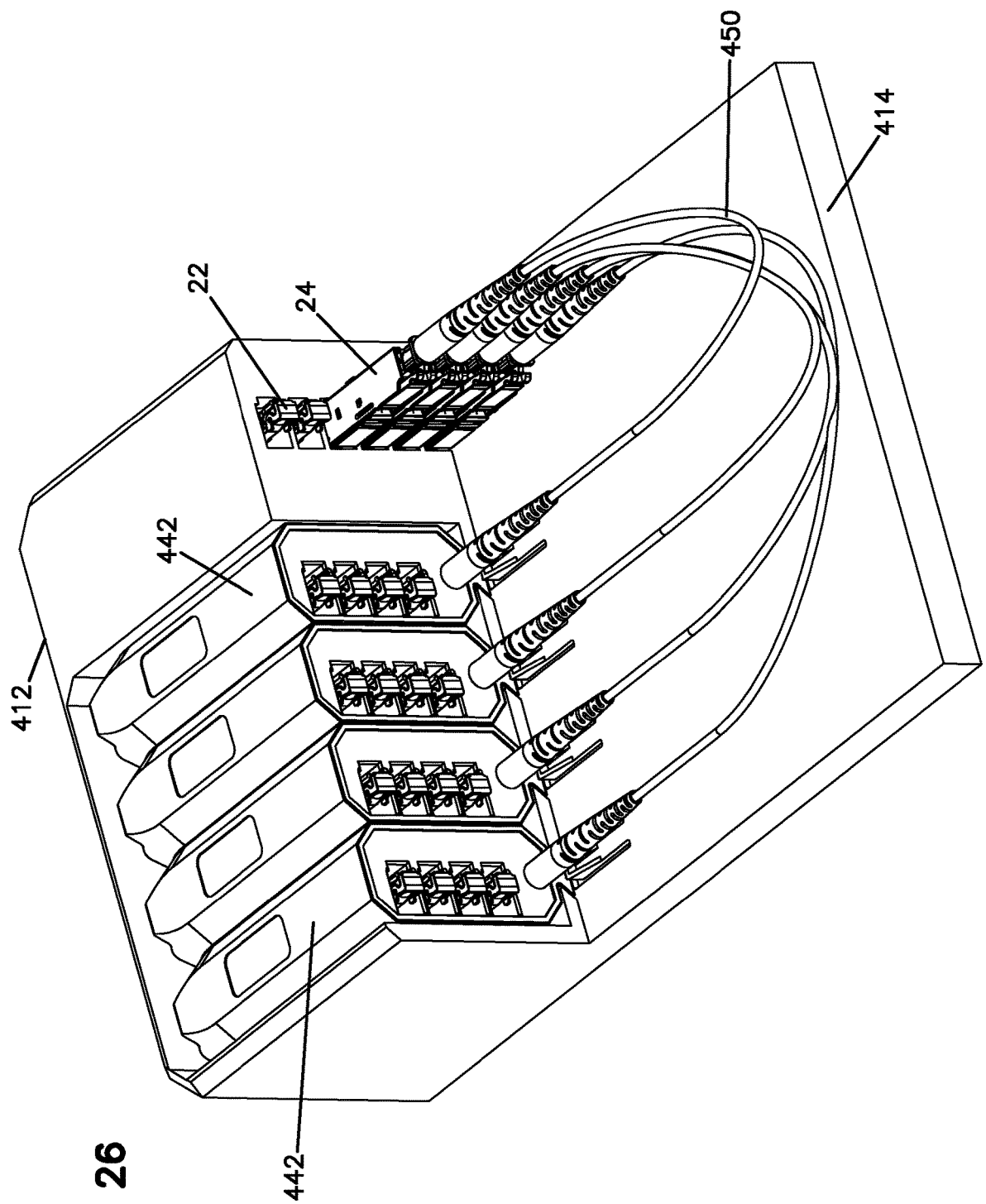
FIG. 26 shows a perspective view of another embodiment of a distribution box including four 1×4 splitters.
Figure 27:
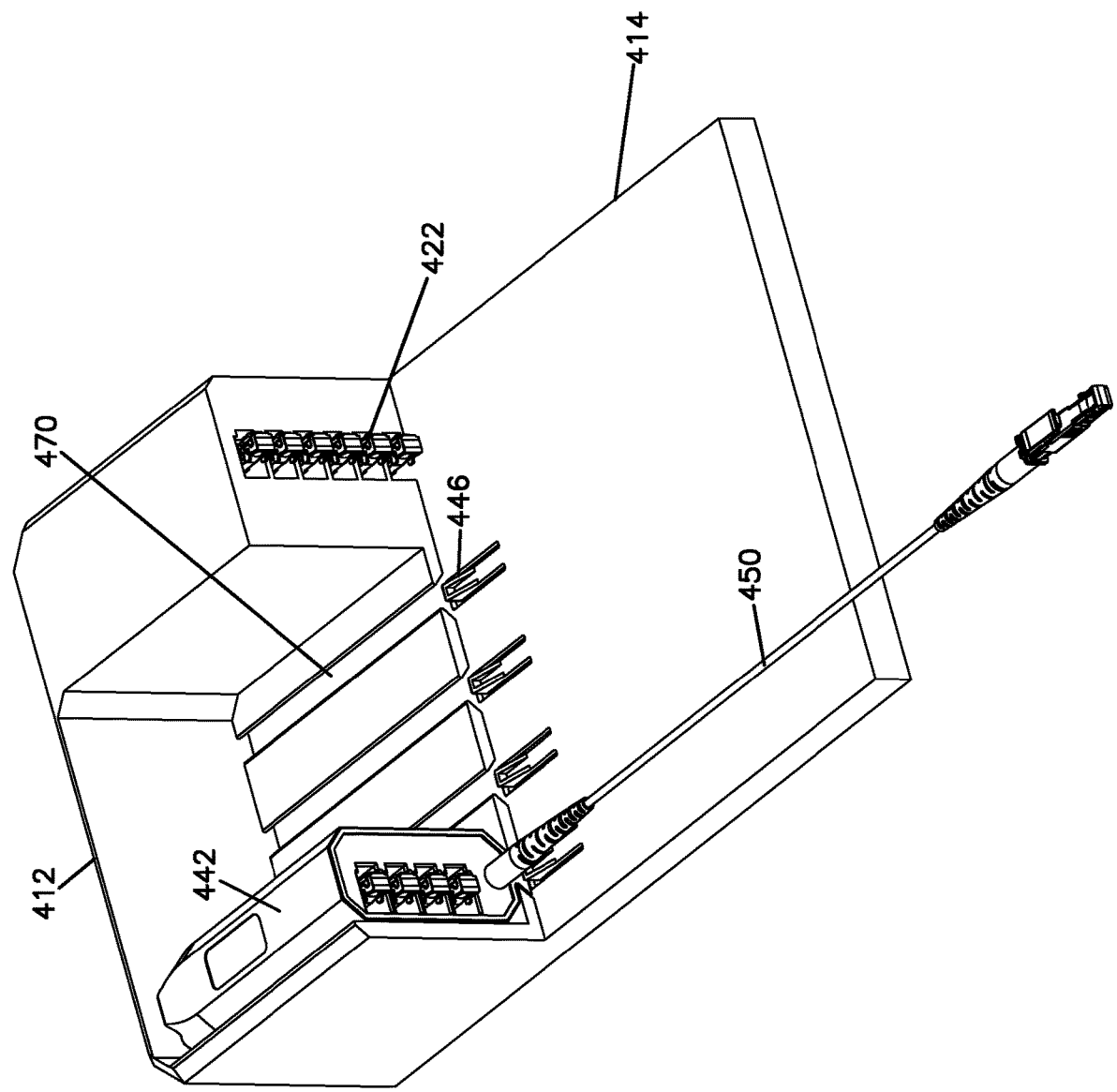
FIG. 27 shows the distribution box of FIG. 26, with three splitters removed.
Figure 28:
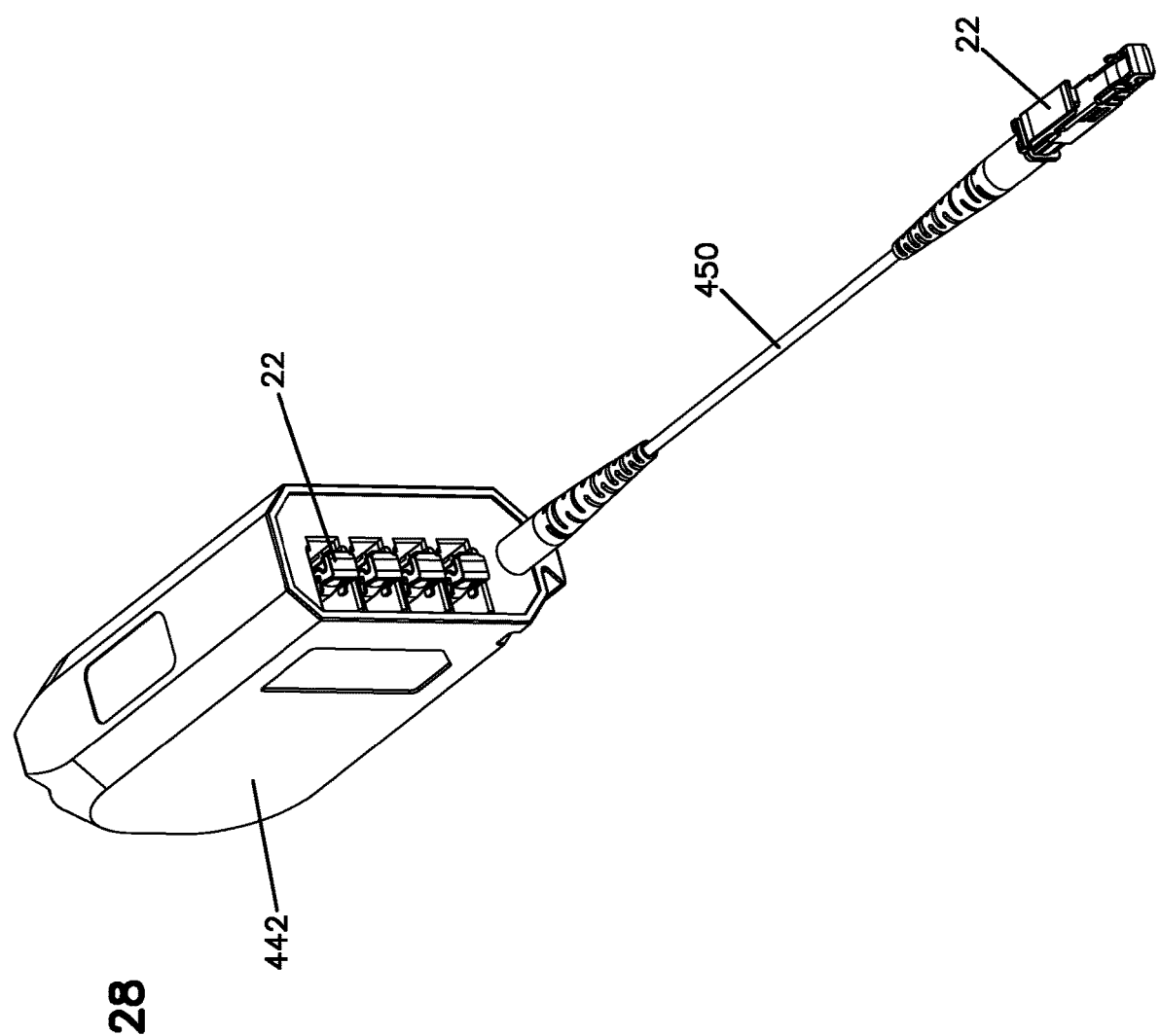
FIG. 28 shows a perspective view of one of the splitters of FIGS. 26 and 27.
Figure 29:
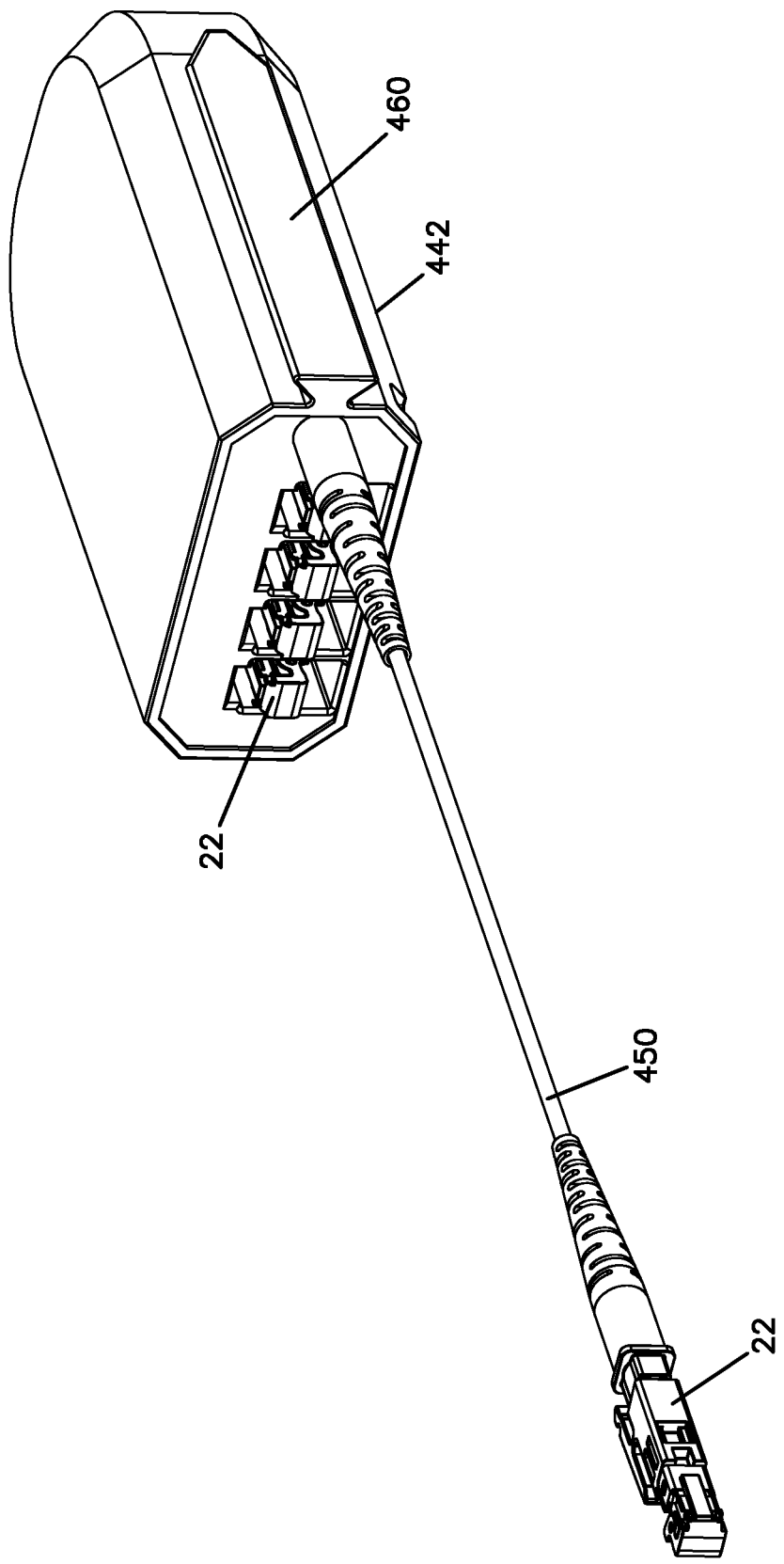
FIG. 29 shows a perspective view of the splitter of FIG. 28 from another orientation.
Figure 30:
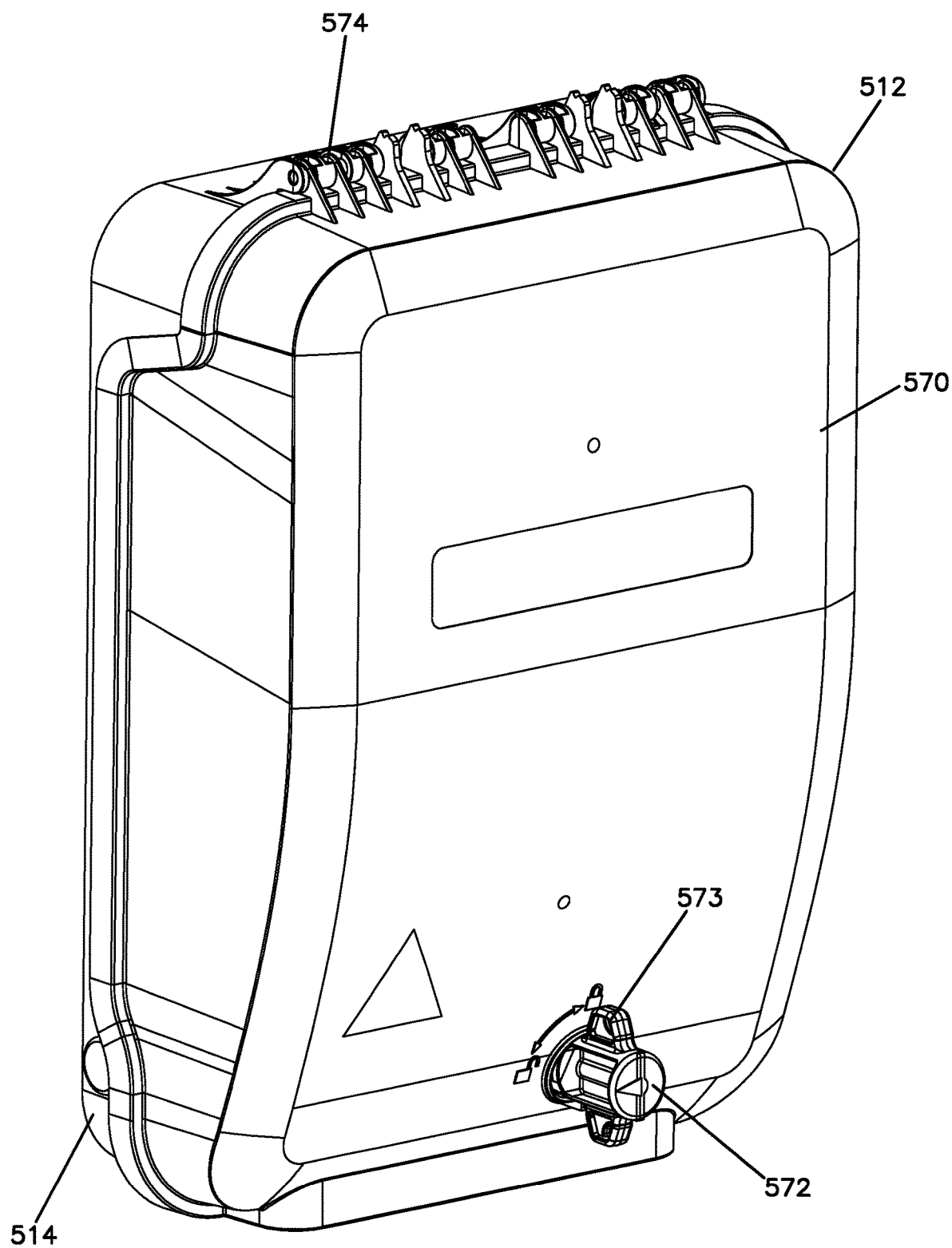
FIG. 30 shows in perspective view another embodiment of a distribution box.
Figure 31:
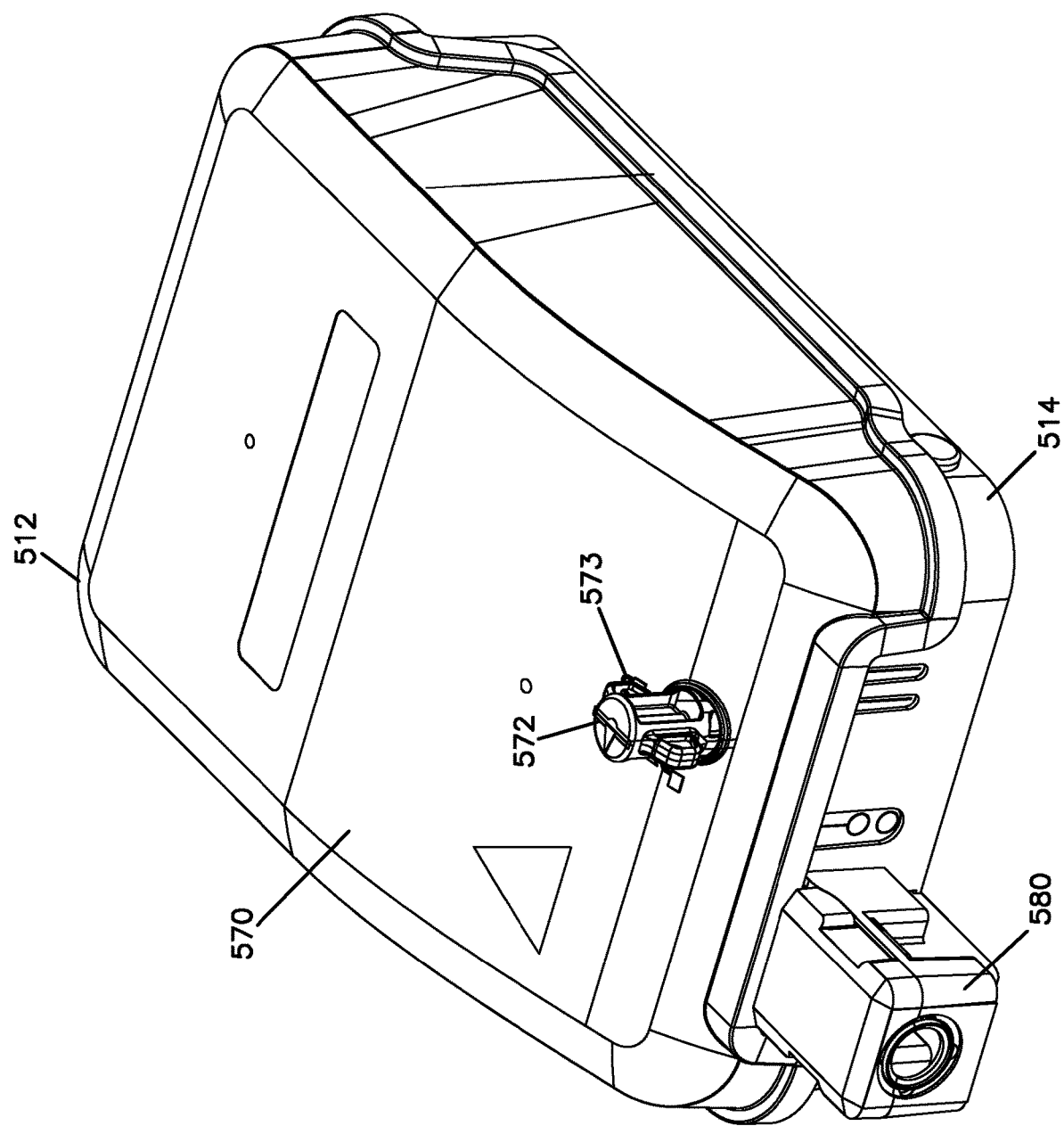
FIG. 31 shows a further perspective view of the distribution box of FIG. 30 and including an outgoing fiber box and tube holder.
Figure 32:
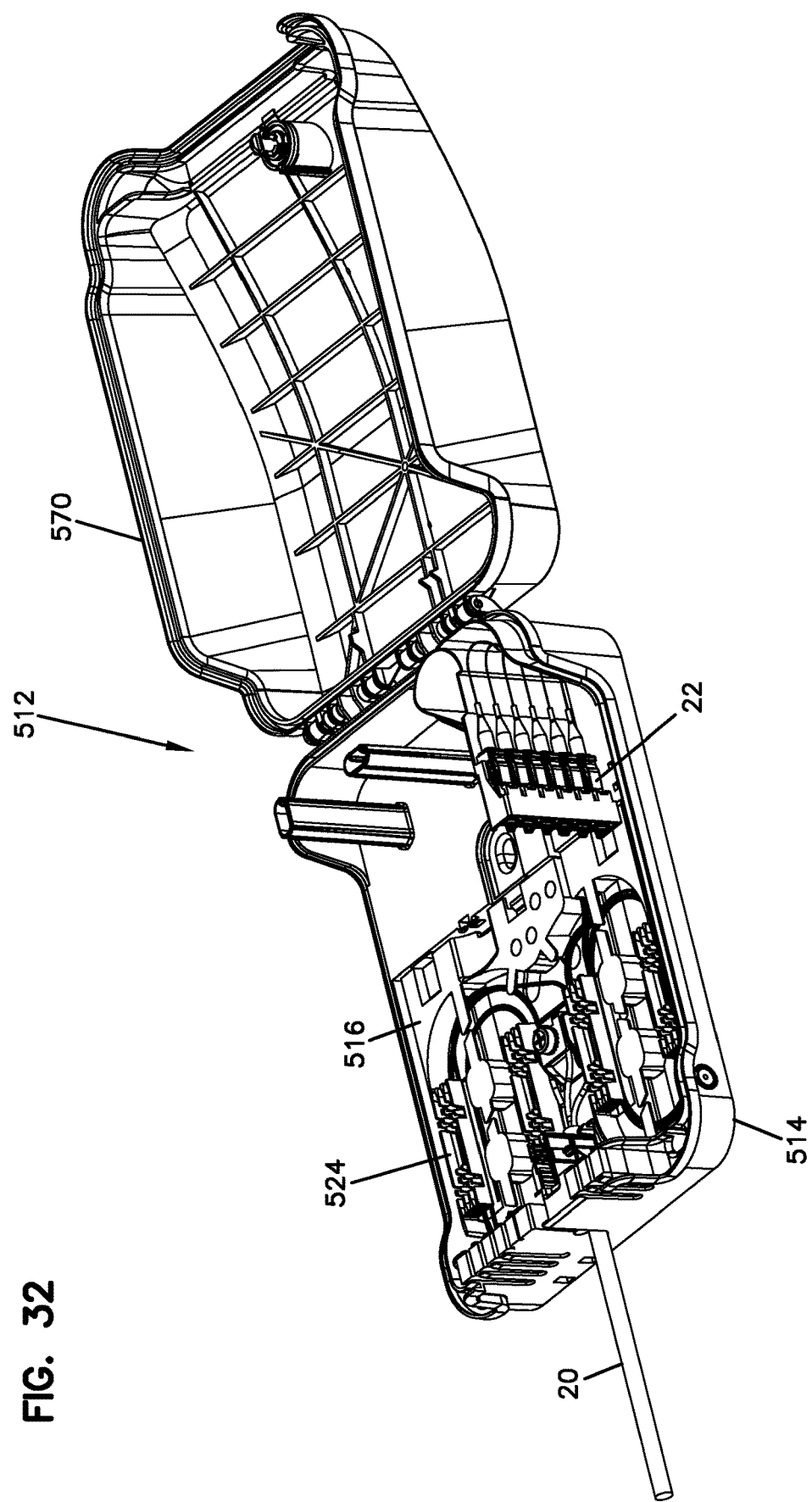
FIG. 32 shows the distribution box of FIG. 30, with the cover in an open position after being rotatably moved, and showing the internal feeder cabling.
Figure 33:
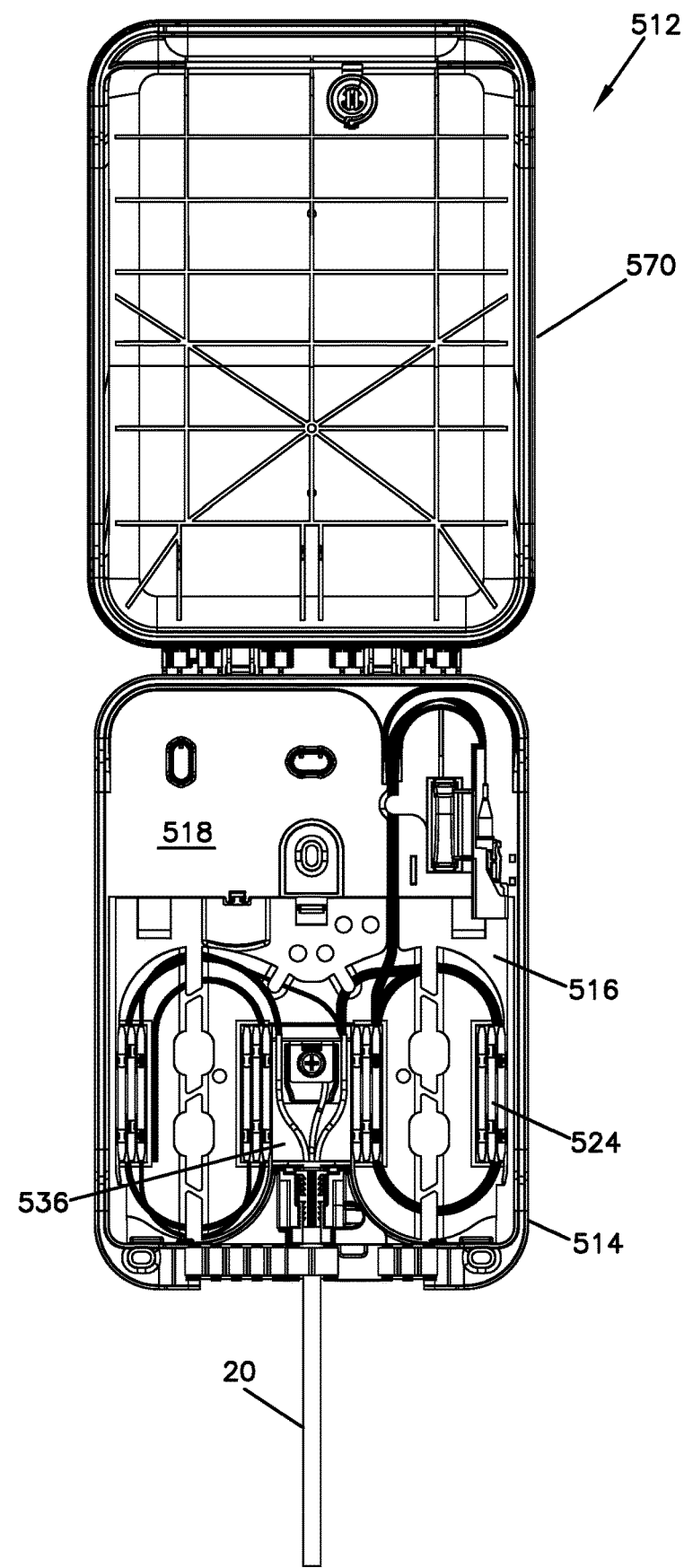
FIG. 33 shows a front view of the distribution box of FIG. 32.
Figure 34:
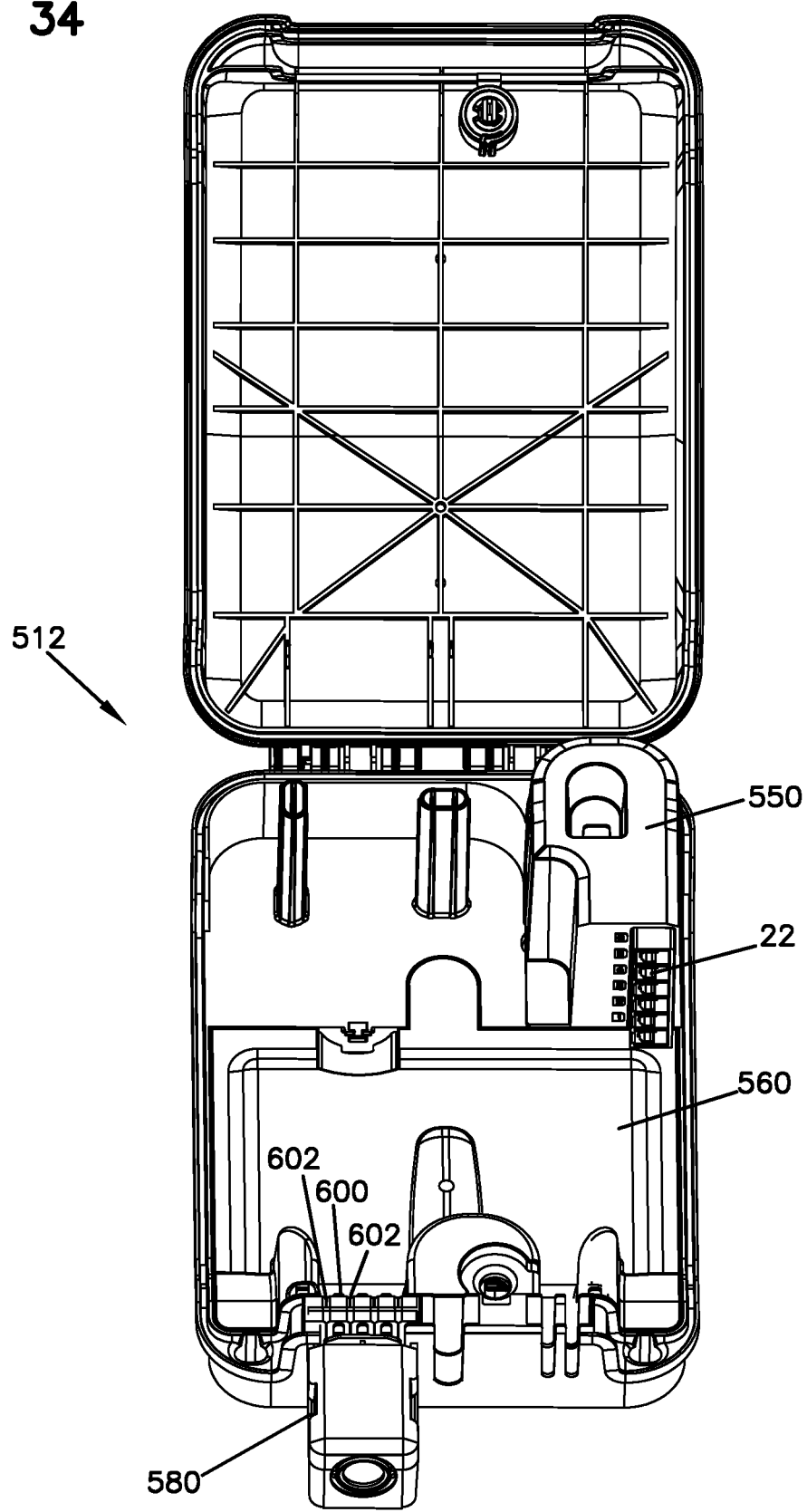
FIG. 34 shows the distribution box of FIGS. 30-33, with various covers in place in the interior, and without the splitters or cables.
Figure 35:
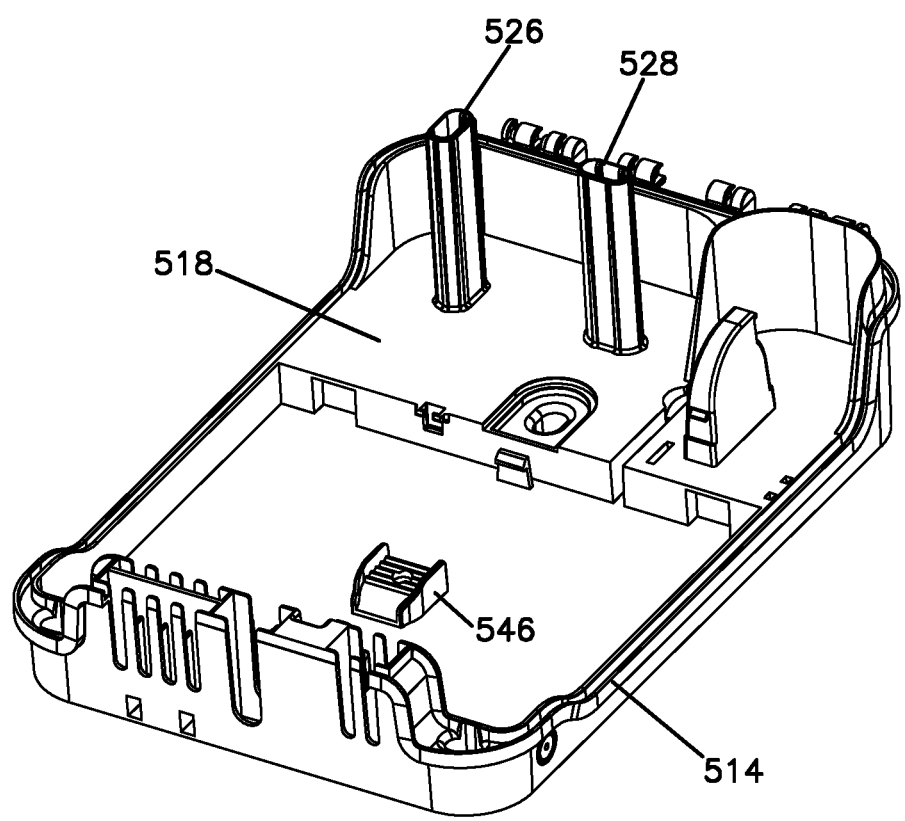
FIG. 35 shows the base of the distribution box of FIGS. 30 and 31.
Figure 36A:
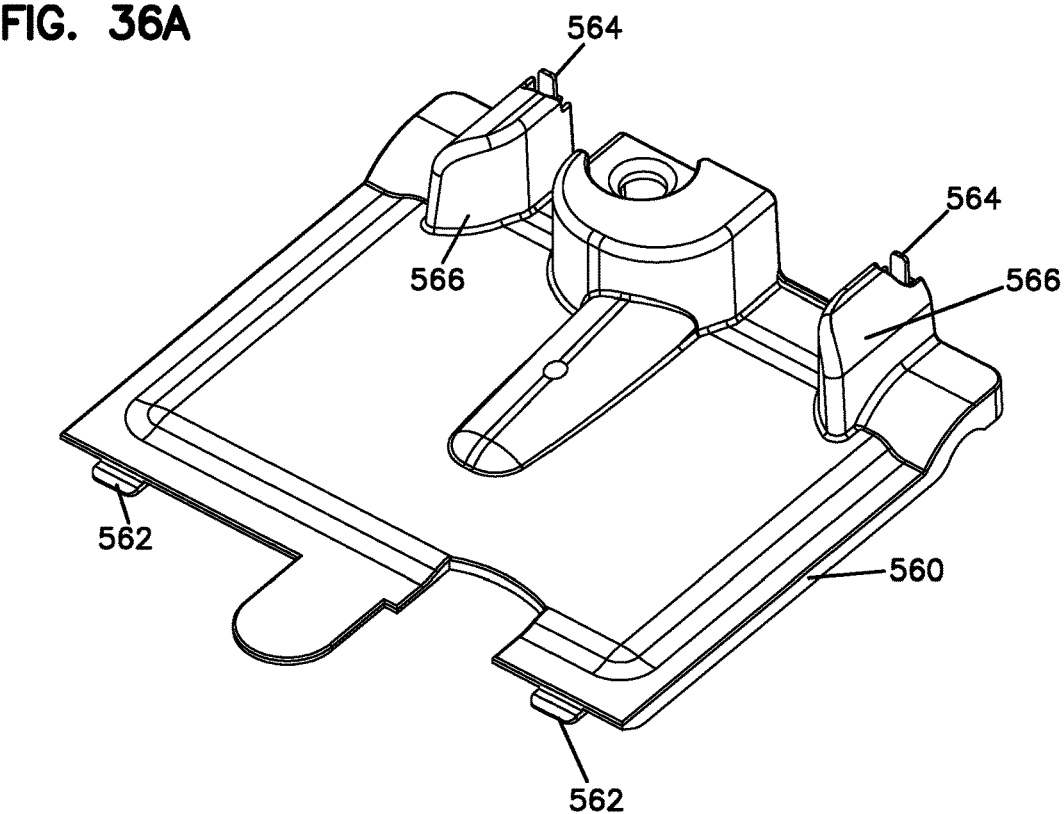
FIGS. 36A and B shows a cover which fits over the slack and splice area on the base of FIG. 35.
Figure 36B:
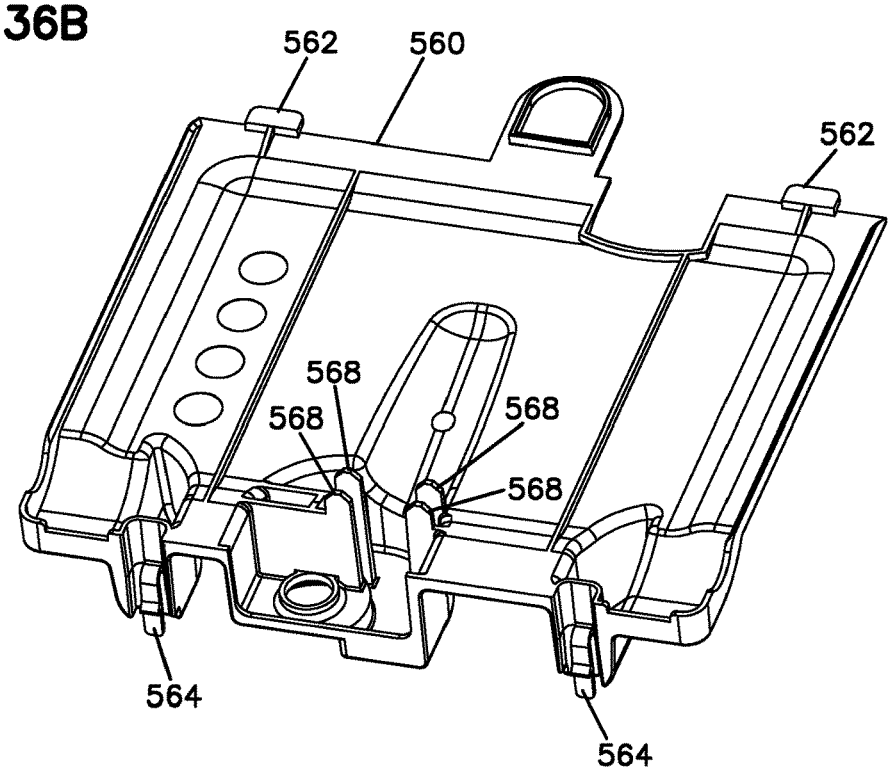
Figure 37:
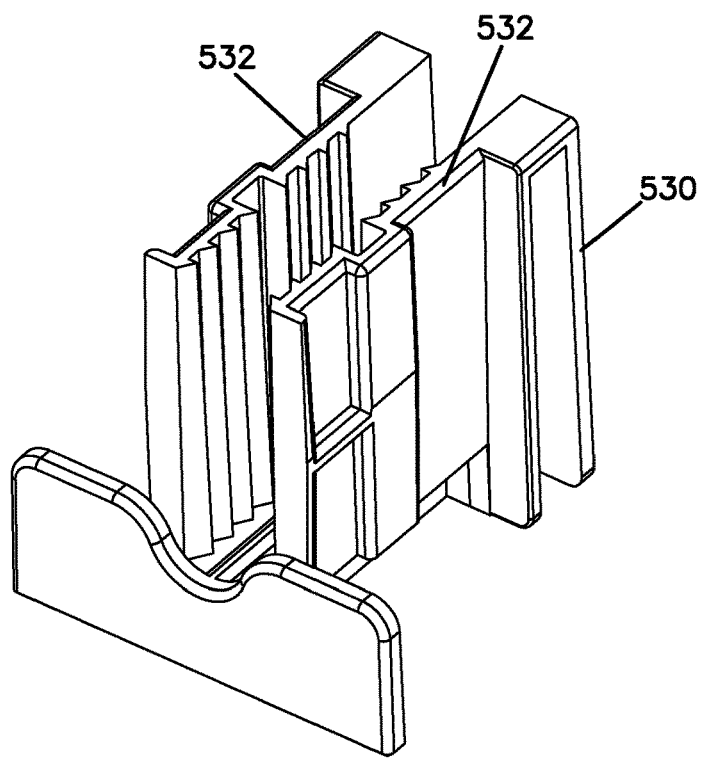
FIGS. 37 and 38 show a feeder cable retention device of the distribution box of FIGS. 30 and 31.
Figure 38:
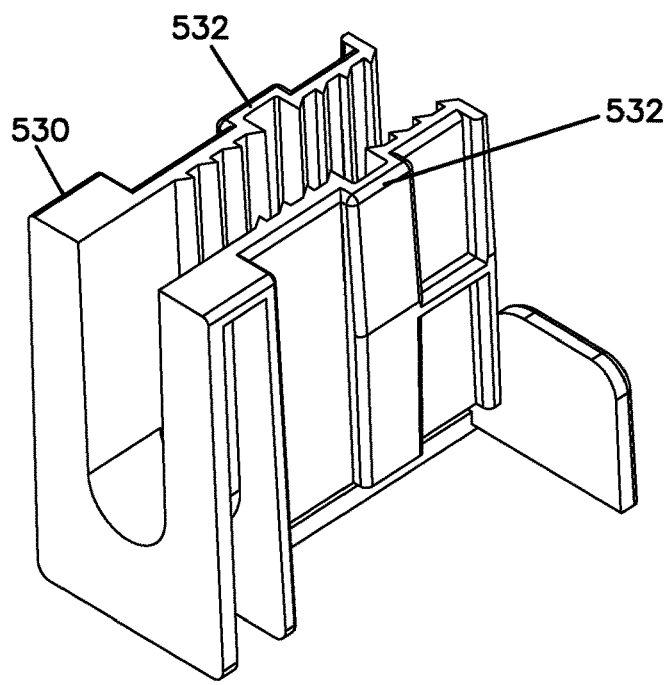
Figure 39:
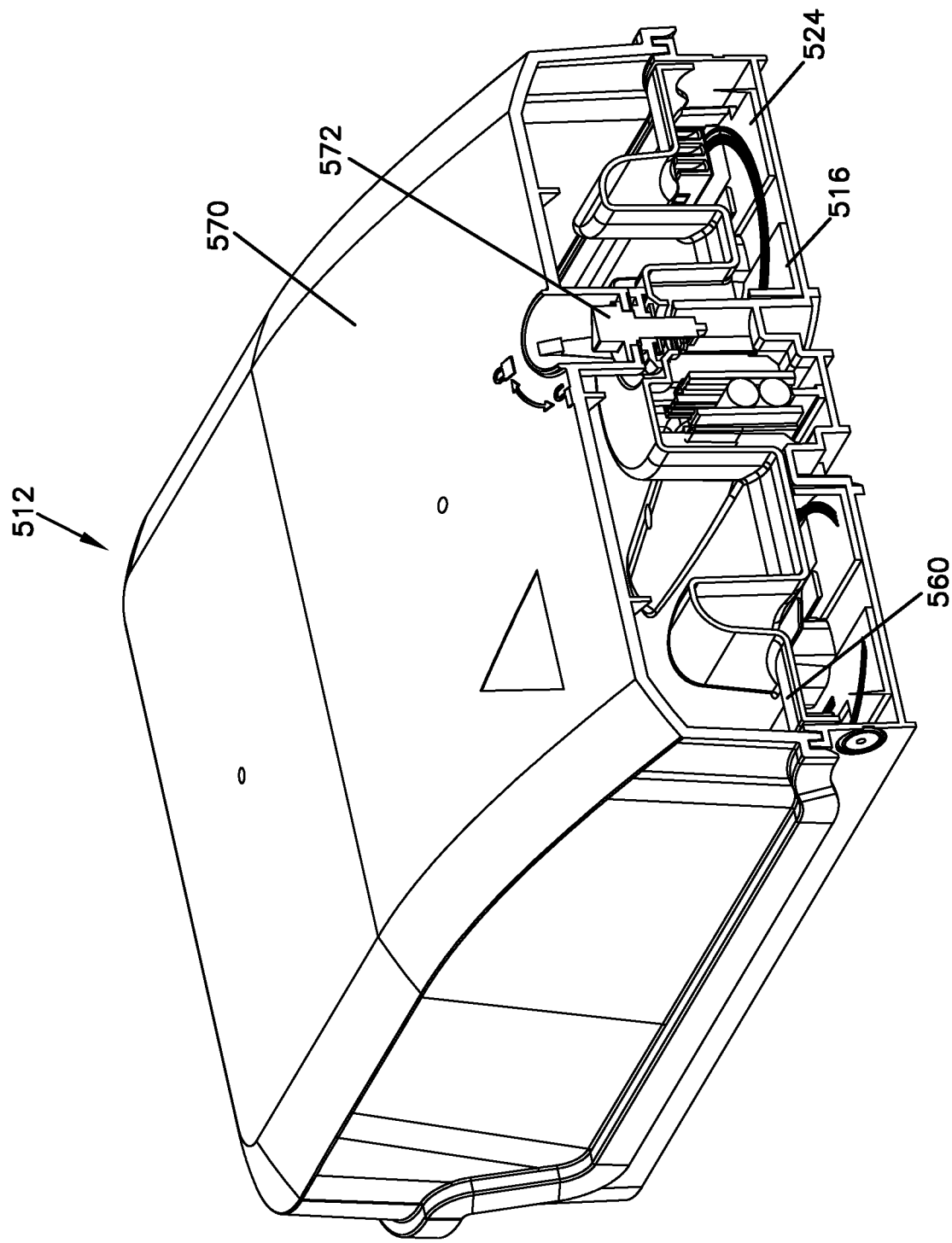
FIG. 39 shows a cross-sectional view through the closed distribution box of FIGS. 30 and 31, showing a portion of the lock which holds the cover to the base.
Figure 40:
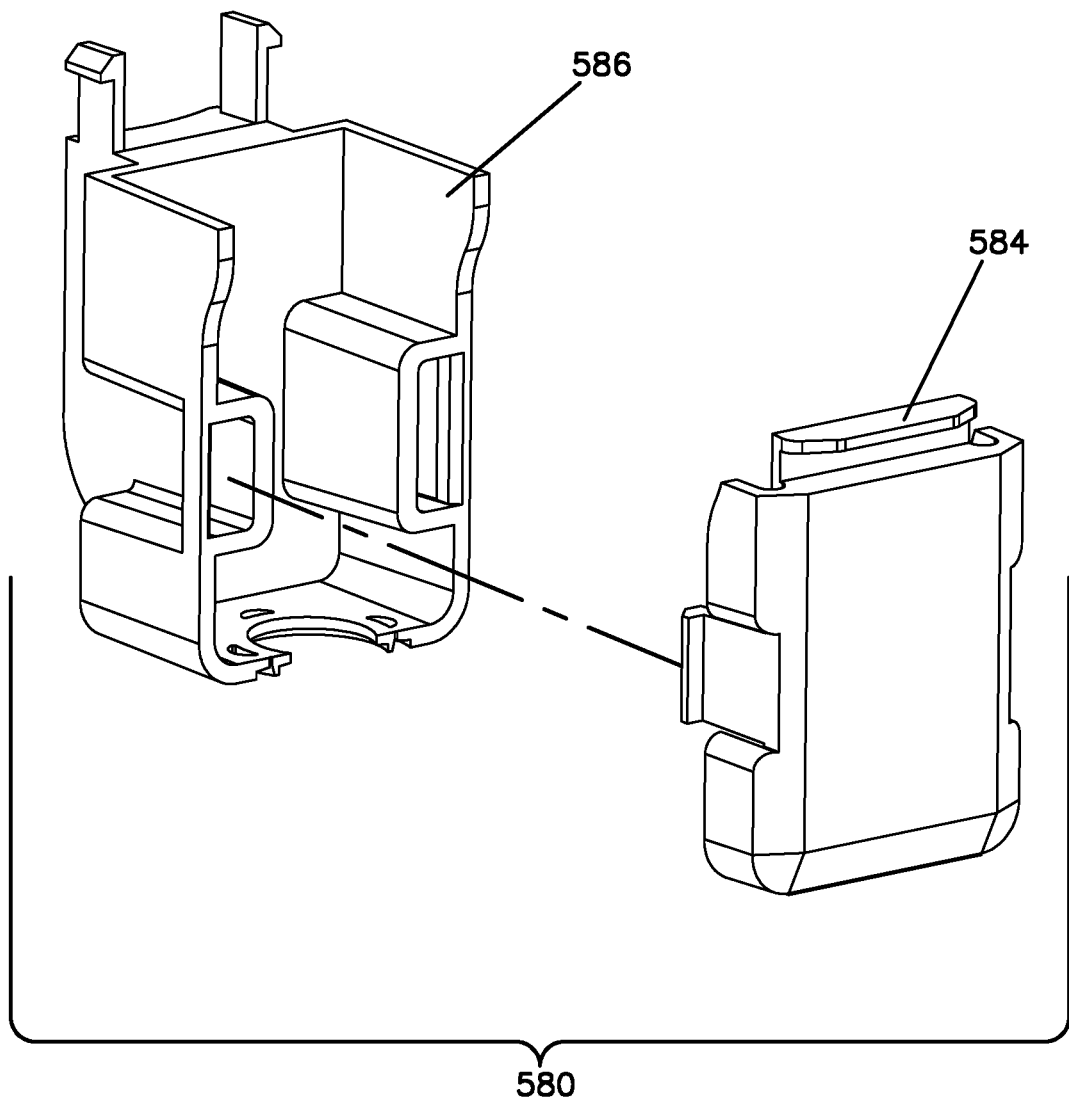
FIG. 40 shows an exploded perspective view of the outgoing cable box of the distribution box of FIG. 30.
Figure 41:
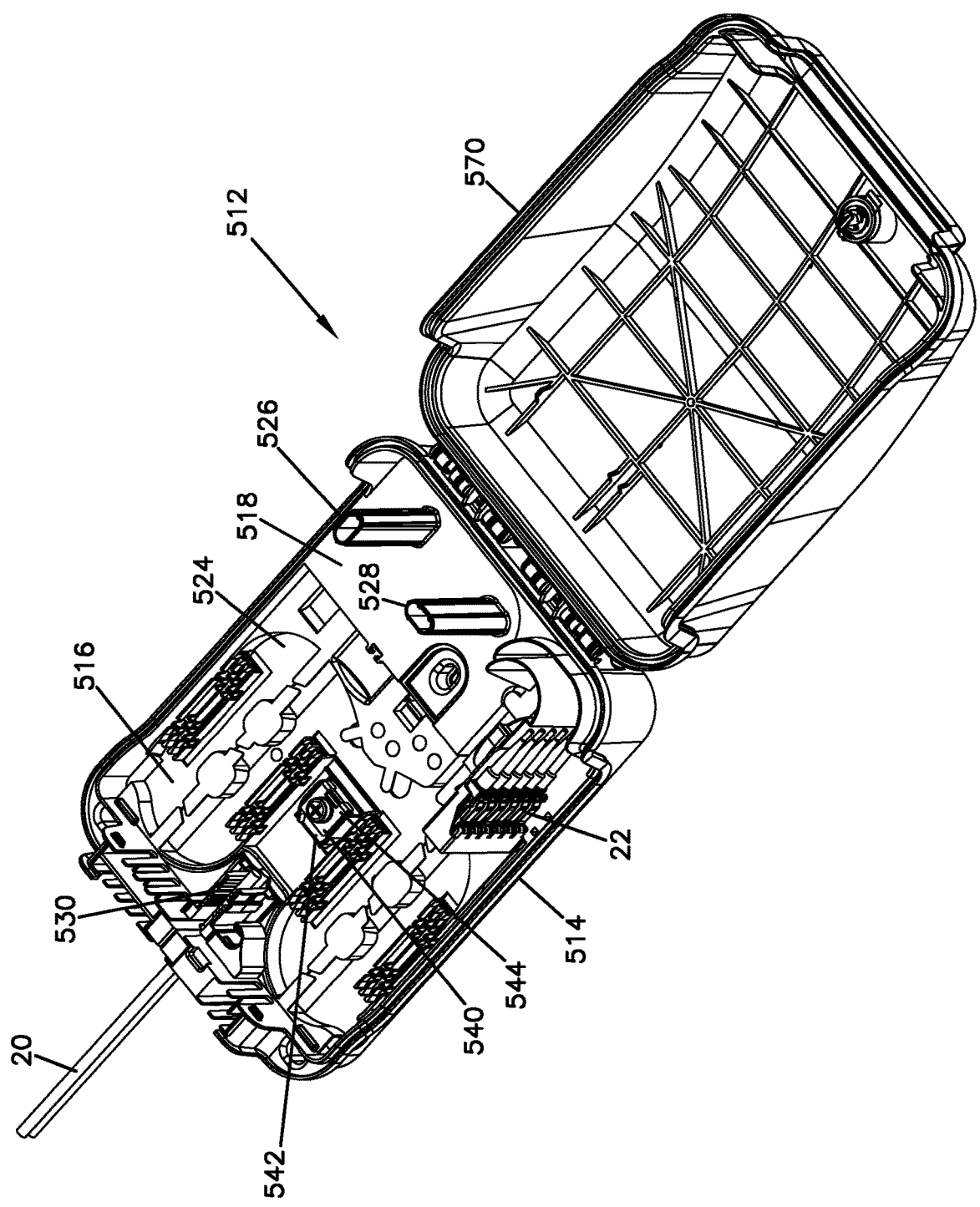
FIG. 41 shows a further perspective view of the interior of the distribution box of FIGS. 30 and 31, without any cables shown in the box.
Figure 42:
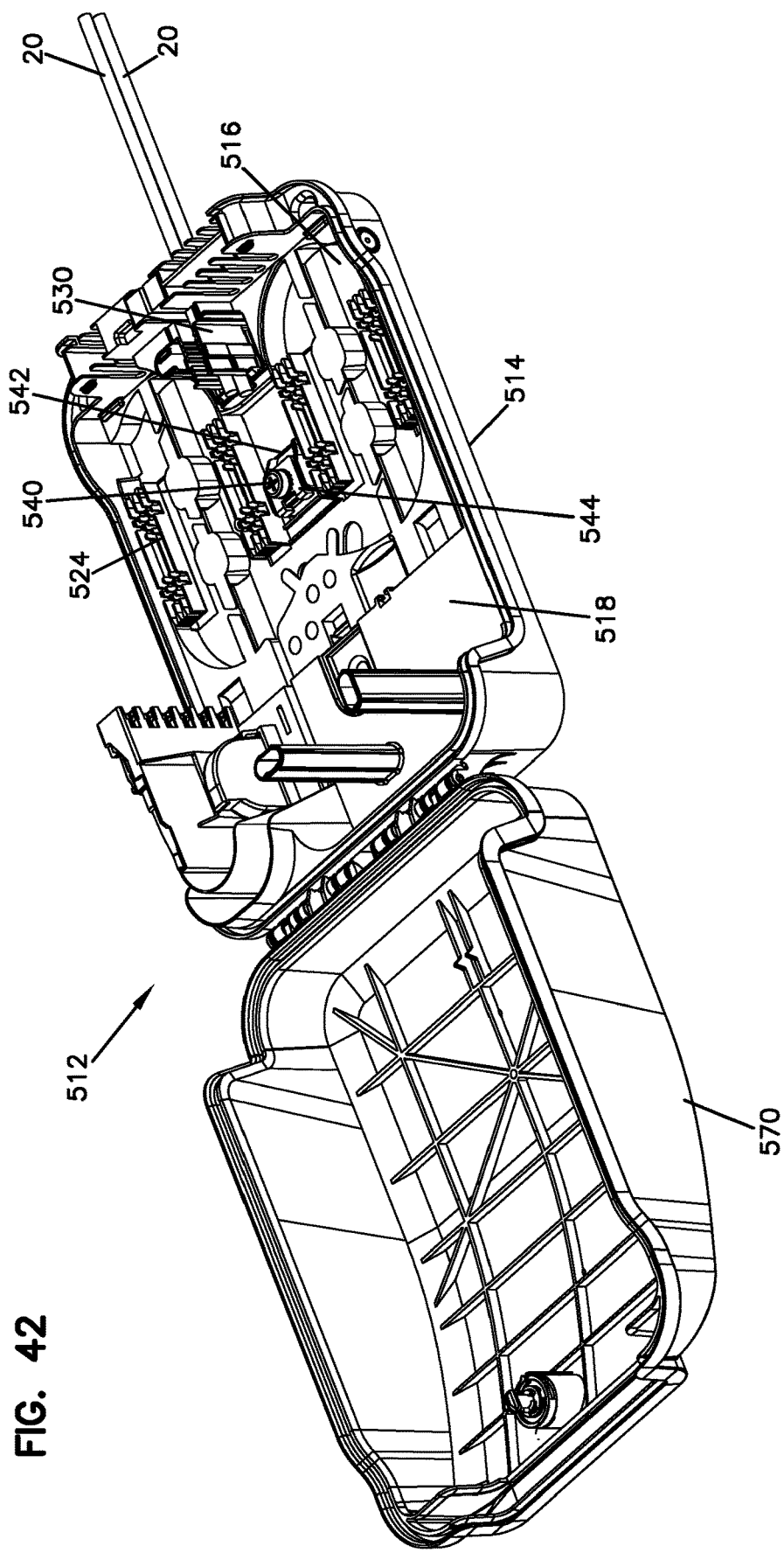
FIG. 42 shows an another view of the distribution box of FIG. 41.

As shown in FIG. 4, a second box 113 can be mounted somewhere in the neighborhood and feeder-fibers from un-used bundles/tubes 132 are spliced in box 112 to a feeder-cable 198 which runs to the second box 113. This spliced feeder-stub enters the second box 113 in the same way the feeder 20 enters the first box 112. Feeder terminations 134 of box 113 are used in the arrangement of FIG. 2. Depending on the feeder-cable, more boxes can be connected in a daisy-chaining manner.

The example splitters 142 include a splitter input cable 172 and 174 and multiple outputs formed at the splitter housing. Different lengths of cables 172 and 174 can be provided if necessary. Various examples are shown of different splitter sizes and variations in the number of splitter outputs. As shown, the splitters 142 can have different thicknesses in multiples of T thickness. Each splitter 142 includes one or more holes 182 to receive posts 180 of base 114. The holes can be round or oval, or another shape.

In FIGS. 1-4, splitter 142 includes splitter outputs in the form of connectors 178 mounted at and/or within the splitter housing 144. The splitter input 172, 174 connects to the feeder terminations 122 in the form of connectors 22. The cable stub 172, 174 extending from the splitter housing 144 connectors 22 and adapters 24 disposed at the distal ends of the cable stubs. Adapters 24 can be used instead as the demarcation point for the splitter outputs 16 and/or for the feeder terminations.

FIGS. 5-16 show an alternative distribution box 212 having a base 214 wherein the feeder cable 20 is mounted to a cover 216 along with the feeder terminations 222. Such a construction allows the feeder terminations to be worked on or accessed by a technician separate from the base 214, as desired. Cover 216 includes a cable storage area 224 on a back side of the cover. The example splitters 242 include a splitter input cable 250 and multiple outputs 246 formed at the splitter housing 248. Various examples are shown of different splitter sizes and variations in the number of splitter outputs. As shown, the splitters 242 can have different thicknesses in multiples of T thickness and/or different widths in multiples of W widths. Each splitter 242 includes one or more holes 282 to receive posts 280 of base 114. A cover like cover 170 can be provided.

Referring now to FIGS. 17-25, various embodiments of a distribution box 312 and splitters 342 are shown including the cable stubs 344 extending from the splitter housing 346 to form the splitter outputs. Box 312 includes a base 314 and a middle cover 316 over cable storage area 326 on base 314. Each splitter 342 has a splitter input 350 in the form of a cable. A cover like cover 170 can be provided. The use of a splitter with the fiber stubs for the outputs of the splitter can improve density, and connector and adapter access.

Figure 44:
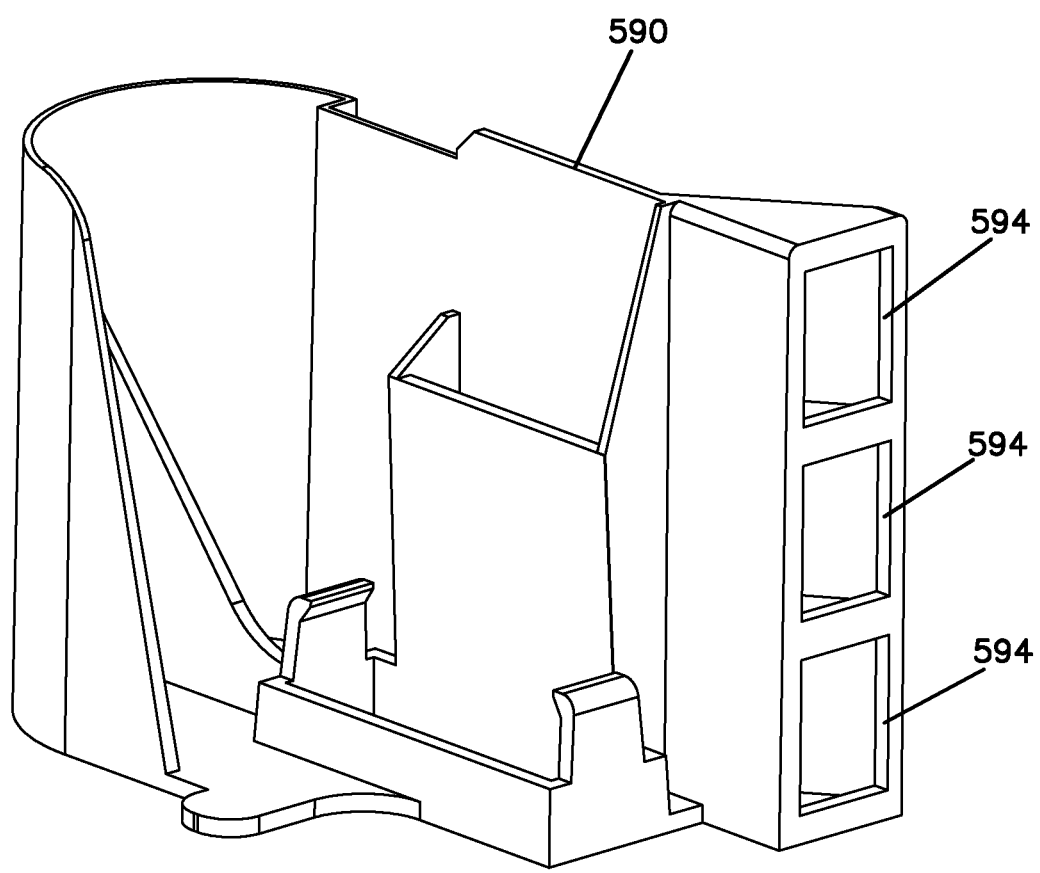
FIG. 44 shows another example of a feeder termination holder of the distribution box of FIGS. 30 and 31.

Referring now to FIGS. 26-29, a further embodiment of a distribution box 412 and splitters 442 are shown. The splitters 442 slidably mount parallel to the base 414. The splitters 442 can be individually removed or partially removed to improve access to the splitter outputs. Each splitter 442 has a splitter input 450. FIG. 44 shows a splitter retention clip or latch 446 for retaining the splitter 442 with the base 414. A cover like cover 170 can be provided. Splitters 442 slide relative to base 114 with an interlocking slide. As shown, splitters 442 include a dovetail projection 460, and base 414 includes a mating slot 470. As also shown, feeder terminations 422 have four connectors 22 connected to one of each of the four splitter inputs 450. The two open connectors 22 are available for point to point connections or connections to other splitters in other boxes 412.

As shown in FIGS. 26-29, the splitters 442 are located orthogonal to the splitters previously noted. Such positioning is an alternative positioning. The splitter inputs are located closest to the base 414 in this example.

FIGS. 1-29 all use a LightPlug connector and adapter. A LightPlug installation tool permits a bare fiber to be inserted into the tool, and the tool adds the LightPlug connector to the end of the fiber to terminate the fiber. Use of the LightPlug installation tool and the LightPlug connectors and mating adapters provide just one embodiment of the present distribution system. Each splitter output is in the form of a fiber optic connector, including a shutter. The illustrated connectors are LightPlug connectors. The splitter input has a LightPlug connector at a distal end mated with a LightPlug adapter. The LightPlug adapter is connectable to a distribution cable terminated with a LightPlug connector. The LightPlug tool, connector and adapter system is shown in patent document nos. WO2012/112344 and WO 2013/117598, noted previously incorporated by reference. Other forms of connectors, including SC and LC can be used, in addition to multi-fiber connectors, such as MPO connectors.

The splitters can include port identifiers, a splitter identifier, and an RFID tag, if desired.

Various arrangements of splitters are shown with different numbers of splitter outputs. These splitters can be mixed and matched in the distribution boxes as desired.

The LightPlug feeder terminations are shown connected to the base. The connectors are held with clips ready for connection to an adapter, which is added later in combination with a second connector for connection to a customer or the splitters. Alternatively, adapters can be mounted to the base.

As noted, various implementations are provided for adding capacity over time. One implementation is to add the splitters as needed over time. Another implementation for adding capacity uses two distribution boxes. Splitters from the second distribution box can be connected to feeder terminations of the first distribution box. Another implementation for adding capacity includes a feeder cable connected to two (or more) distribution boxes as desired. This provides additional feeder terminations for connections to customers directly, or through splitters. Another implementation for increasing capacity includes adding a second (or more) distribution box at a remote location wherein a further feeder cable is spliced to the first feeder cable to link the two distribution boxes. Another implementation is to add a new cover 170 to the distribution box to add increased outputs through the use of larger splitters.

Figure 48:
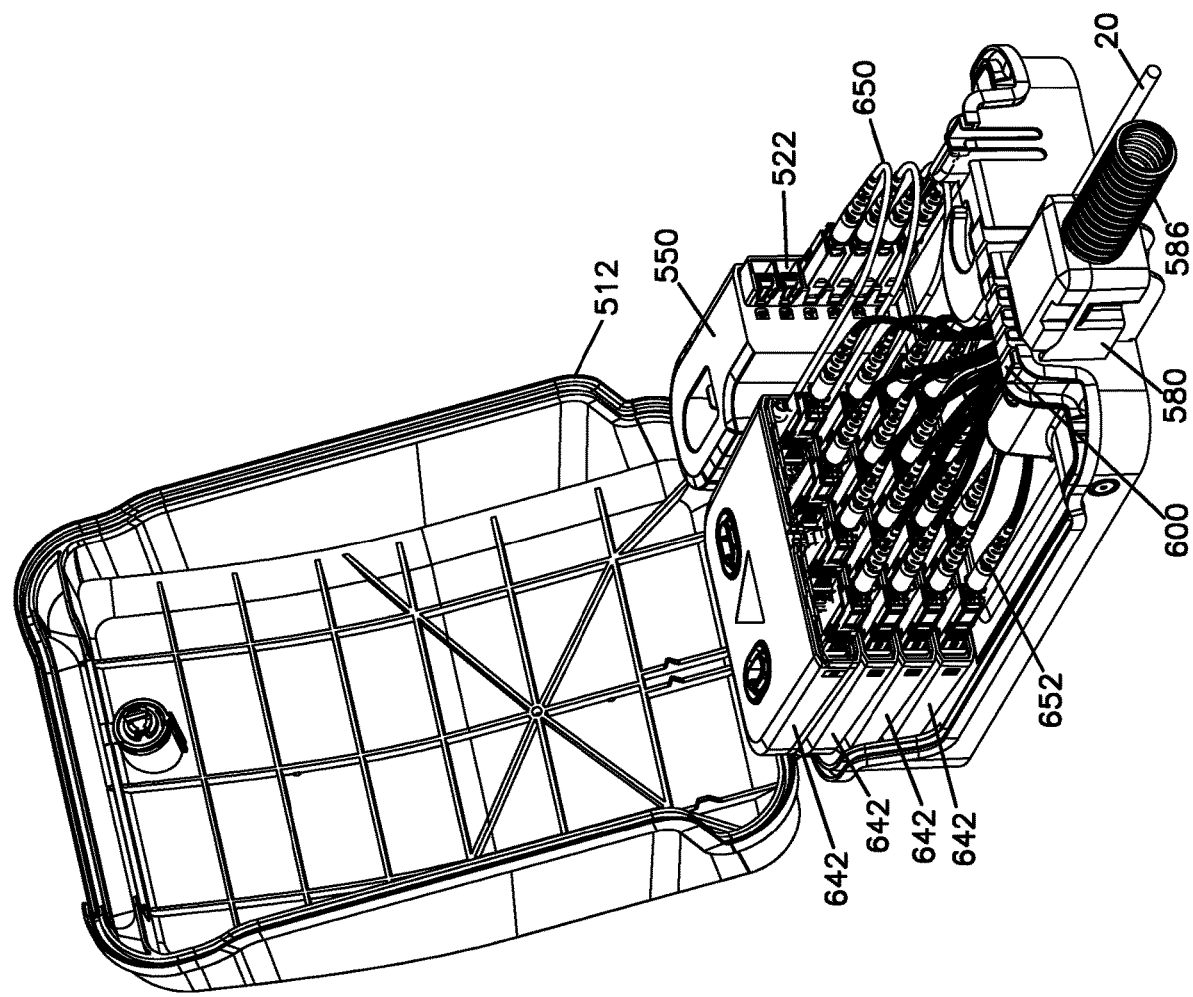
FIGS. 48 and 49 show the distribution box of the distribution box of FIGS. 30 and 31 connected to an input feeder cable and outgoing cables from the splitters.
Figure 49:
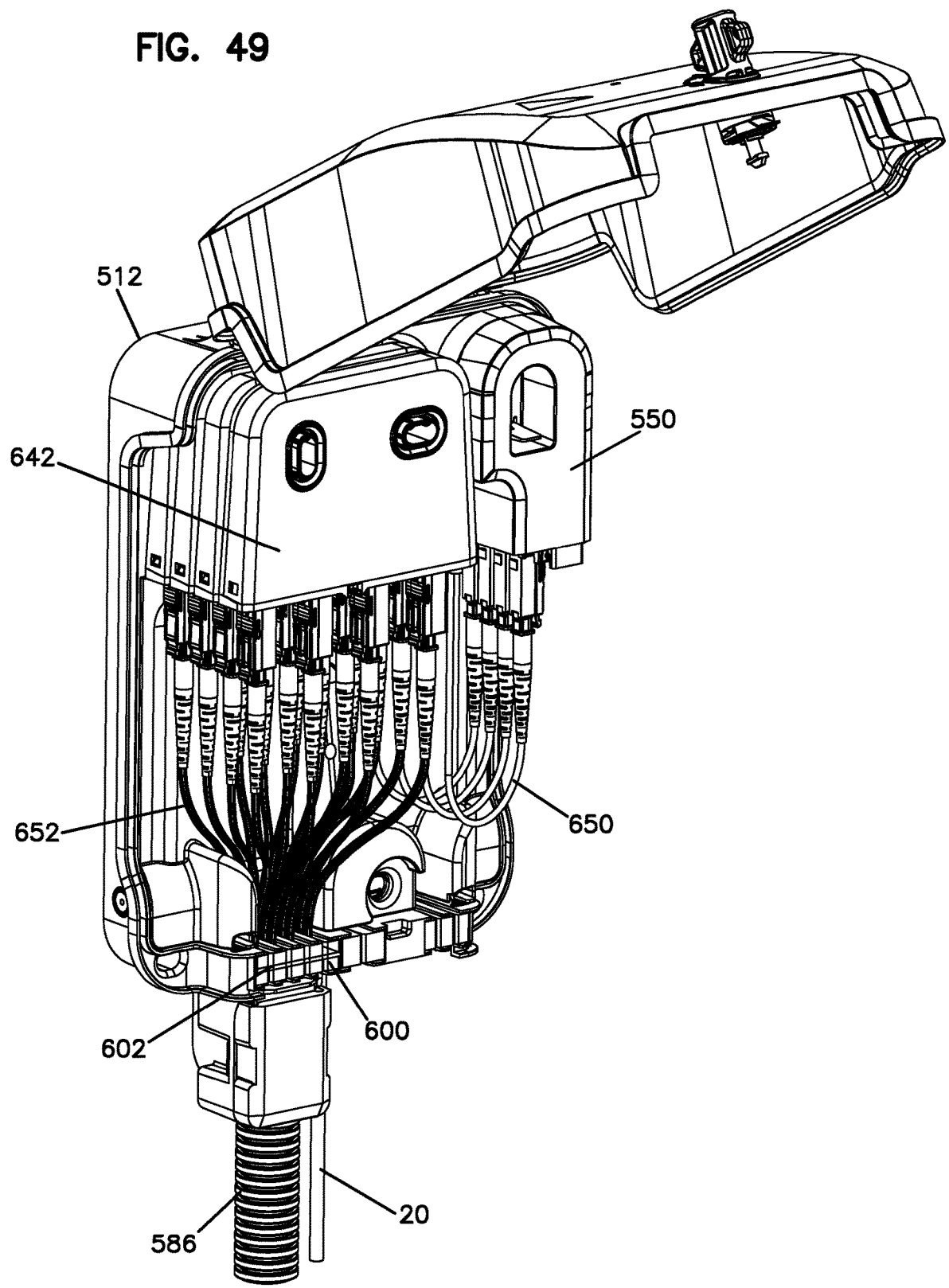
Figure 50:
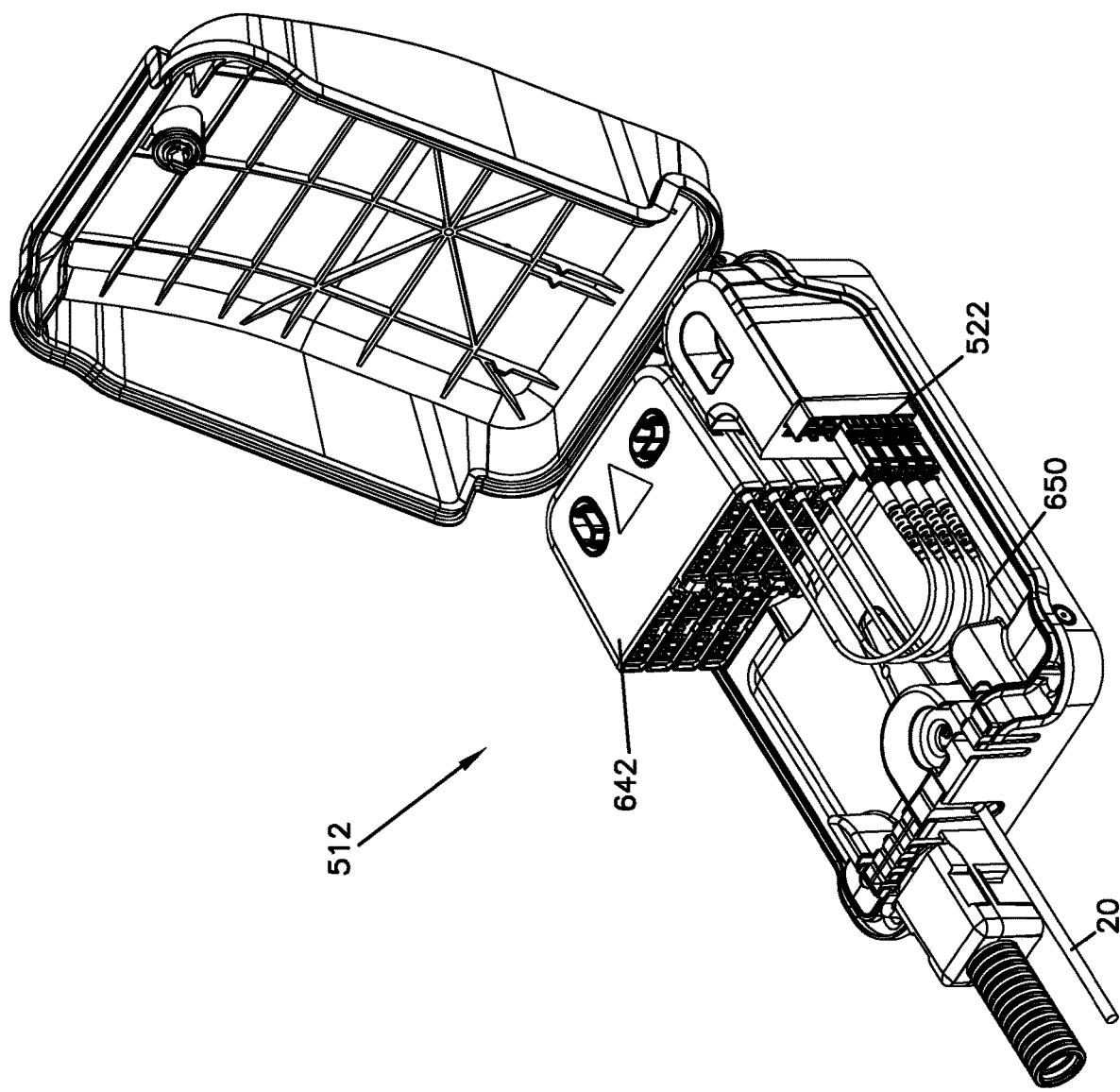
FIG. 50 shows the distribution box of FIGS. 48 and 49 without any cables connected to the splitter outputs and all the splitter inputs connected to the feeder terminations.
Figure 51:
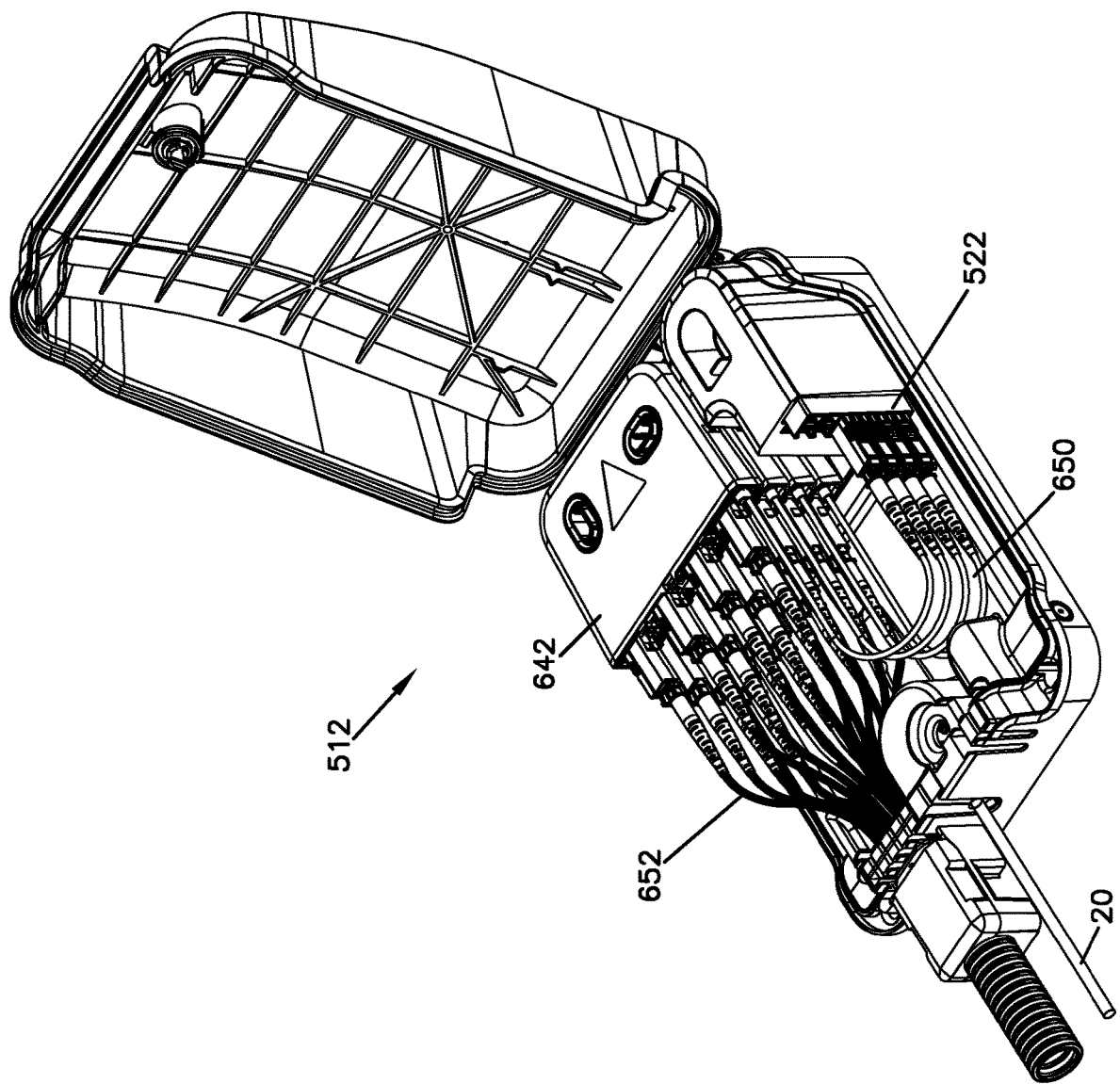
FIG. 51 shows the distribution box of FIGS. 48 and 49 with the addition of the splitter output cables to the view of FIG. 50.

Referring now to FIGS. 30-79, an alternative distribution box 512 is shown. The distribution box includes a cover 570, a base 514, a lock 572 (with a key 573) for the cover, a connection box 580 to secure a corrugated tube 582 for housing cables, and an internal tray 516 used for cable routing and storage (and splice). Cover 570 is hinged at hinge 574 to base 514. A splitter area 518 holds splitters on one or more posts 526, 528. Posts 526, 528 can be different shapes and/or sizes to facilitate one way fit with the splitters 642 (see FIG. 48). The feeder cables 20 pass through a channel 536 and are terminated at a feeder termination area 522.

An internal cover 560 is positioned over the splice and storage area 524. A termination cover 560 is also provided. The internal cover 560, or demarcation cover, fits over the storage and splice area 524. Tabs 562 and snaps 564 are used to mount the demarcation cover 560 to the base 514. Handles 566 are provided on cover 560. The left side of area 524 can be used to store active fibers. The right side of area 524 can be used to store dark fibers or unused fibers. Both the left and right sides of the area 524 can be used to store splice holders.

A feeder cable clamping device 530 is shown for use in the distribution box. The clamping device 530 includes arms 532 which squeeze one or more feeder cables upon mounting of the demarcation cover 560 to the base. The feeder cable clamping device 530 can be in the form of a separate part mounted to the base. Arms 568 extend from cover 560 to restrain clamping device 530 and force them to clamp to the cables. Inner teeth can also be provided on arms 532 to grip the cables.

A strength member clamp 540 is shown positioned between a portion of the base 546 and a metal clamping plate 544. A ramp 542 promotes upward movement of the strength member to the clamping location.

Figure 43:
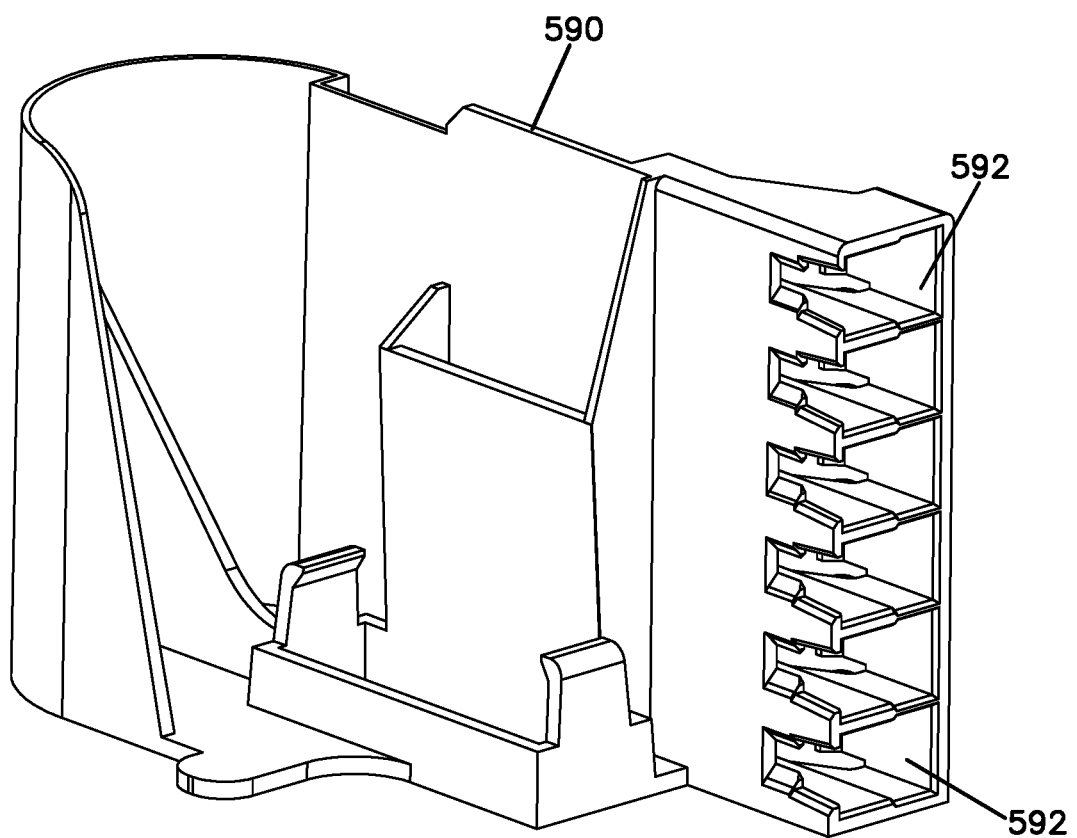
FIG. 43 shows an example of a feeder termination holder of the distribution box of FIGS. 30 and 31.
Figure 45:
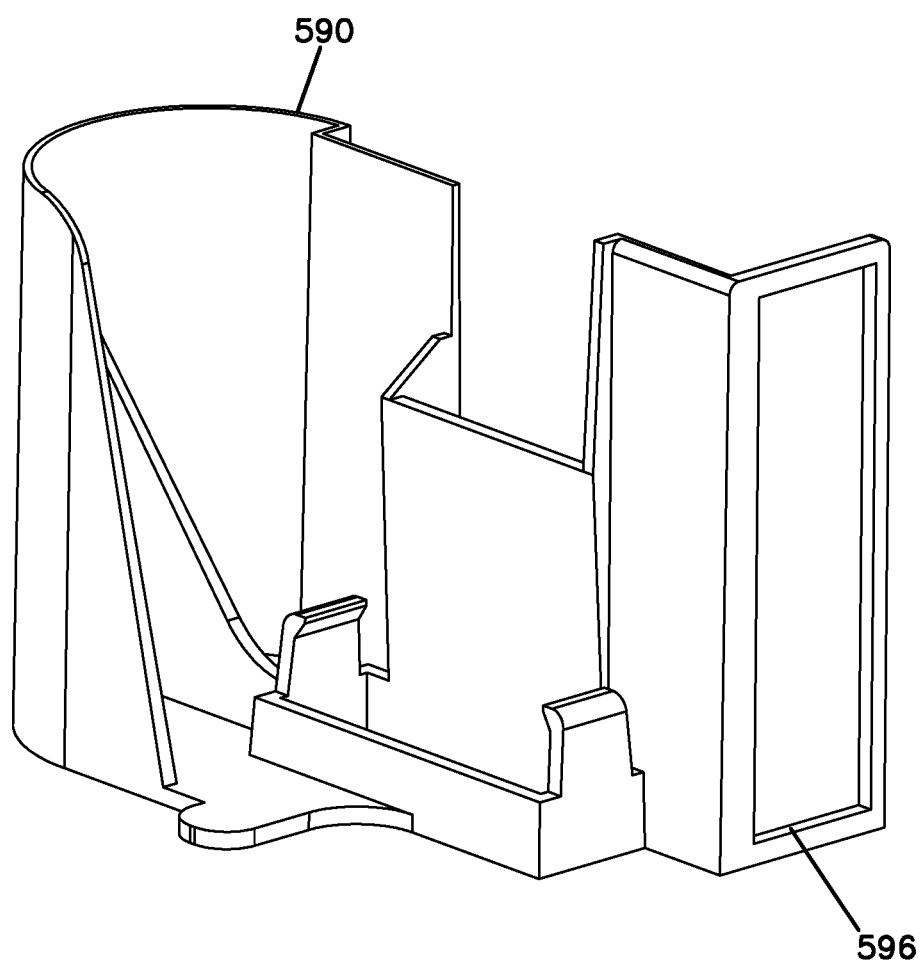
FIG. 45 shows a further example of a feeder termination holder of the distribution box of FIGS. 30 and 31.
Figure 46:
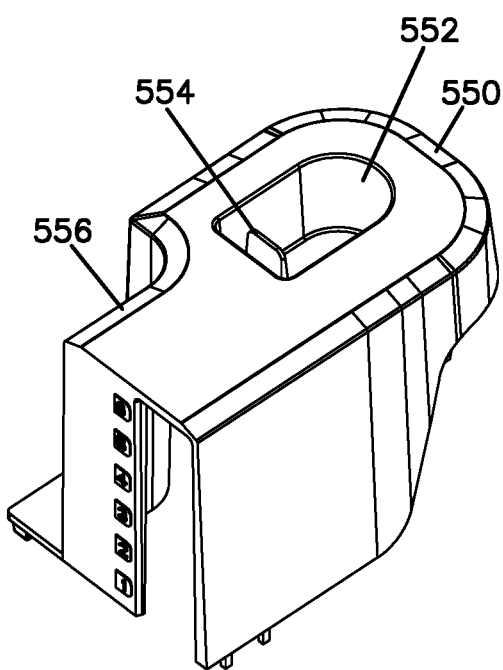
FIGS. 46 and 47 show a feeder termination cover of the distribution box of FIGS. 30 and 31.
Figure 47:
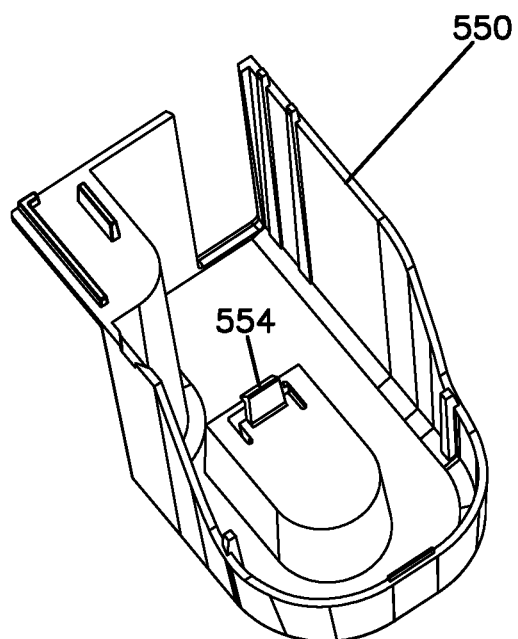

Feeder termination inserts 590 are shown for holding connectors and/or adapters associated with the feeder terminations. The insert 590 snaps to the base 514. Different inserts 590 are provided for different connectors or adapters. FIG. 43 includes openings 592 for LightPlug connectors 22. FIG. 44 includes openings 594 for three SC or LC connectors 22. FIG. 45 includes an opening 596 for six SC or LC connectors 22 or other connectors.

A feeder termination cover or tower cover 550 is shown for use in covering the feeder input cables. A latch 554 holds the termination cover 550 in place. A finger recess 552 allows for finger activation of the latch 554. A cutout 556 allows for finger access for the installer or technician for handling of the adjacent splitters.

The connection box 580 is made of two pieces 584, 586 and connects a flexible conduitor corrugated tube 586 to the distribution box 512 for organizing and protecting the distribution or output cables extending from the box. Connection box 580 snaps to base 514. Preferably, a foam insert 600 with slits 602 is used on the base to provide a seal around the cables entering the connection box.

The cover lock 572 is shown wherein a key 573 engages a turning element to open and close the lock. In general, the key cannot be removed from the cover unless the cover is closed and the lock is locked. Additional details of the lock and key are shown and described U.S. Application Ser. No. 62/073,631, the disclosure of which is hereby incorporated by reference in its entirety.

Figure 52:
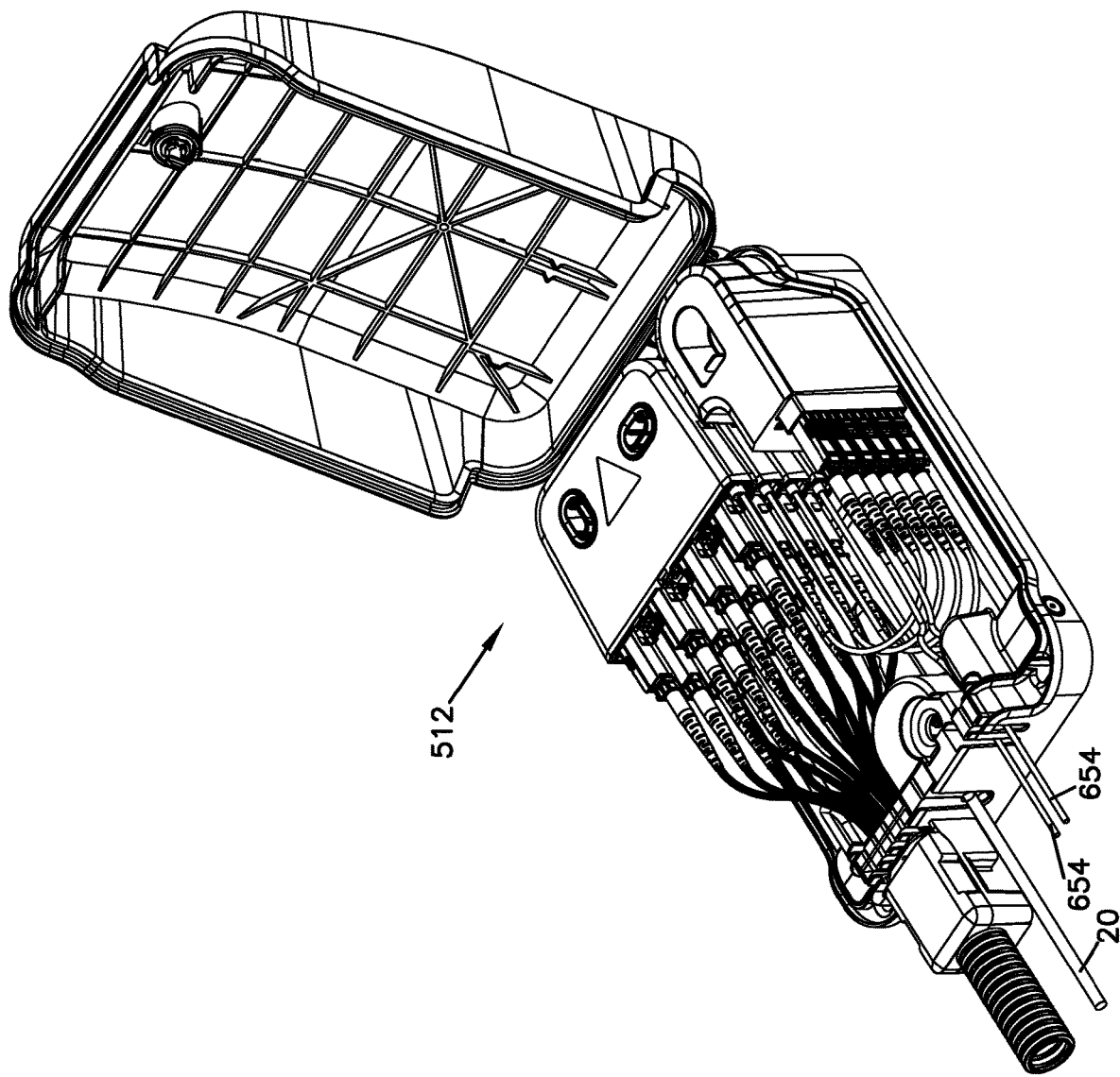
FIG. 52 shows the distribution box of FIGS. 48 and 49 with the addition of two point-to-point connections that connect to the feeder terminations and extend out of the distribution box relative to the view of FIG. 51.

Referring to FIGS. 48-52, a feeder cable 20 is terminated at the feeder terminations 522. Input cables 650 from the splitters 642 are shown connected to the feeder terminations 522 to provide input signals for each of the splitters 642 for splitting and connection to distribution cables 652. FIG. 52 also shows some of the feeder terminations 522 are connected to individual cables for point-to-point connections where the use of a split output is not desired. FIGS. 48-52 also illustrate the use of LightPlug connectors and adapters.

Figure 53:
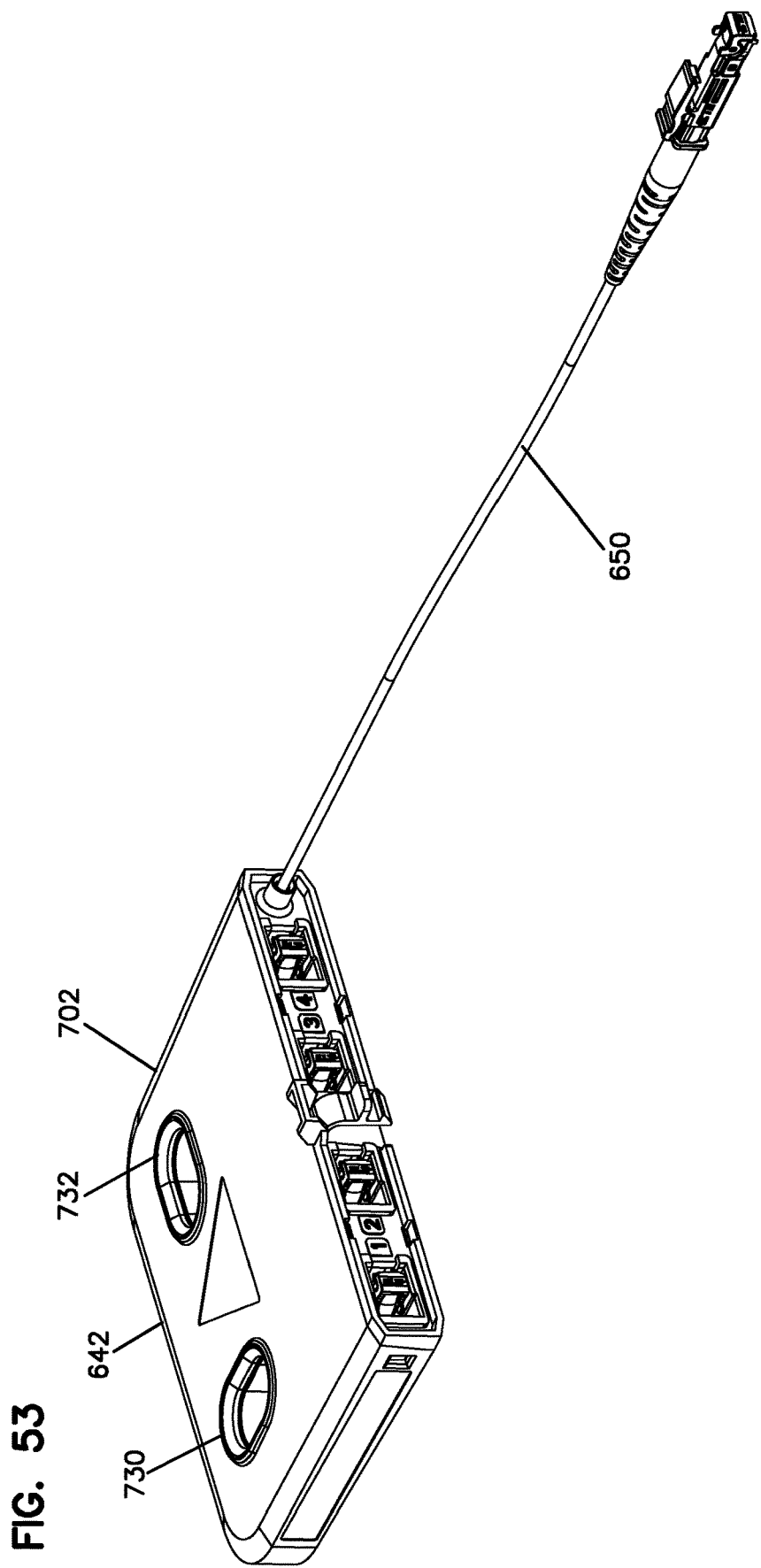
FIG. 53 shows a 1×4 splitter for use in the distribution box of FIGS. 30 and 31.
Figure 54:
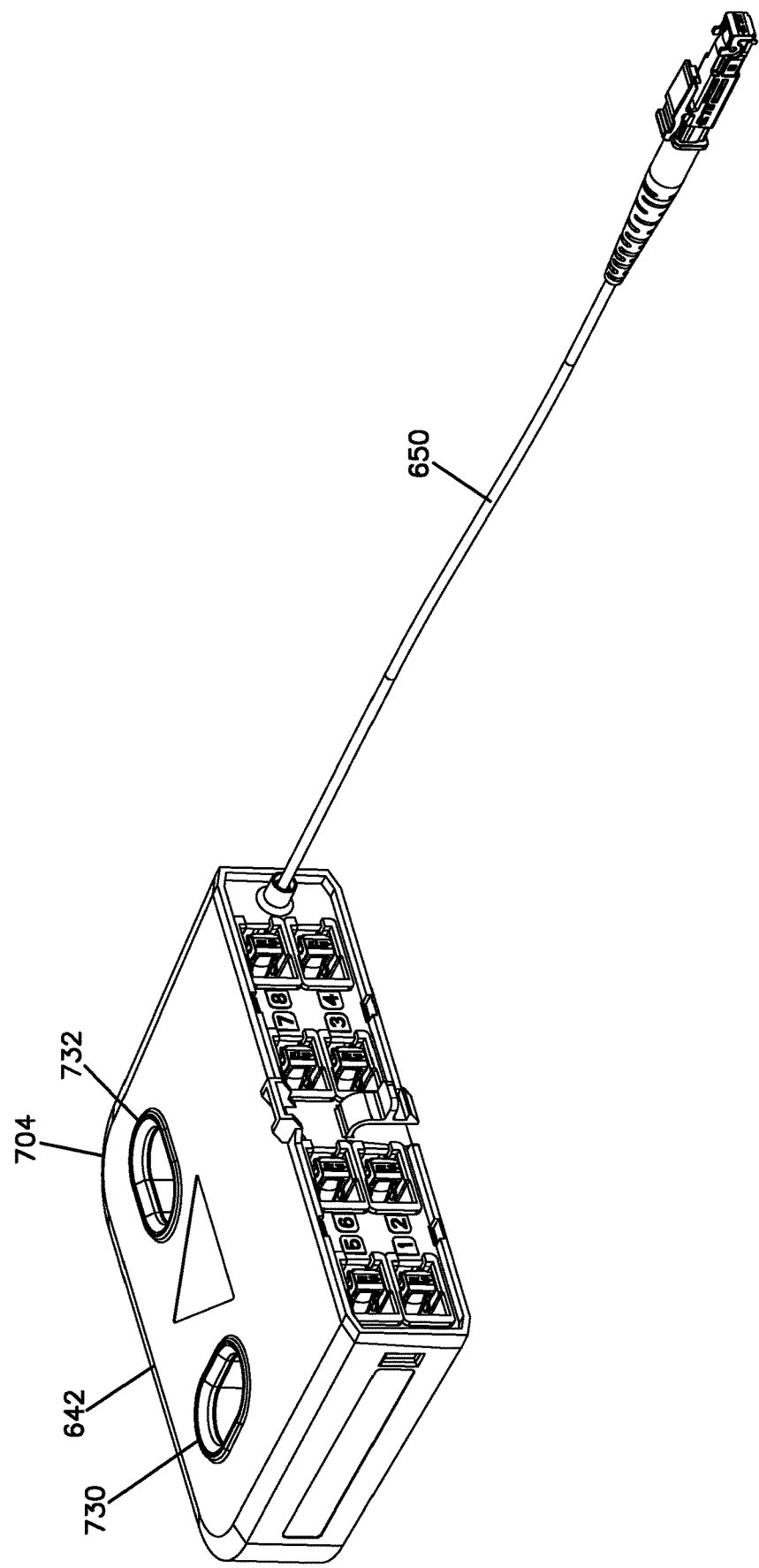
FIG. 54 shows a 1×8 splitter for use in the distribution box of FIGS. 30 and 31.
Figure 55:
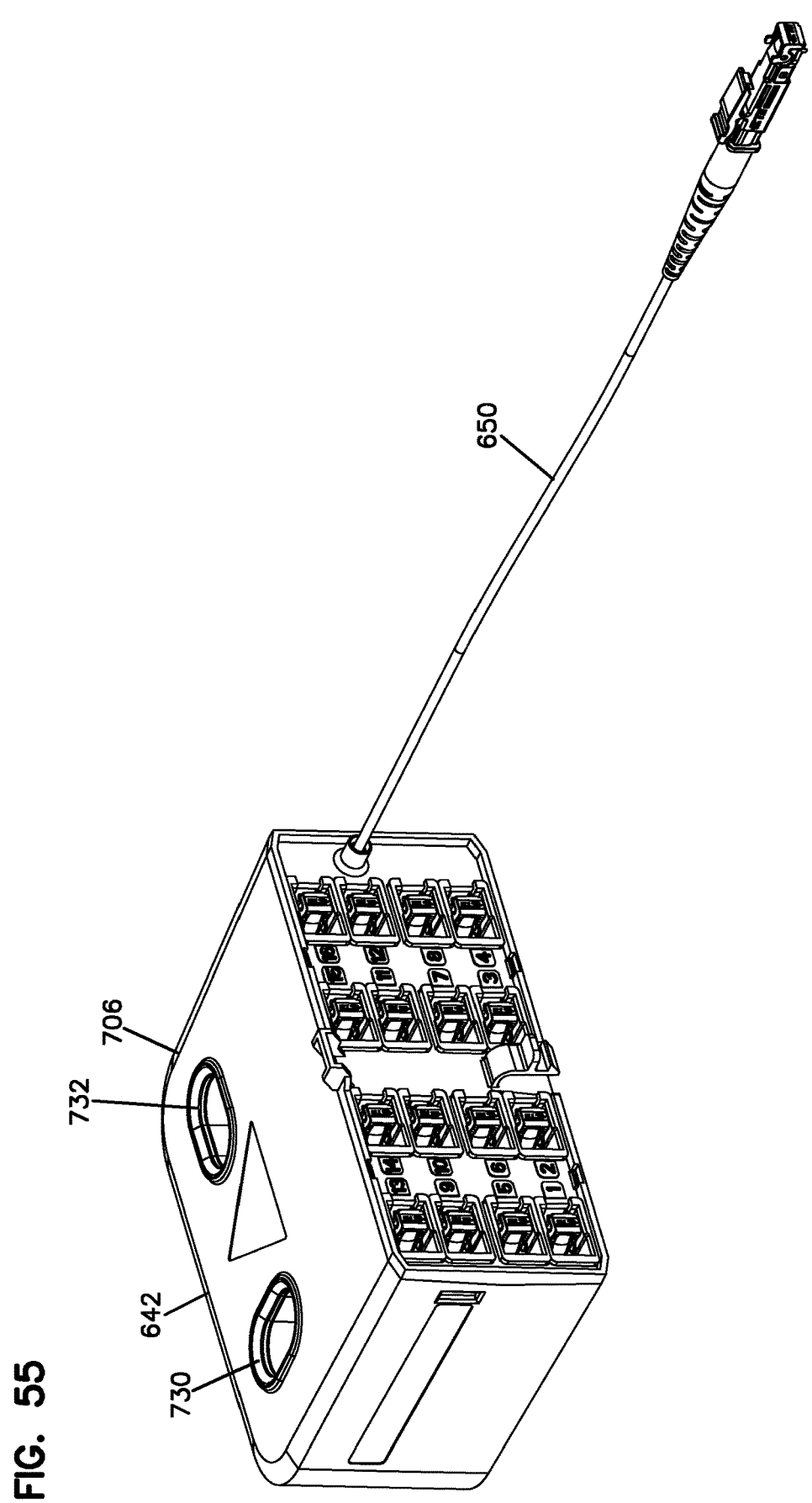
FIG. 55 shows a 1×16 splitter for use in the distribution box of FIGS. 30 and 31.

Referring now to FIGS. 53-70 various views are shown of splitters or splitter cassettes. The splitters can take many forms and formats. In general, a common profile is provided for use with the distribution box. FIG. 53 shows a 1×4 splitter 702. FIG. 54 shows a 1×8 splitter 704. FIG. 55 shows a 1×16 splitter 706. FIGS. 53-55 show a common profile, but different heights.

Figure 56:
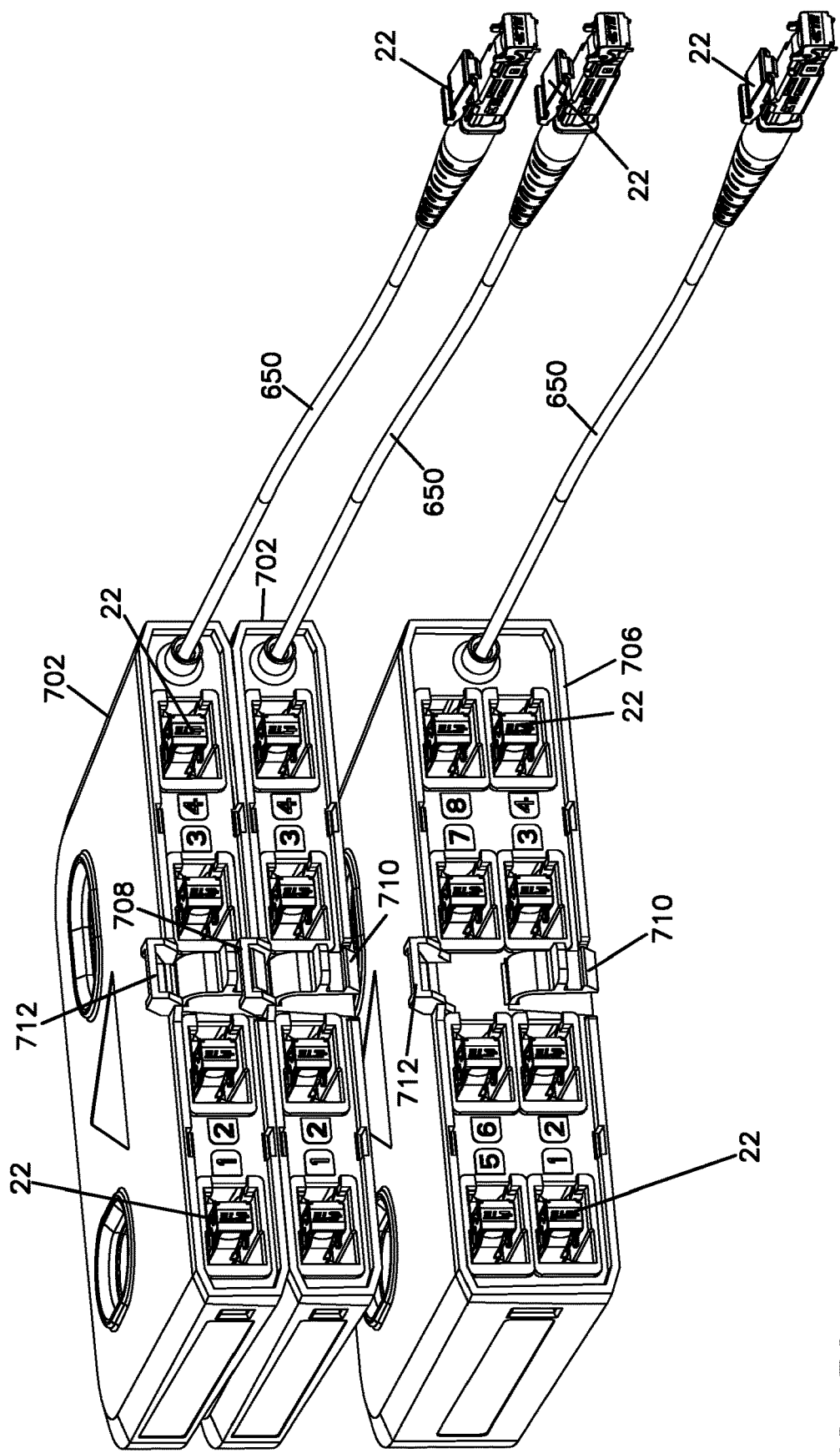
FIG. 56 shows a latching method for connecting a stack of splitters of FIGS. 53-55.
Figure 57:
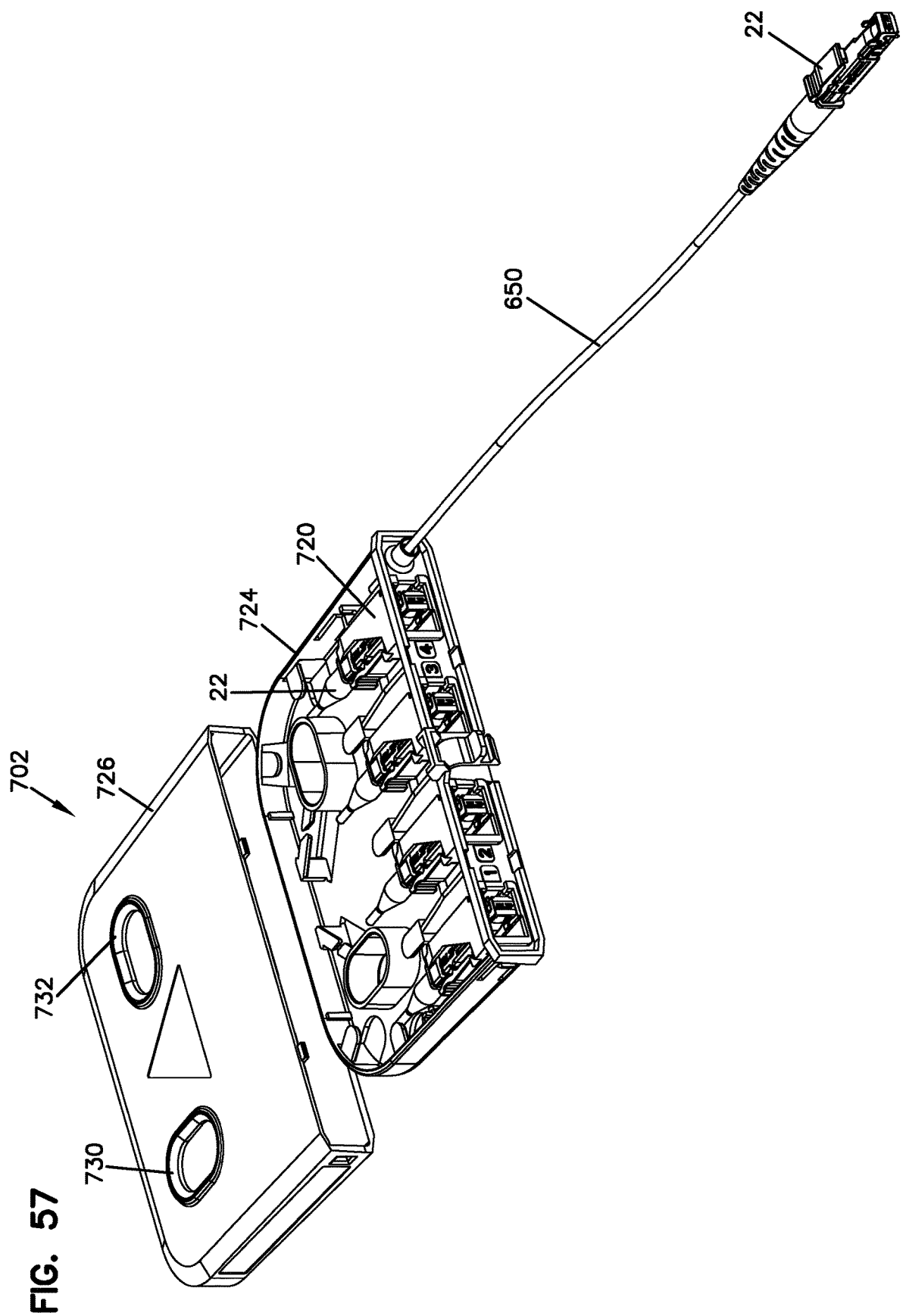
FIG. 57 shows a 1×4 splitter of FIG. 53 in exploded view.
Figure 58:
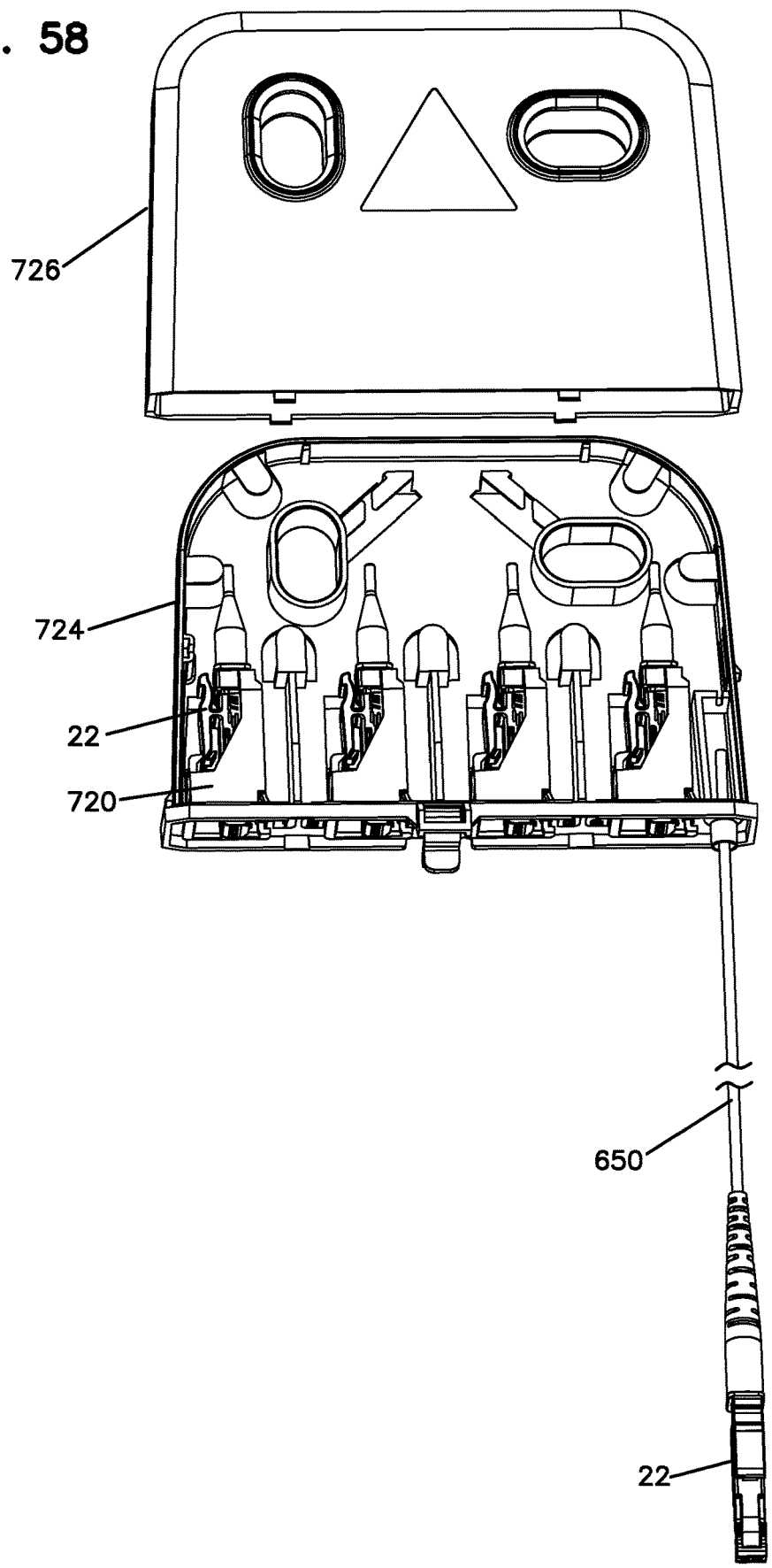
FIG. 58 shows a further view of the splitter of FIG. 57.
Figure 59:
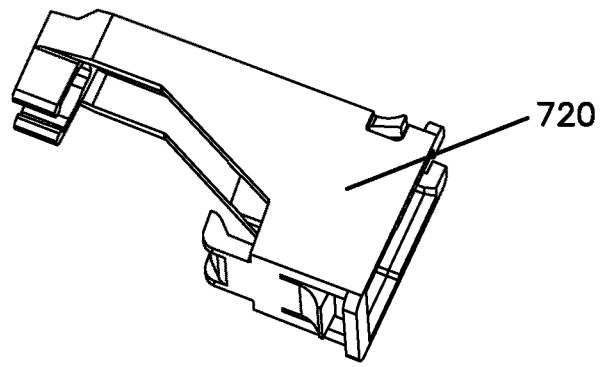
FIGS. 59-61 show a connector holder for use in the splitters of FIGS. 53-55 in various perspective views.
Figure 60:
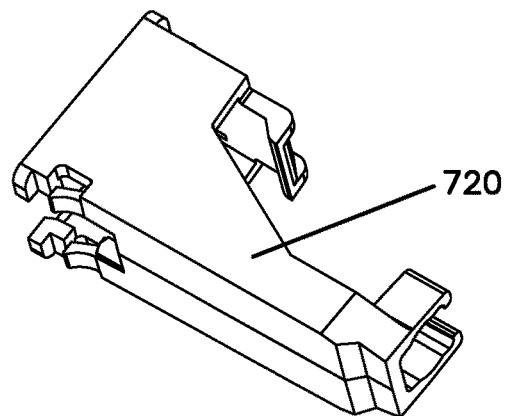
Figure 61:
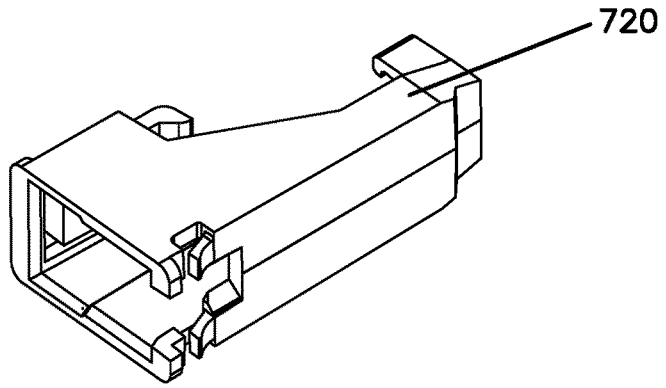
Figure 62:
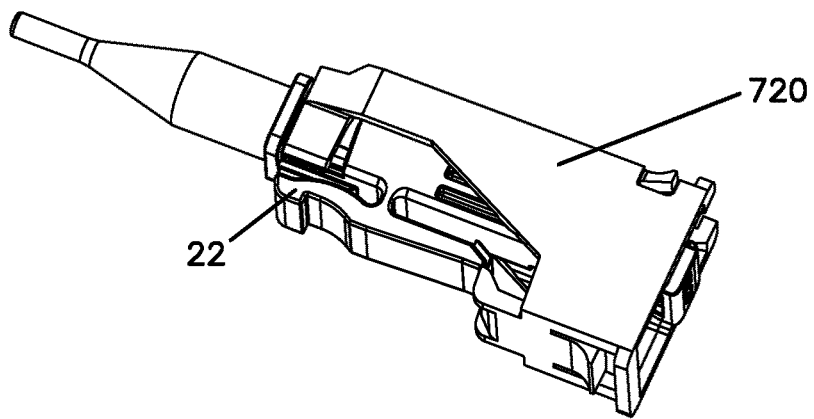
FIGS. 62-64 show the connector holder of FIGS. 59-61 holding a first connector.
Figure 63:
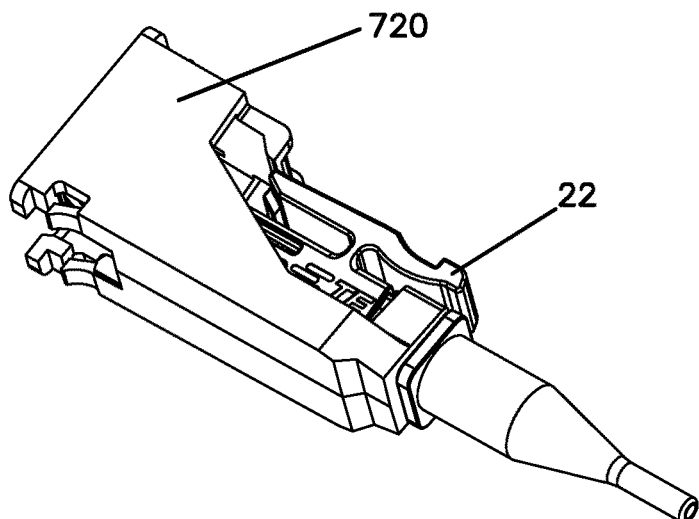
Figure 64:
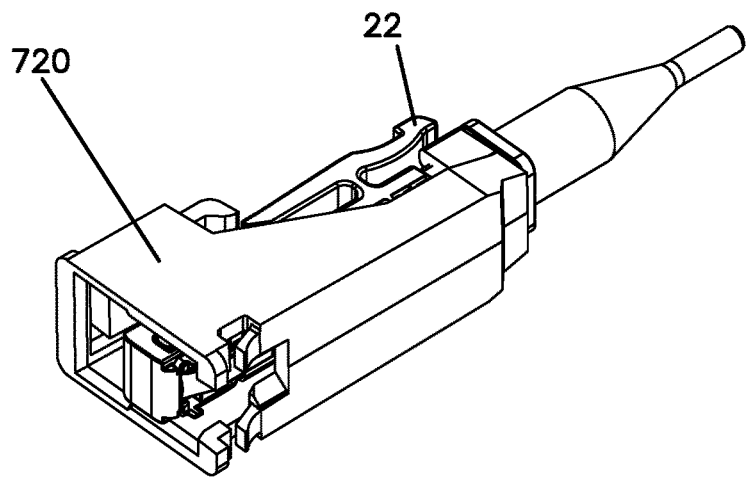
Figure 65:
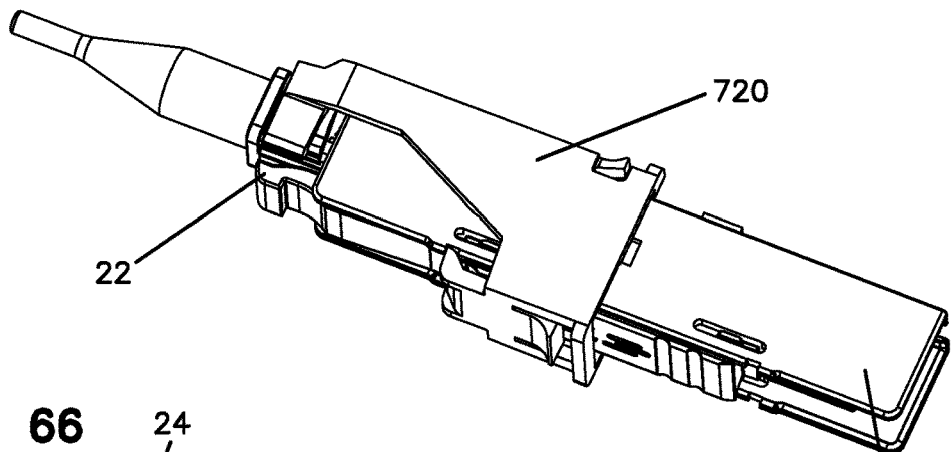
FIGS. 65-67 show the connector holder and the connector of FIGS. 62-64, and an adapter mounted to the connector.
Figure 66:
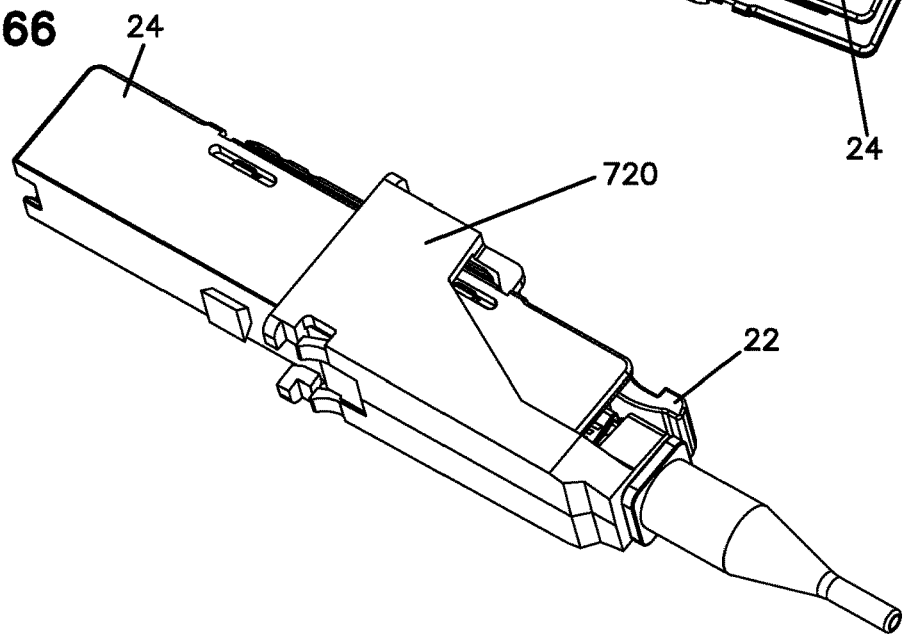
Figure 67:
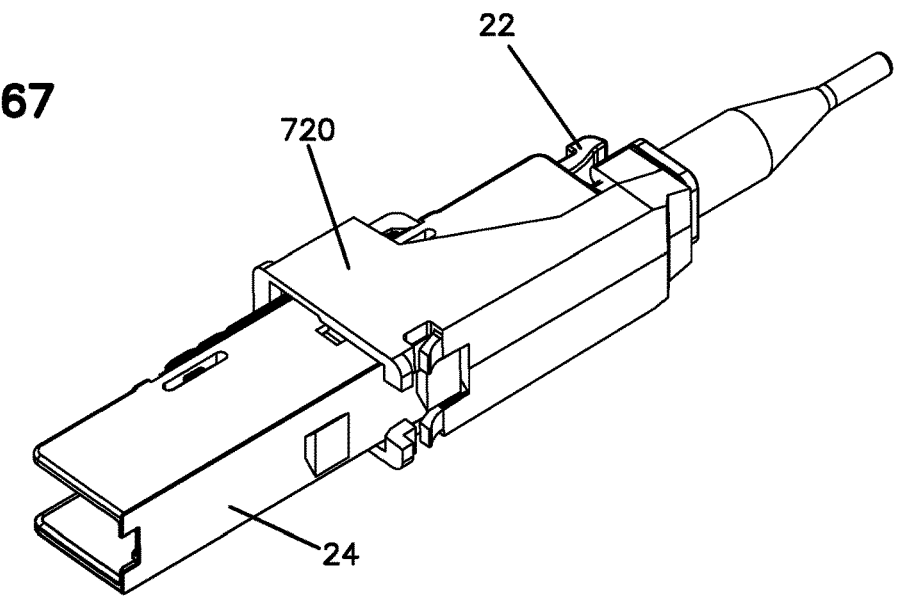
Figure 68:
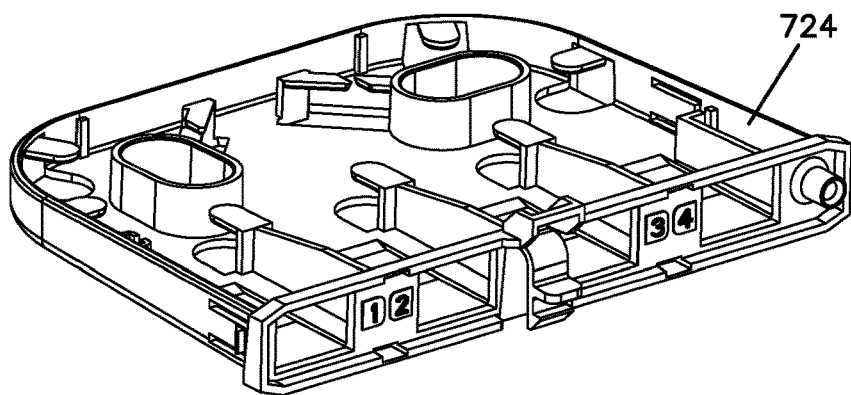
FIG. 68 shows an inner housing portion of the 1×4 splitter of FIG. 53.
Figure 69:
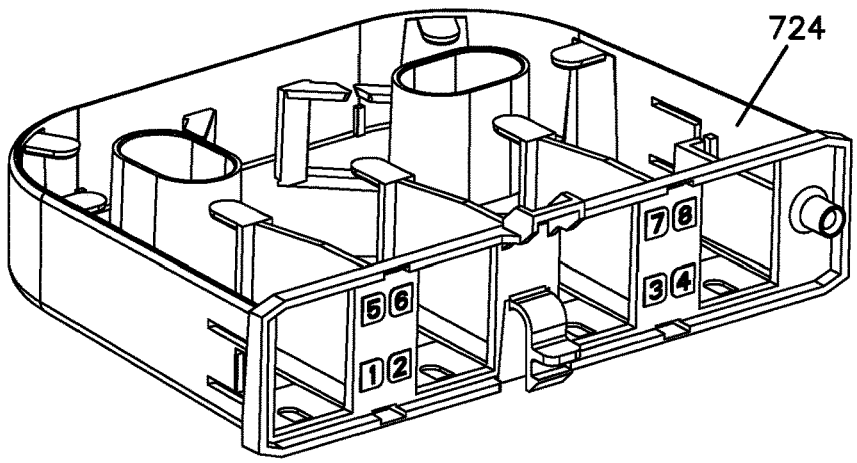
FIG. 69 shows an inner housing portion of the 1×8 splitter of FIG. 54.
Figure 70:
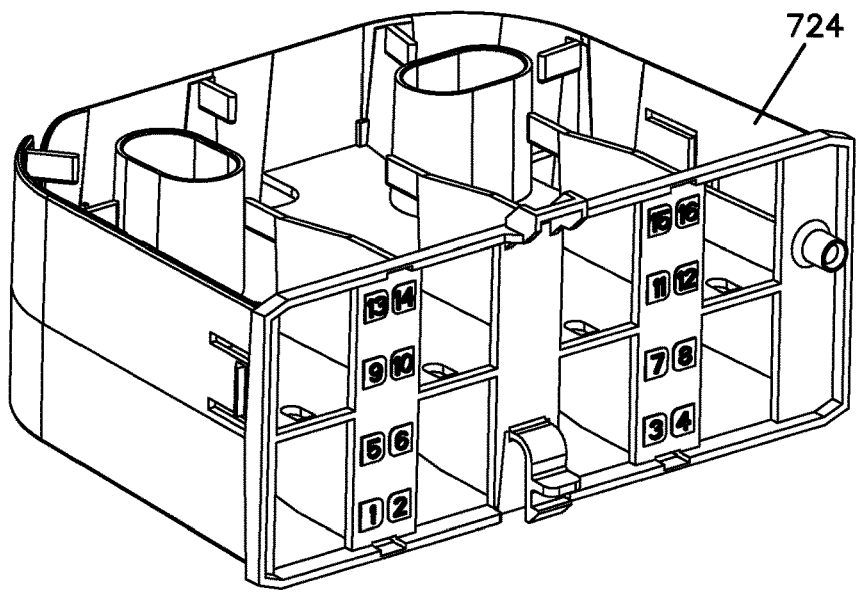
FIG. 70 shows an inner housing portion of the 1×16 splitter of FIG. 55.
Figure 71:
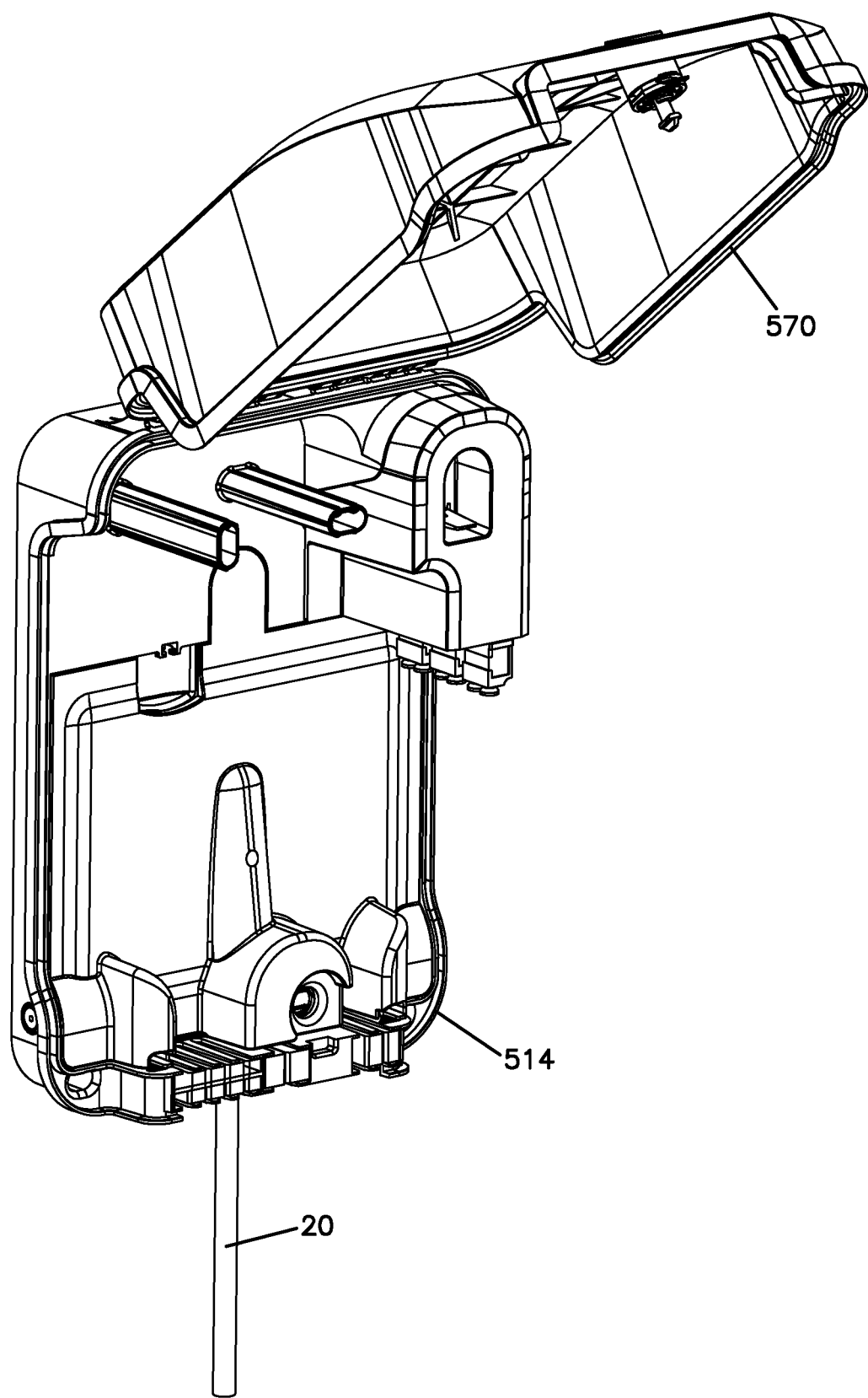
FIGS. 71 and 72 show the distribution box of FIGS. 30 and 31 ready to receive splitters.
Figure 72:
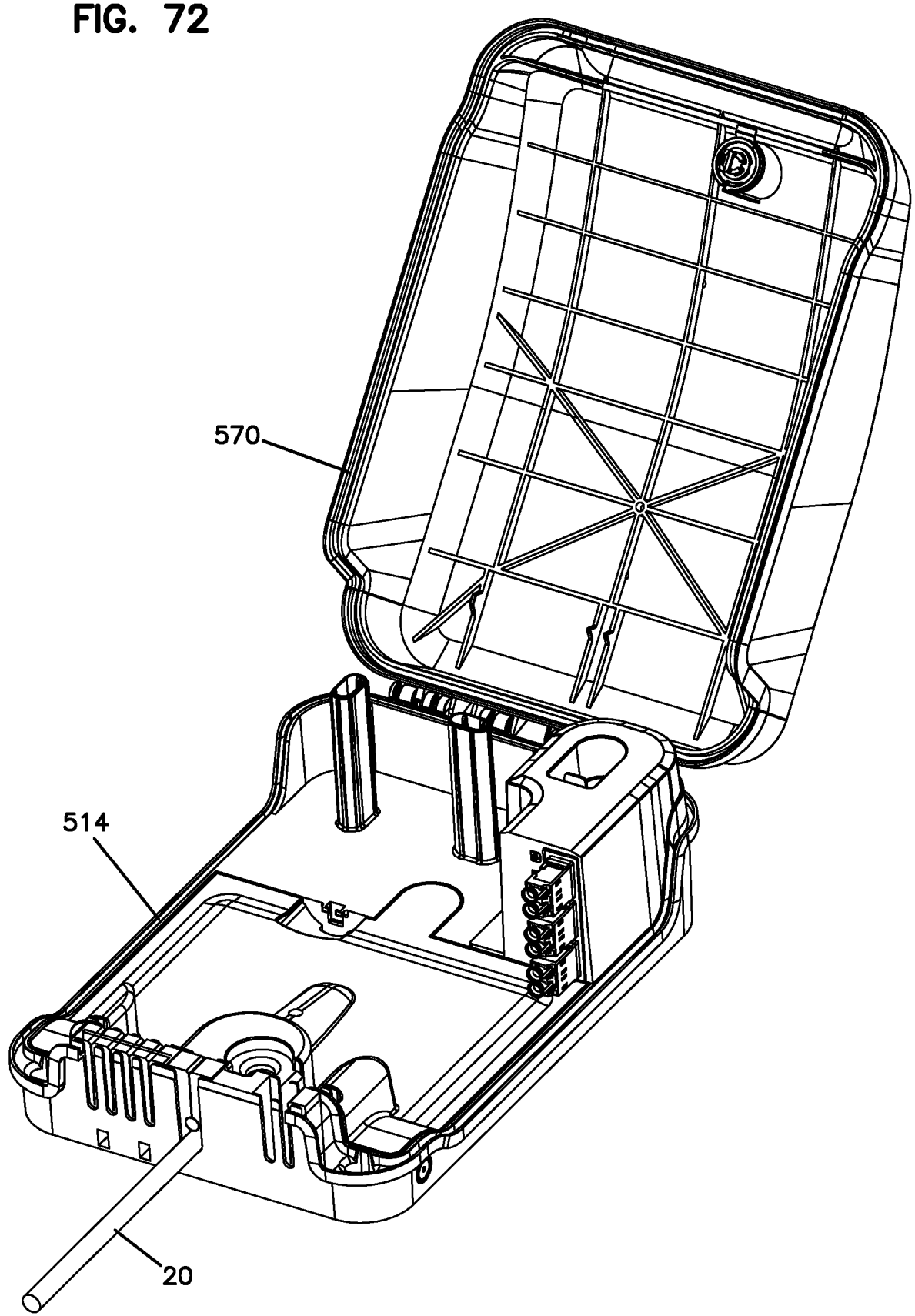
Figure 73:
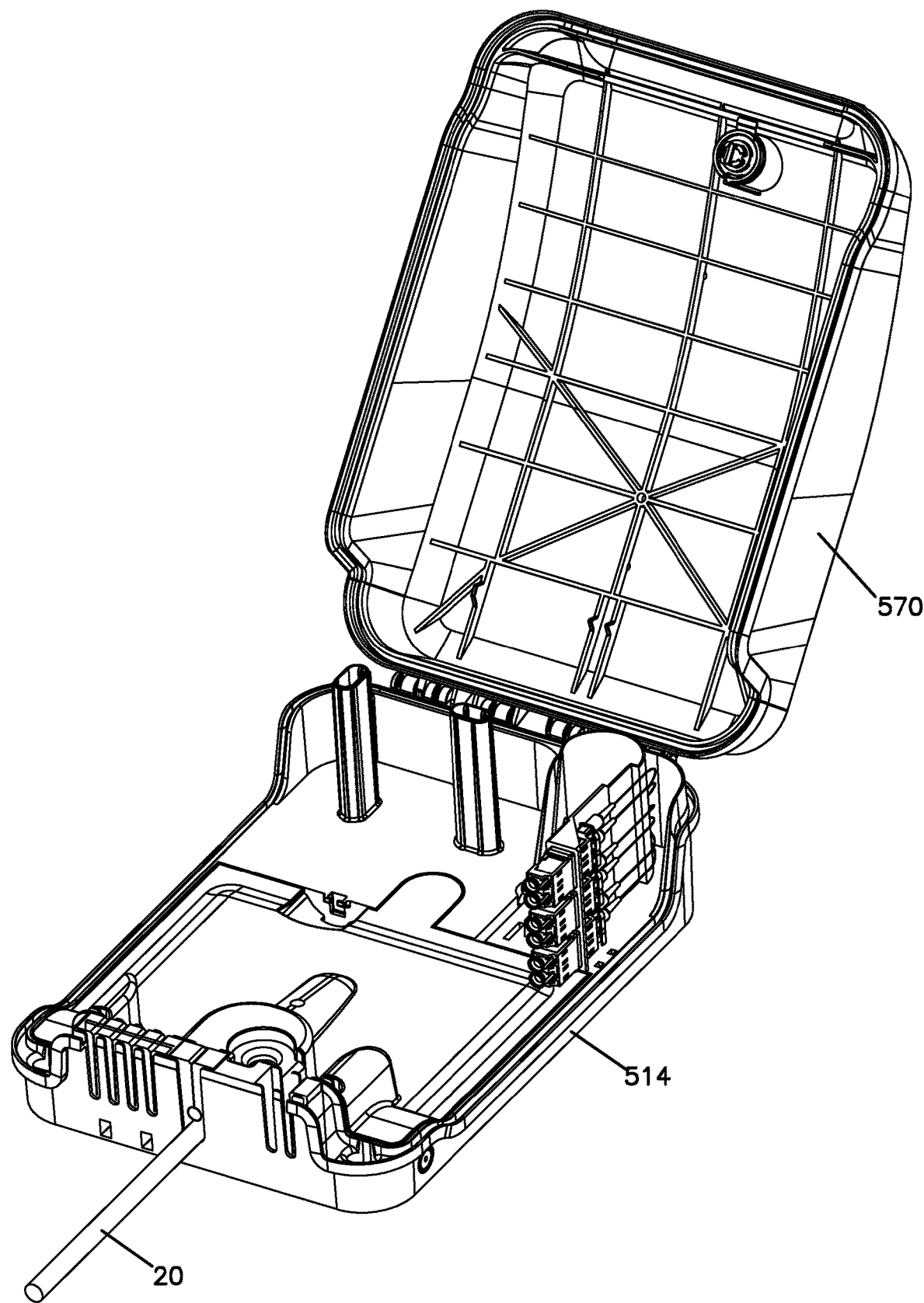
FIGS. 73 and 74 show the distribution box of FIGS. 30 and 31 with the feeder termination cover removed.
Figure 74:
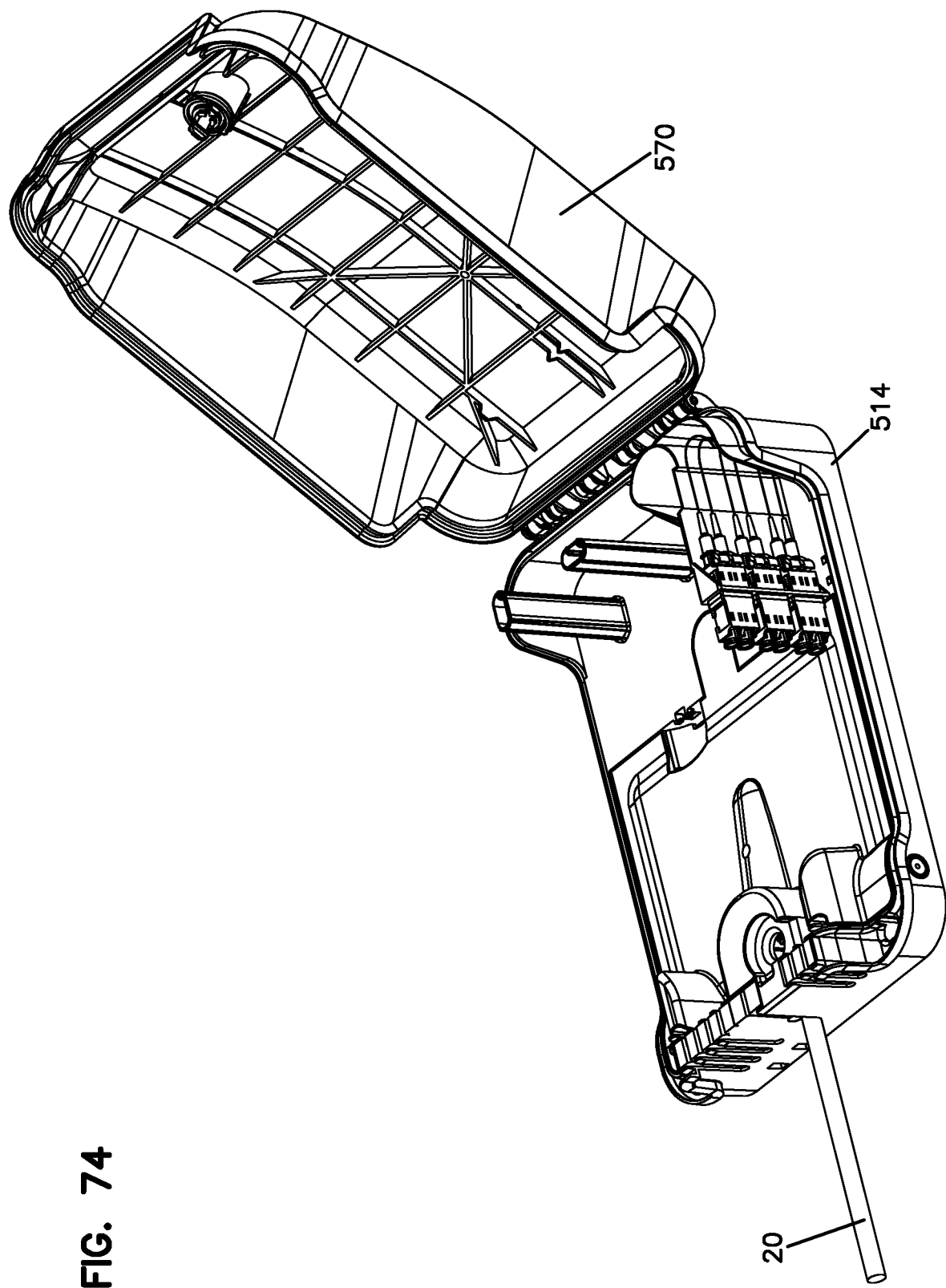
Figure 75:
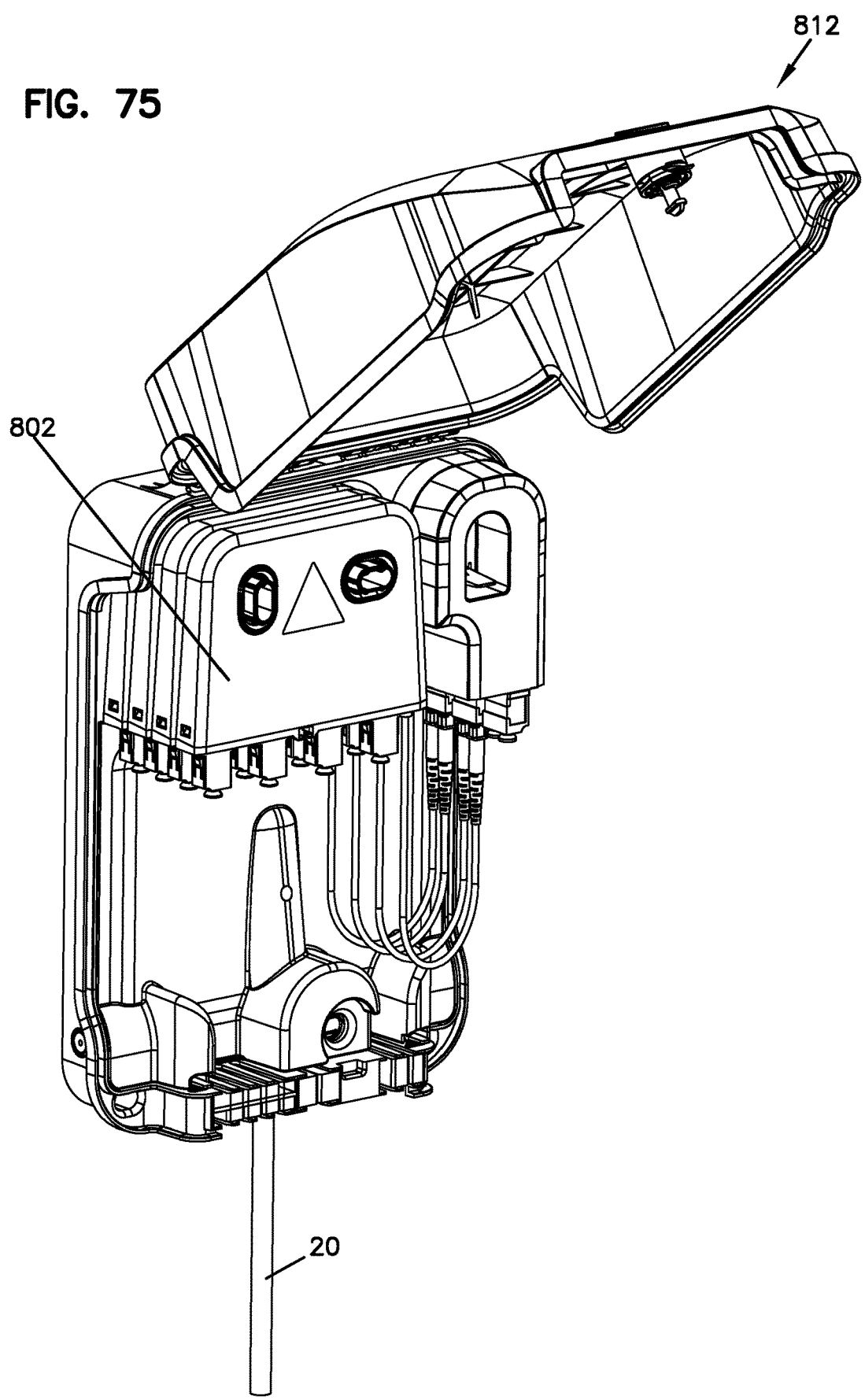
FIGS. 75-77 show the feeder distribution box of FIGS. 30 and 31 connected to splitters and feeder terminations in the form of LC connectors and adapters.
Figure 76:
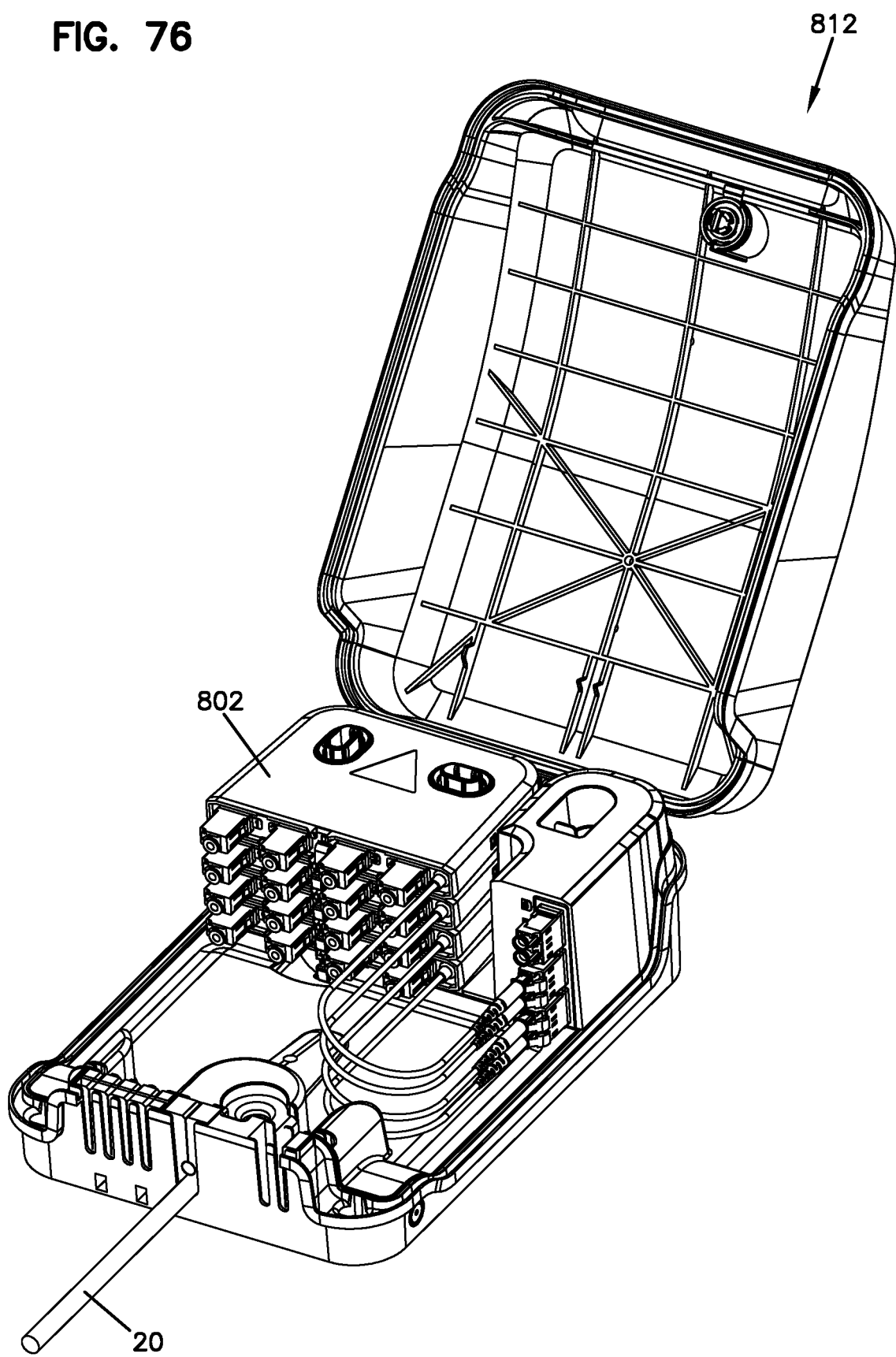
Figure 77:
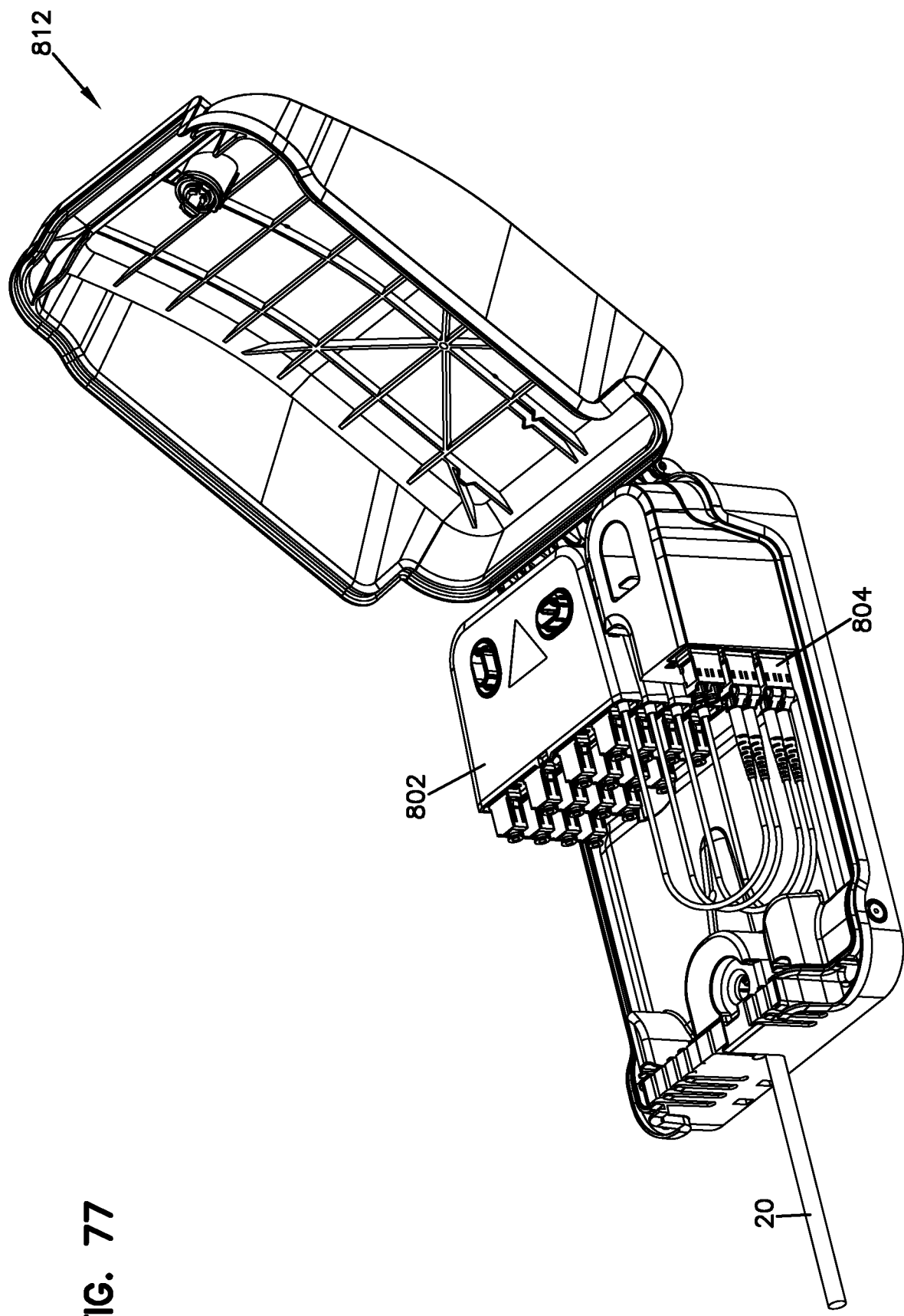
Figure 78:
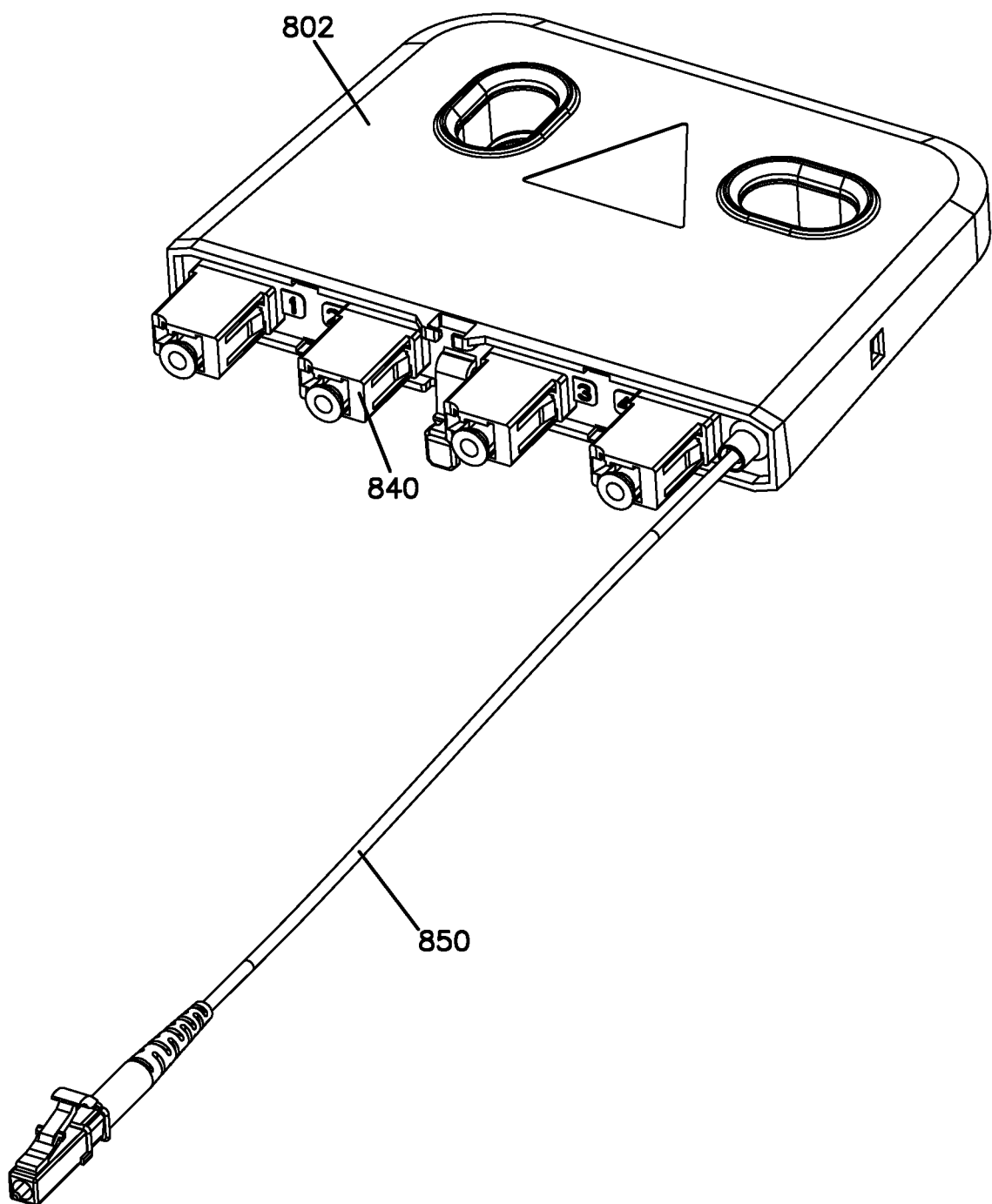
FIG. 78 shows a splitter of the distribution box of FIGS. 75-77 with LC adapters as the splitter outputs for a 1×4 splitter.
Figure 79:
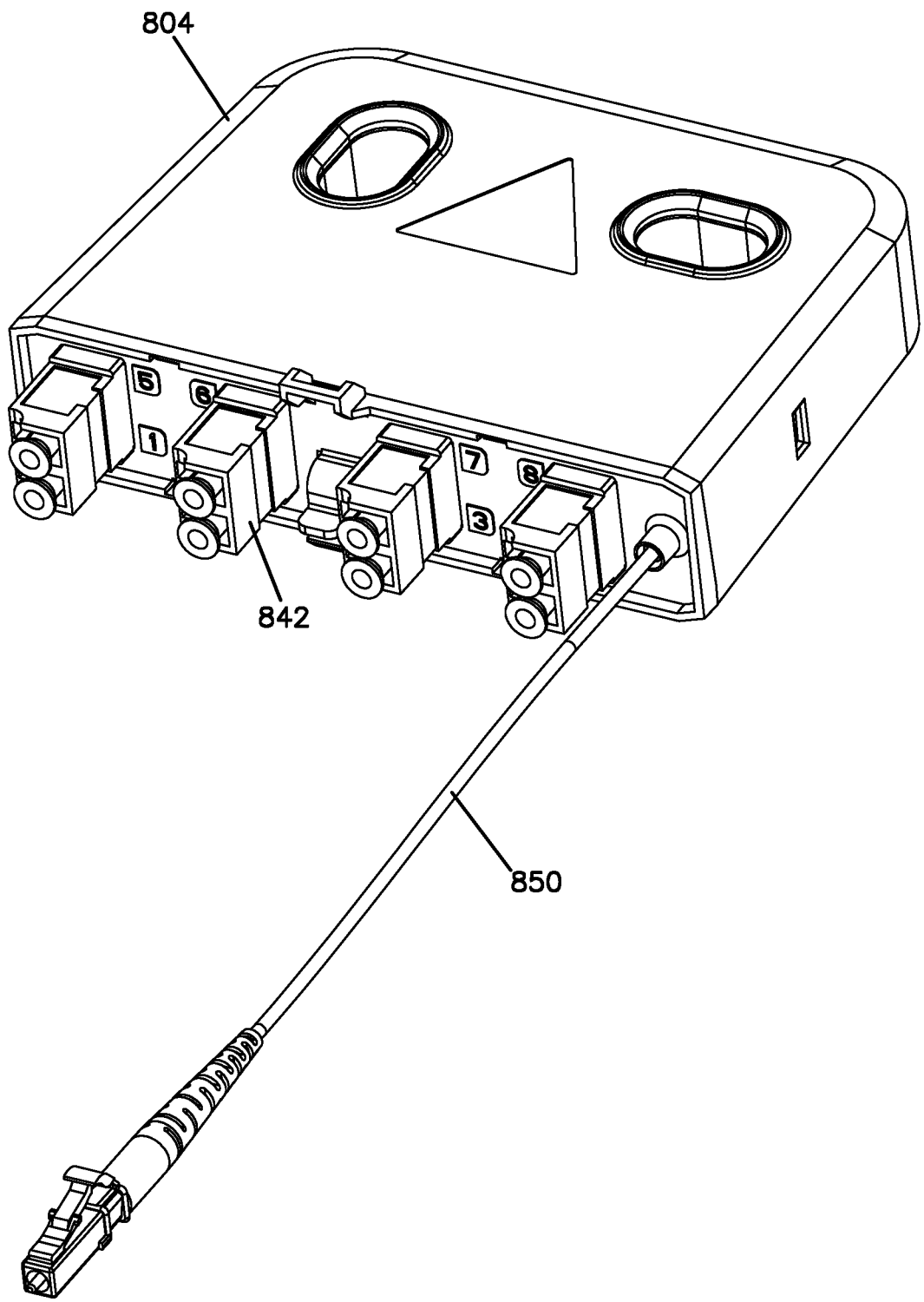
FIG. 79 shows an alternative splitter utilizing duplex LC adapters for the splitter outputs for a 1×8 splitter.

FIG. 56-70 show the splitter output ports in greater detail in the form of the LightPlug connector 22. FIG. 56 also shows a snap feature tomable extending (latch 710, socket 712) for connecting two splitters together or for connecting one splitter to the base. This feature is useful for removing the need for a separate Velcro strap or other fixation device. FIGS. 57-67 show one example of a LightPlug connector retainer 720 utilized utilized with an internal splitter tray 724 for holding the splitter outputs ready for connection to distribution cables. LightPlug connector retainer 720 includes snaps to mount to a splitter module. Splitter tray 724 fits into splitter cover or housing 726. Splitters 702, 704, 706 include oval openings 730, 732 for mating with posts 526, 528. Referring now to FIG. 70, a double sided internal splitter tray is utilized in a 1×16 splitter configuration. Various snaps are utilized to connect the inner trays to the outer cover of the splitters. FIGS. 71-74 show further views of the box 512 with the cover in the open position.

FIGS. 75-80 show similar splitters as shown with the distribution box of FIGS. 30-74, but utilizing LC adapters and connectors for the various fiber connections of the distribution box. As shown, LC adapters define the feeder terminations 804 and also the splitter outputs of splitters 802 which can be connected to distribution cables terminated with LC connectors. Further, the splitter inputs are provided with one or more pigtails terminated by a LC connector connectable to one or more of the adapters, one or more of the LC adapters of the feeder terminations. As shown, the LC adapters can be duplex or simplex adapters. MPO connectors and adapters can also be used.

10 distribution system
12 distribution box
14 point-to-point
16 split output
18 splitters
20 feeder
22 connectors
24 adapters
26 termination field
28 splitter inputs
112 box
113 box
114 base
116 cable area
118 splitter area
120 area
122 feeder terminations
124 storage areas
126 cable storage areas
128 cable storage areas
130 cables
132 one un-used fiber bundle/tube
134 feeder terminations
140 splitter input
142 extra splitters
144 splitter housing
150 cover 160 cover
170 box cover
172 cable stub
174 cable stub
178 connectors
180 posts
182 holes
190 cable management devices
198 feeder-cable
212 alternative distribution box
214 base
216 cover
222 feeder terminations
224 cable storage area
242 splitter
246 multiple outputs
248 splitter housing
250 splitter input cable
280 posts
282 holes
312 box
314 base
316 middle cover
326 cable storage area
342 splitter
344 cable stubs
346 splitter housing
350 splitter input
412 distribution box
414 base
422 feeder terminations
442 splitter
446 latch
450 splitter input
460 dovetail projection
470 mating slot
512 distribution box
514 base
516 internal tray
518 splitter area
522 feeder termination area
524 area
526 posts
528 posts
530 clamping device
532 arms
536 channel
540 strength member clamp
542 ramp
544 metal clamping plate
546 base
550 termination cover
552 finger recess
554 latch
556 cutout
560 cover
562 tabs
564 snaps
566 handles
568 arms
570 cover
572 cover lock
573 key
574 hinge
580 connection box
582 corrugated tube
584 two pieces
586 flexible conduitor corrugated tube
590 feeder termination inserts
592 openings
594 openings
596 opening
600 foam insert
602 slits
642 splitters
650 input cables
652 distribution cables
702 splitter
704 splitter
706 splitter
710 latch
712 socket
720 lightplug connector retainer
724 internal splitter tray
726 housing
730 oval openings
732 oval openings
802 splitters
804 feeder terminations

What is claimed is:

1. A fiber distribution system comprising:
a feeder cable;
a base defining a front opening and a channel through which the feeder cable can be routed, the channel extending lengthwise within a first side and a front portion of the base, the channel defining a breakout region at which a plurality of optical cables of the feeder cable can be accessed, the base including a holding location configured to hold a plurality of fiber optic feeder terminations;
a plurality of fiber optic feeder terminations positioned in the holding location at the base, the holding location being located at a rear portion on the first side of the base;
a splitter having a plurality of outputs and a splitter input cable with a connectorized end plugged into one of the fiber optic feeder terminations, the splitter being located at the rear portion on the first side of the base;
wherein a first output cable with a connectorized end is connectable to a splitter output;
wherein a second output cable with a connectorized end is connectable to a fiber optic feeder termination to provide a single service output;
a demarcation cover removable from the base, wherein when the demarcation cover is installed on the base front portion, the demarcation cover covers the channel without extending over or covering the base rear portion including the splitter and the plurality of fiber optic feeder terminations; and
an external cover mounted to the base, wherein when the external cover is in a closed position, the external cover covers the demarcation cover, the splitter, and the plurality of fiber optic feeder terminations.

2. The fiber distribution system of claim 1, wherein a feeder termination cover extends upwardly from the base.

3. The fiber distribution system of claim 1, wherein the plurality of fiber optic feeder terminations face downwardly.

4. The fiber distribution system of claim 1, wherein the breakout region leads to a routing passage that provides slack storage around a spool or bend radius limiter.

5. The fiber distribution system of claim 4, wherein a splicing passage leads from the routing passage to one or more optical splice holders; and wherein a pigtail passage also connects to the routing passage and/or to the splicing passage, the pigtail passage extending to the plurality of fiber optic feeder terminations.

6. The fiber distribution system of claim 1, wherein the splitter input cable protrudes from a bottom surface of the splitter and the plurality of outputs of the splitter face in a similar direction at the bottom surface.

7. The fiber distribution system of claim 1, wherein the plurality of outputs of the splitter and the plurality of fiber optic feeder terminations face in the same direction.

8. The fiber distribution system of claim 7, wherein the plurality of outputs of the splitter and the plurality of fiber optic feeder terminations are facing downwardly.

9. The fiber distribution system of claim 1, wherein the splitter mounts to the base over a post.

10. The fiber distribution system of claim 9, wherein the splitter mounts to the base over two posts.

11. The fiber distribution system of claim 10, wherein the two posts have different sizes and/or shapes.

12. The fiber distribution system of claim 1, wherein the splitter is slidably mounted to the base.

13. The fiber distribution system of claim 1, wherein the channel has two slack storage areas on opposite sides of the base.

14. The fiber distribution system of claim 1, wherein the plurality of outputs of the splitter are in the form of:
connectors;
adapters; or
stub cables with connectorized distal ends.

15. The fiber distribution system of claim 1, further comprising a plurality of splitters in a stack.

16. The fiber distribution system of claim 15, further comprising a snap between the plurality of splitters.

17. The fiber distribution system of claim 1, further comprising a cable clamp for the feeder cable.

18. The fiber distribution system of claim 1, further comprising a second base and a second demarcation cover defining a channel through which a feeder cable can be routed, the channel defining a breakout region at which a plurality of optical cables of the feeder cable can be accessed, the second base including a holding location configured to hold a plurality of fiber optic feeder terminations;
wherein the base is a first base, and at least one cable connects the first base to the second base:
1) wherein the at least one cable is a splitter input cable;
2) wherein the at least one cable is a feeder termination cable; or
3) wherein the at least one cable is a feeder termination cable that exits the first base and enters the second base in the channel of the second base.

19. A fiber distribution box for use with a feeder cable including an optical cable comprising:
a base and an external cover, the base defining a feeder cable area including a channel through which the feeder cable can be routed, the channel defining a breakout region at which the optical cable of the feeder cable can be accessed, the breakout region leading to a routing passage that provides slack storage around a spool or bend radius limiter, the base including a holding location configured to hold fiber optic feeder terminations;
the base defining a splitter area including one or more splitter mounting posts for extending through splitter bodies mounted in the splitter area, or including one or more dovetail-shaped slots or projections for slidably receiving one or more splitter devices.

20. The fiber distribution box of claim 19, wherein two splitter mounting posts are provided.

21. The fiber distribution box of claim 19, wherein the base includes one or more latches for securing splitters within the one or more slots or projections.

22. The fiber distribution box of claim 19, wherein the routing passage includes one or more optical splice holders; and wherein a pigtail passage also connects to the routing passage, the pigtail passage extending to the holding location.

23. The fiber distribution box of claim 19, wherein the channel is a central channel on the base, and has two slack storage areas on opposite sides of the base.

24. The fiber distribution box of claim 19, wherein the splitter area is on an opposite side of the base relative to the holding location.

25. The fiber distribution box of claim 19, further comprising a cable clamp for the feeder cable, and opposing arms extending around the clamp from the external cover.

26. The fiber distribution box of claim 19, further comprising a tube holder for holding a tube at a splitter output cable area of the base.

27. The fiber distribution box of claim 19, further comprising:
one or more splitter devices including an input cable at a bottom side, a plurality of splitter outputs at the bottom side, and a splitter component between the input cable and the plurality of splitter outputs, the input cable being in the form of a fiber optic cable with a connectorized end, the plurality of splitter outputs being in the form of fiber optic output adapters, connectors, or cable stubs with connectorized ends, and the fiber optic feeder terminations being in the form of connectors or adapters, the fiber optic feeder terminations facing in the same direction as the splitter outputs.

28. The fiber distribution box of claim 27, further comprising an internal cover positioned over the cable area.

29. The fiber distribution box of claim 27, wherein excess length of a splice pigtail of the feeder cable can be stored in the routing passage before an unconnectorized end of the splice pigtail is routed to a splicing passage for splicing.

30. The fiber distribution box of claim 29, wherein the splicing passage leads from the routing passage to one or more optical splice holders; and wherein a pigtail passage also connects to the routing passage and/or to the splicing passage, the pigtail passage extending to the holding location.

31. The fiber distribution box of claim 27, wherein the channel is a central channel on the base.

32. A splitter device comprising:
a splitter body having a front and an opposite rear along a first length, and a bottom;
the bottom having a plurality of splitter outputs;
the bottom having an input cable with a connectorized end;
a splitter component between the splitter outputs and the input cable;
wherein the plurality of splitter outputs are in the form of fiber optic output adapters, connectors, or stub cables with connectorized ends;
wherein the splitter body includes an interlocking device on an end of the splitter body, the interlocking device being for mounting the splitter device to a structure and including one of an opening extending through the splitter body front and rear for receiving a mounting post and a dovetail-shaped slot or projection, extending along the first length of the splitter body, for receiving a correspondingly shaped feature.

33. The splitter device of claim 32, wherein the plurality of splitter outputs includes any number between and including four outputs and sixteen outputs.

\* \* \* \* \*